(12) United States Patent
Nunan

(10) Patent No.: US 6,326,329 B1
(45) Date of Patent: Dec. 4, 2001

(54) HIGHLY DISPERSED SUBSTANTIALLY UNIFORM MIXED-METAL-OXIDE COMPOSITE SUPPORTS FOR EXHAUST CONVERSION CATALYSTS

(75) Inventor: John G. Nunan, Tulsa, OK (US)

(73) Assignee: ASEC Manufacturing, Catoosa, OK (US)

( * ) Notice: Subject to any disclaimer, the term of this patent is extended or adjusted under 35 U.S.C. 154(b) by 0 days.

(21) Appl. No.: 08/802,723

(22) Filed: Feb. 20, 1997

Related U.S. Application Data

(60) Provisional application No. 60/012,007, filed on Feb. 21, 1996.

(51) Int. Cl.[7] .............................. B01J 21/00; B01J 23/00
(52) U.S. Cl. ....................... 502/242; 502/263; 502/300; 502/304; 502/349
(58) Field of Search .................................... 502/170, 304, 502/172, 303, 302, 261, 240, 241, 242, 250, 263, 349, 300; 423/213.5, 213.2, 593, 263

(56) References Cited

U.S. PATENT DOCUMENTS

| | | |
|---|---|---|
| 4,122,110 | 10/1978 | Sugjer et al. . |
| 4,791,091 | 12/1988 | Bricker et al. . |
| 4,868,149 | 9/1989 | Bricker et al. . |
| 4,919,902 * | 4/1990 | Bricker et al. ............ 423/213.5 |
| 4,988,660 * | 1/1991 | Campbell ....................... 502/302 |
| 5,010,051 | 4/1991 | Rudy . |
| 5,053,378 * | 10/1991 | Blanchard et al. ............ 423/213.5 |
| 5,064,803 | 11/1991 | Nunan et al. . |
| 5,137,862 * | 8/1992 | Mackrodt et al. ............. 502/304 |
| 5,552,128 | 9/1996 | Chang et al. . |
| 5,556,825 | 9/1996 | Sheief et al. . |
| 5,597,771 * | 1/1997 | Hu et al. ....................... 502/304 |
| 5,759,947 * | 6/1998 | Zhou ............................. 502/304 |

FOREIGN PATENT DOCUMENTS

| | | |
|---|---|---|
| 1083742 * | 3/1994 | (CN) . |
| 507590 | 10/1992 | (EP) . |
| 605274 | 6/1994 | (EP) . |
| 611192 | 8/1994 | (EP) . |
| 0718239A1 | 6/1996 | (EP) . |
| 2086903 | 12/1971 | (FR) . |
| 57119838 | 7/1982 | (JP) . |
| 95/03886 * | 2/1995 | (WO) . |

OTHER PUBLICATIONS

Couny et al., Exhaust Gas Catalytic Reduction of Nitrogen Oxides over NiFe2O–NiCr2O4 Solid Solutions, 1980, Ind. Eng. Prod. Res. Dev. vol. 19, pp. 226–31, (Month of publication is not available).

Ph. Couny and Ch. Marcilly, A Scientific Approach to the Preparation of Bulk Mixed Oxide Catalysts, 1983, Preparation of Catalysts III, pp. 485, 496–97. (Month of publication is not available).

Mizukami et al., Structural Regulation of Iron Oxide Supported on a Metal Oxide by Organic Compounds, 1988, J. Chem. Soc. Chem. Commun. pp. 1540–41. (Month of publication is not available).

Harrison et al., Promoting Platinum Metals by Ceria Metal–support Interactions in Autocatalysts, 1988, Platinum Metals Rev. vol. 32 (2), pp. 73–78. (Month of publication is not available).

Funabiki and Yamada, A Study of Three Way Conversion Catalyst Thermal Deactivation and Improvement, 1988, SAE Technical paper Services 881684. (Month of publication is not available).

* cited by examiner

Primary Examiner—Steven Bos
(74) Attorney, Agent, or Firm—Ruffner & Associates

(57) ABSTRACT

Improved catalysts for conversion of exhaust from internal combustion engines are produced by providing a unique, promoted support consisting of a mixed-metal-oxide promoter substantially uniformly dispersed as homogeneous crystallites of less than about 100 Å on a high surface area refractory oxide support substrate. The promoted support is made by a process that involves dissolving a combination of a primary metal oxide precursor with the oxide precursor of at least one additional metal and a compatible organic depositing agent, slowly heating to transform the depositing agent into a gel-like matrix coating the substrate in which the mixed-metal-oxide precursor compounds are uniformly distributed and thereafter calcining to burn off the organic matrix and form the appropriate oxide morphology.

8 Claims, 26 Drawing Sheets

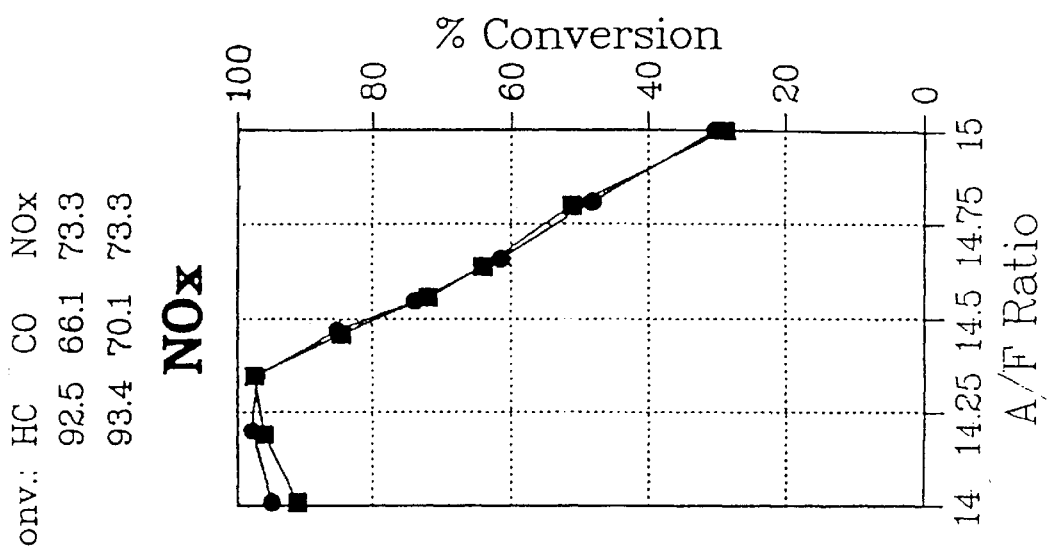
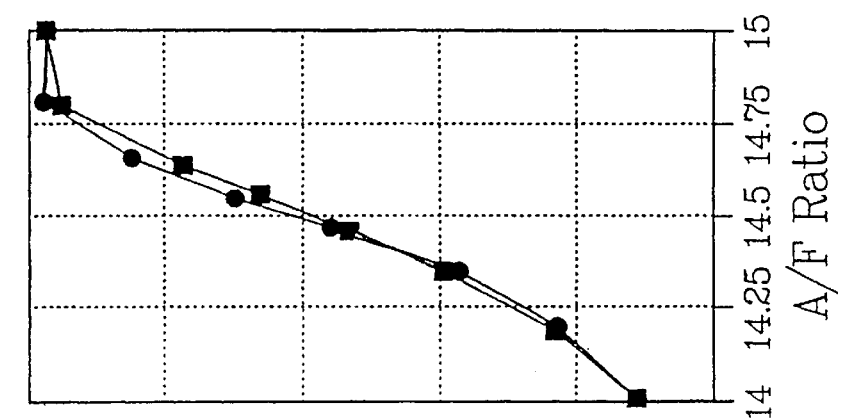
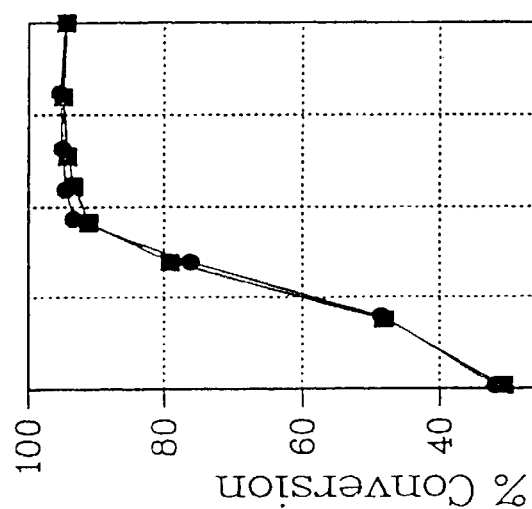

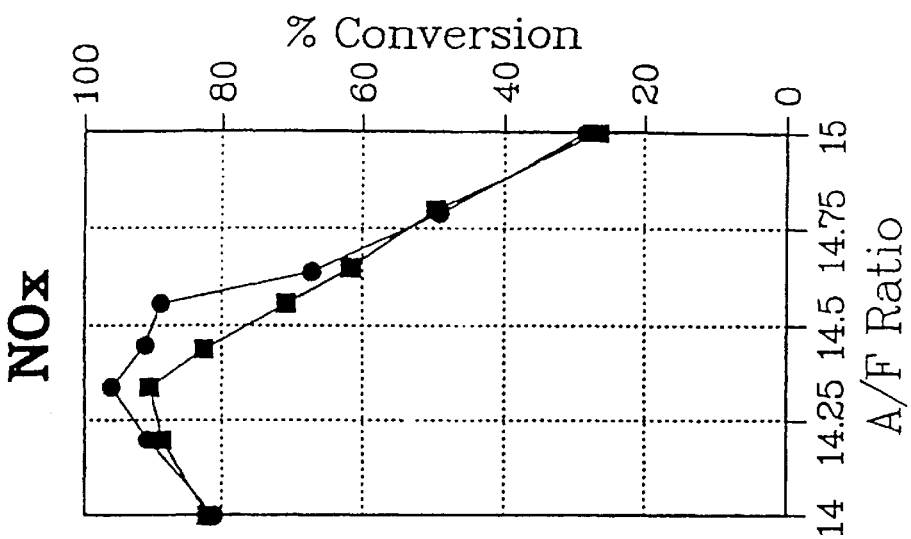
FIG. 2A  FIG. 2B  FIG. 2C
– – – Catalyst Identification  – – – Integral Conv.:  HC  CO  NOx
■ Pt,Rh/Ce/γ-Al₂O₃/Ref.; Ce = 1000 g/ft³   93.1  71.4  76.5
● Pt,Rh/Ce,Zr/γ-Al₂O₃; Ce = 1030 g/ft³; Zr = 320 g/ft³   94.0  81.8  82.2
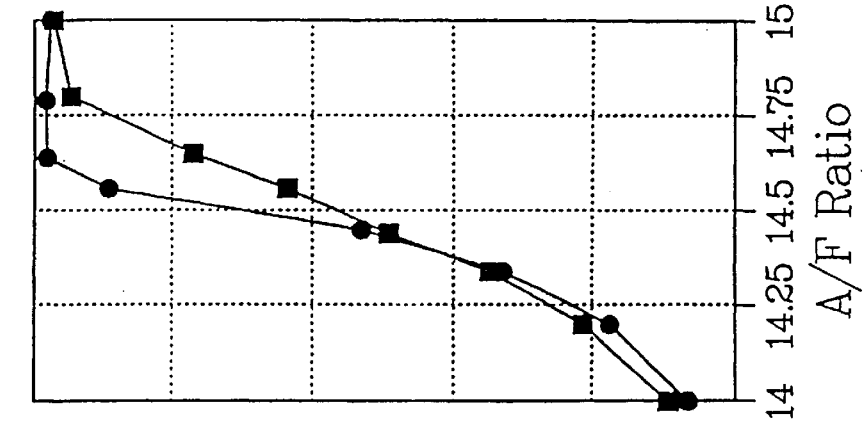
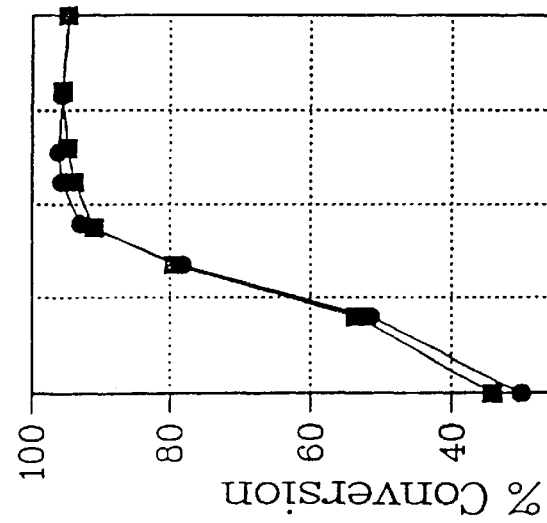

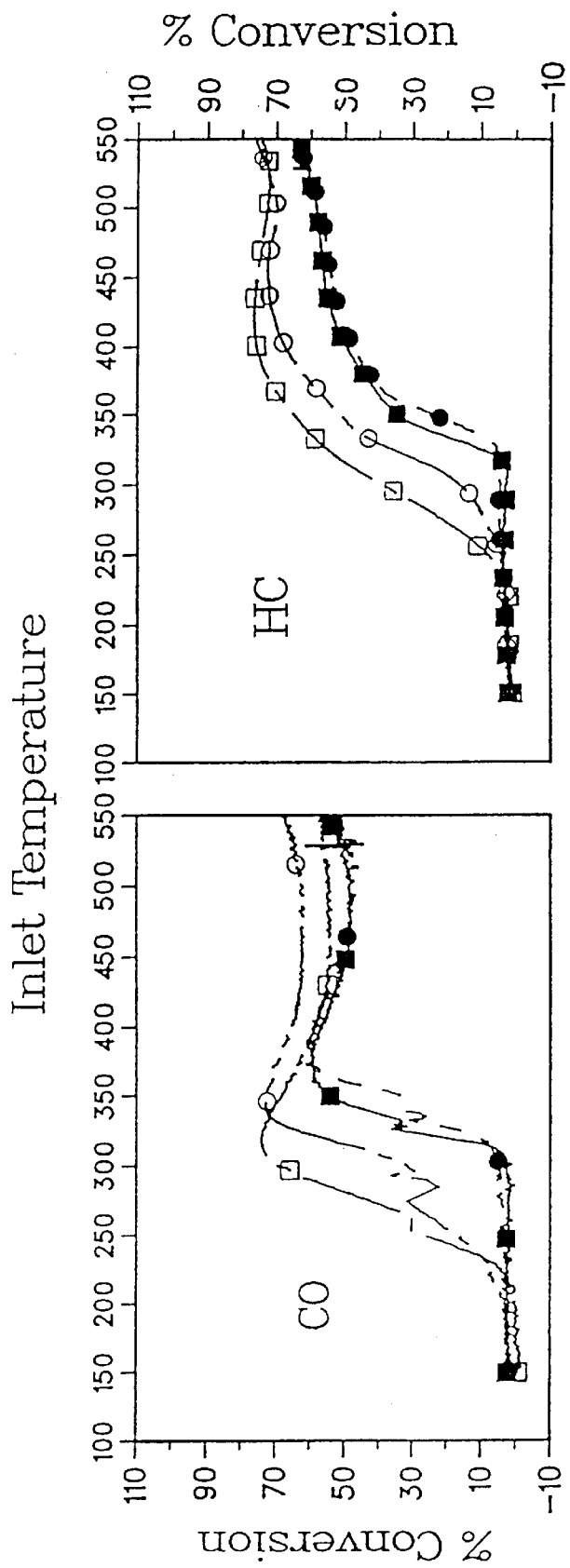

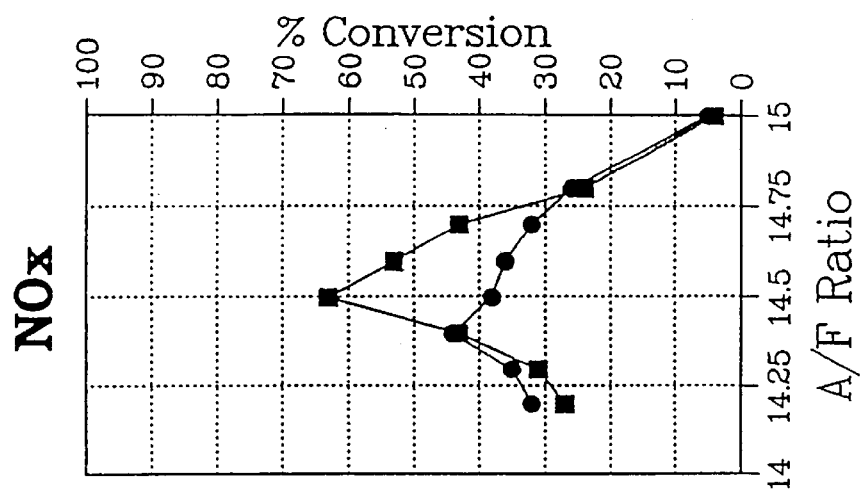
FIG. 16A  FIG. 16B  FIG. 16C
■ Pd/La,Zr,Ce/Al₂O₃
● Pd/Ce,La/Al₂O₃ (Reference)
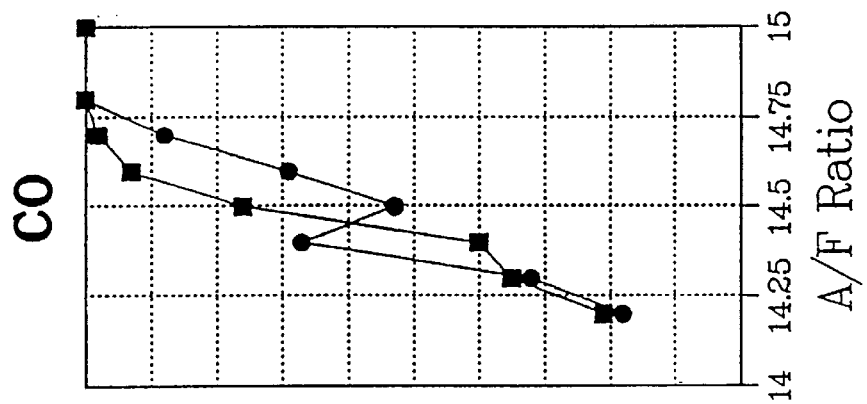
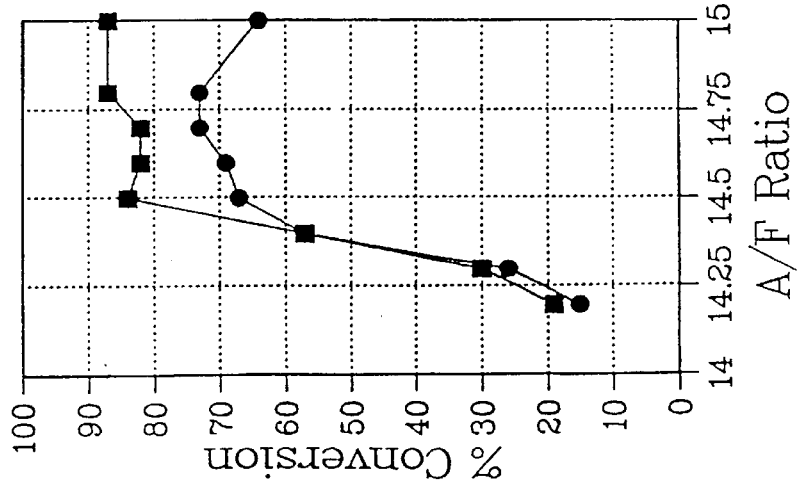

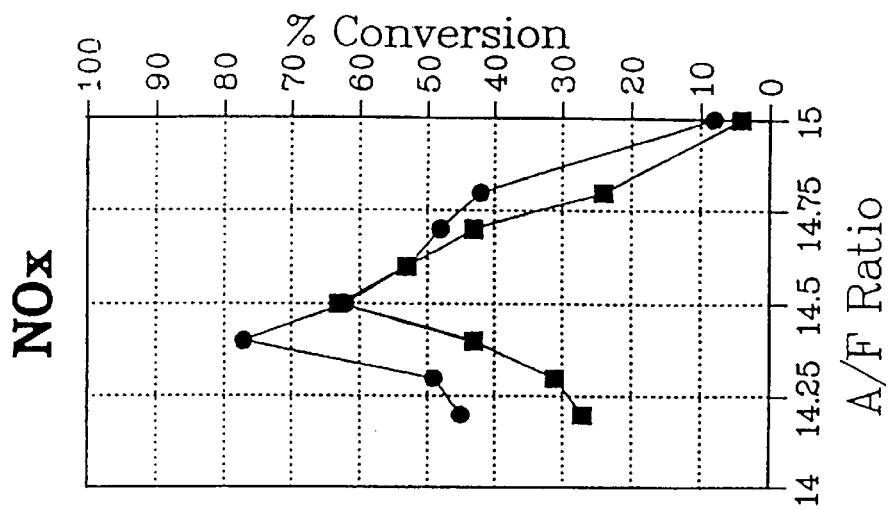
FIG. 17A — HC
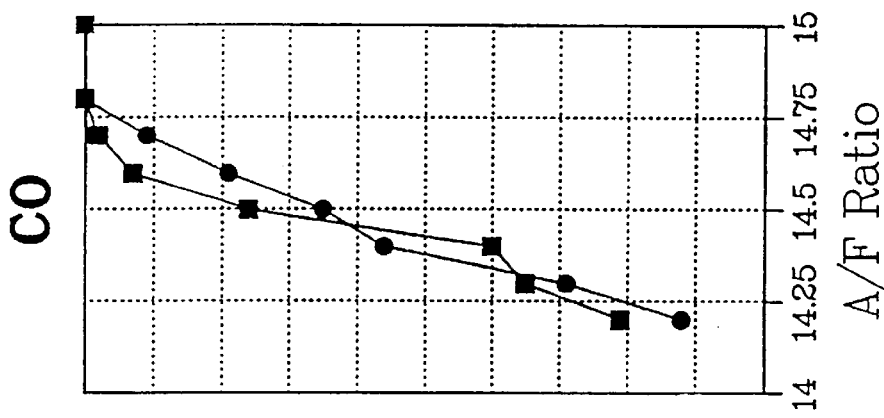
FIG. 17B — CO
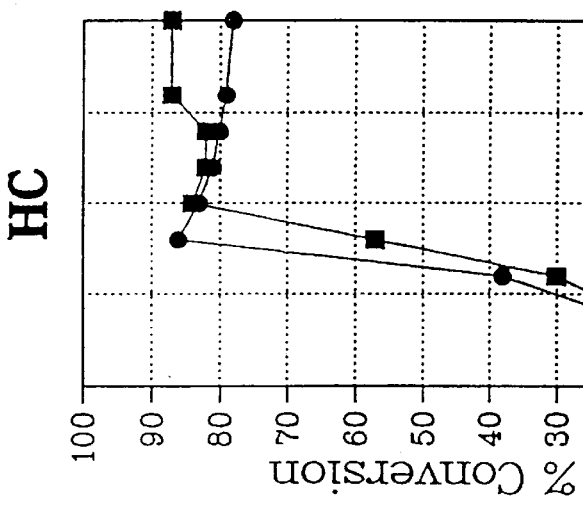
FIG. 17C — NOx
■ Pd/La,Zr,Ce/Al$_2$O$_3$
● Pd/12.5wt.%La/Al$_2$O$_3$ (Reference)

■ Pd/La,Zr,Ce/Al$_2$O$_3$
● Pd/Ce,Zr/Al$_2$O$_3$ (Ce/Zr = 0.89)

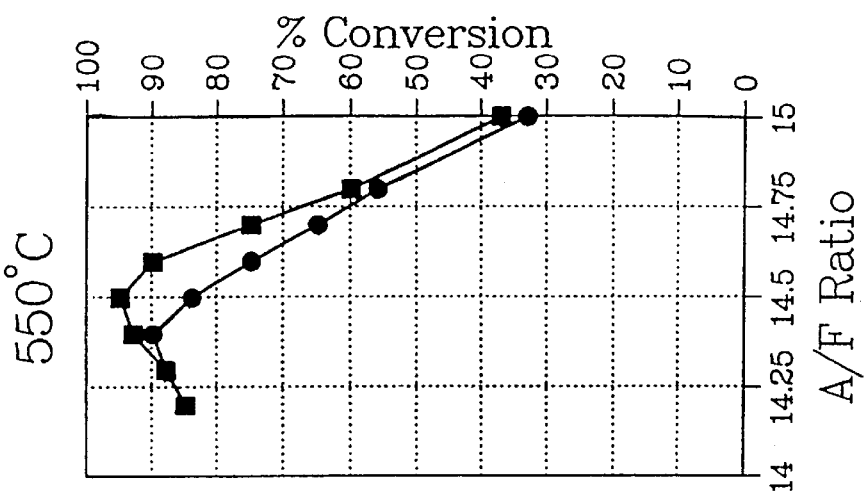
FIG. 19A 450°C
■ Pd/La,Zr,Ce/Al$_2$O$_3$
● Pd/Ce,La/Al$_2$O$_3$ (Reference)
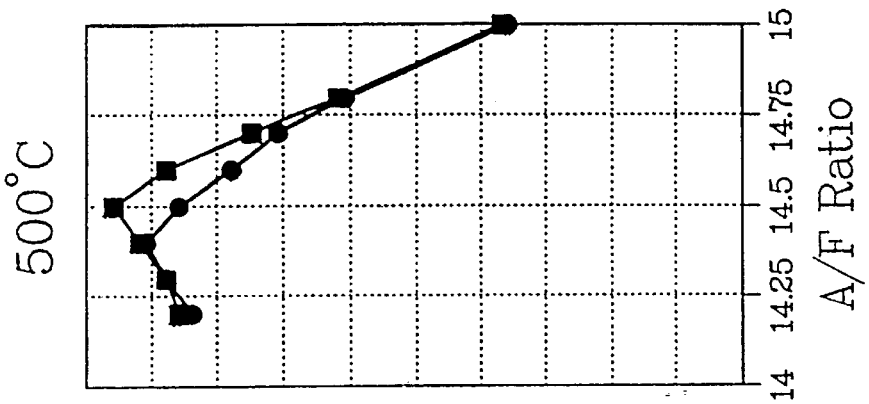
FIG. 19B 500°C
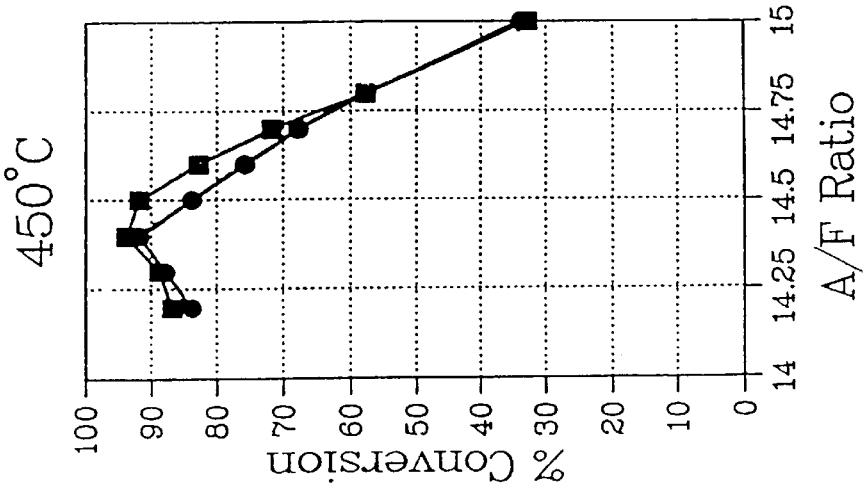
FIG. 19C 550°C

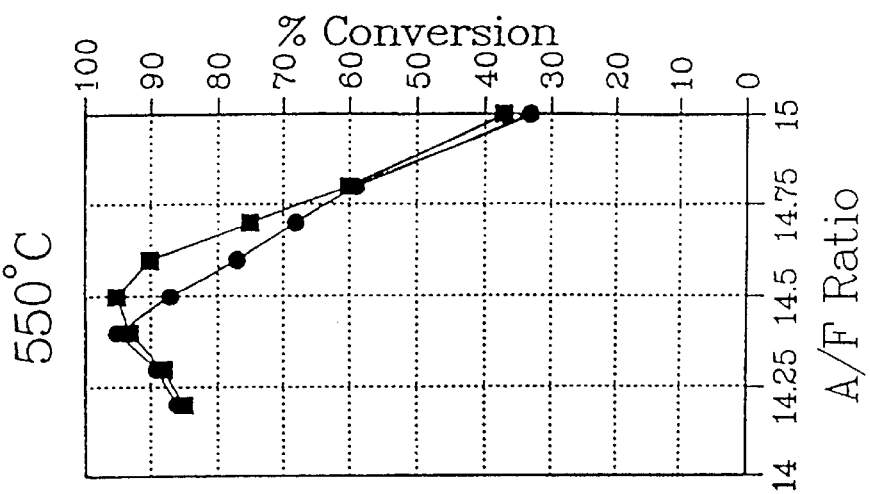
FIG. 20A  450°C
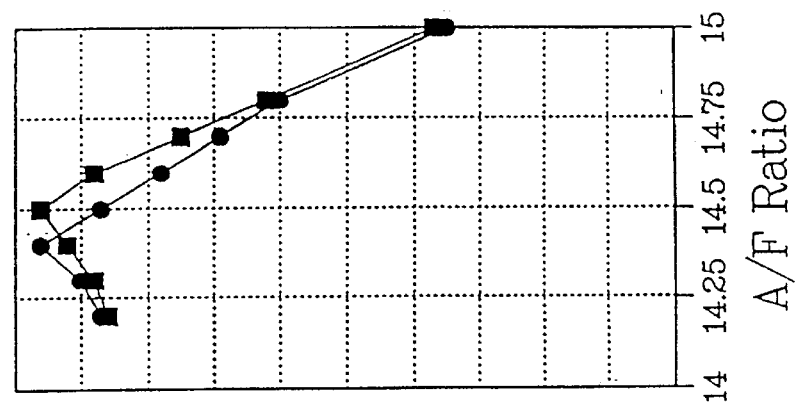
FIG. 20B  500°C
■ Pd/La,Zr,Ce/Al$_2$O$_3$
● Pd/12.5wt.%La/Al$_2$O$_3$ (Reference)
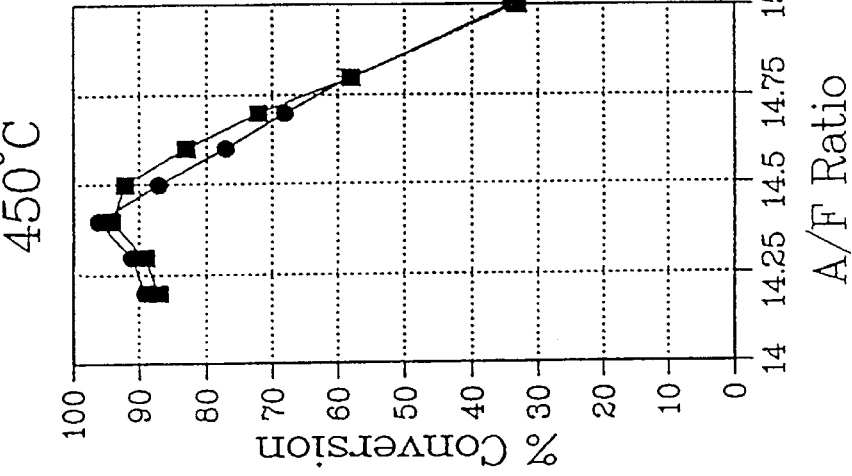
FIG. 20C  550°C

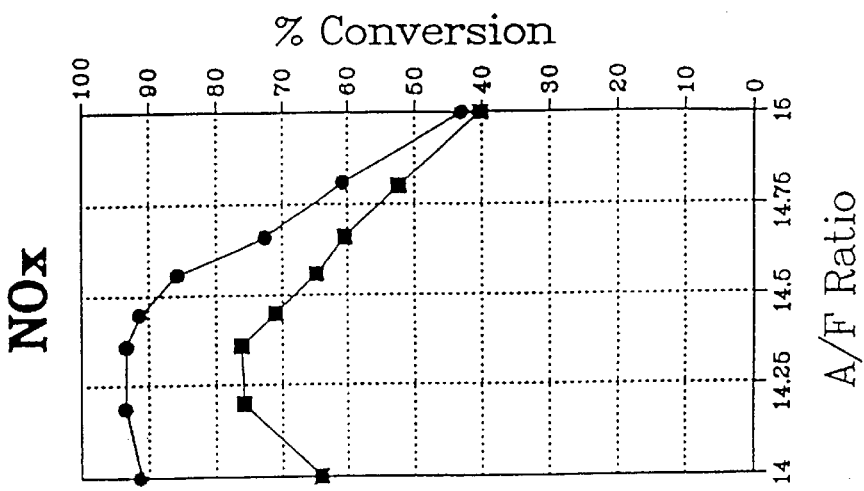
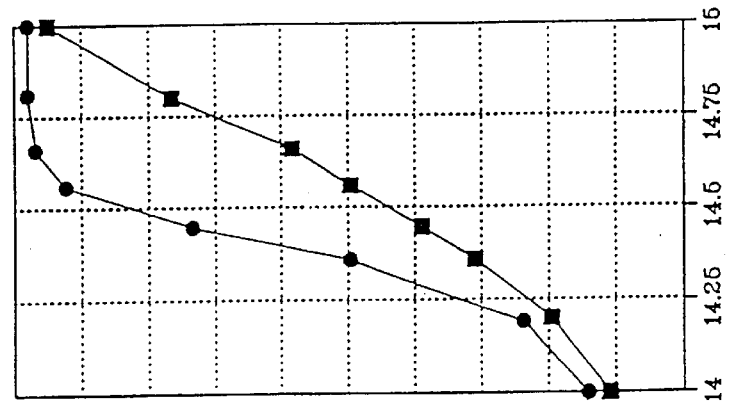
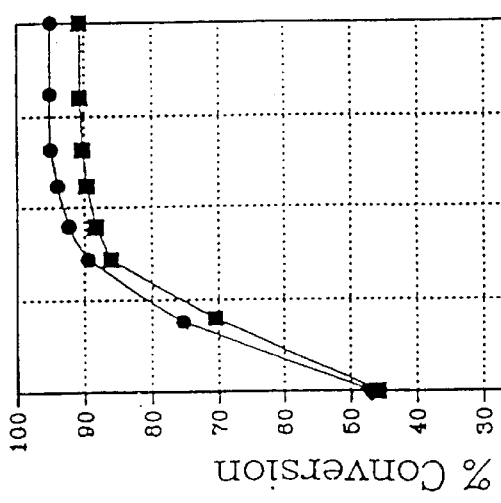

HIGHLY DISPERSED SUBSTANTIALLY UNIFORM MIXED-METAL-OXIDE COMPOSITE SUPPORTS FOR EXHAUST CONVERSION CATALYSTS

This application claims priority from U.S. Provisional Patent Application Serial No. 60/012,007, filed Feb. 21, 1996.

FIELD OF THE INVENTION

The present invention relates to catalysts for conversion of exhaust from internal combustion engines. More particularly, the present invention relates to mixed-metal oxide crystallite compositions supported and dispersed on a high surface area support such as $\gamma$-$Al_2O_3$, their use as promoters in catalysts for motor vehicle exhaust conversion, and promoter catalyst supports containing mixed-metal oxide crystallite compositions.

BACKGROUND OF THE INVENTION

Typical exhaust conversion catalysts contain small amounts of Group VIII metals, particularly platinum, palladium, and rhodium, dispersed on a high surface area inert support material such as alumina. While gamma alumina is often preferred as the support, other forms of alumina such as delta, eta, theta, and alpha alumina may be present. Other materials such as zirconia, titania, silica, silica-alumina, and alumina-silicates have also been suggested in the art as supports.

For optimum performance exhaust conversion catalysts will often additionally contain promoters, such as alkaline earth oxides including barium and strontium, transition metals including iron and nickel, and rare earth oxides including cerium and lanthanum. The function of these promoters is not fully understood, but it is thought that they have several functions, including stabilization of the supports to prevent or limit phase changes and loss of surface area.

Motor vehicle exhaust conversion catalysts are normally operated under conditions which inherently swing between oxidizing and reducing as an oxygen sensor and its control system keep the air/fuel ratio within the desired operating A/F window around the stoichiometric value. Ceria is a well-known component of such exhaust conversion catalysts. It is often referred to as an "oxygen storage" agent because it is considered to have the ability to give up oxygen when the catalyst is exposed to reducing conditions and to re-oxidize when exposed to oxidizing conditions. It has also been suggested that ceria may stabilize the support structure, promote the activity of the precious metals, or promote the water gas shift reaction. See for example, B. Harrison, A. F. Diwell and C. Hallet, *Platinum Metals Rev.*, 1988, 32(2), 73–78.

In their report on the deactivation of catalysts, Funabiki and Yamada, SAE Technical Paper Services 881684, studied the increase in platinum and ceria crystallite size as operating temperature was increased. They concluded that smaller ceria crystallites provide greater oxygen adsorption and better conversion of CO, HC, and $NO_x$. However, it appears that the smallest ceria crystallites measured were about 200 Å.

In U.S. Pat. No. 4,791,091 Bricker disclosed an auto exhaust catalyst having lanthanum crystallites below 25 Å size which are produced by a unique process combining hydrosols of alumina with solutions of lanthanum compounds.

In U.S. Pat. No. 4,868,149 Bricker et al. disclosed another catalyst in which lanthanum is present in crystallites below 25 Å, but the lanthanum was deposited by impregnating a washcoated monolith with lanthanum nitrate. The crystallite size of ceria in such catalysts was reported to ie 90–100 Å where ceria was deposited on the alumina washcoat by impregnation.

One method of applying Group VIII metals to a catalyst support is to employ an impregnating solution including hydroxycarboxylic acid in order to cause the dissolved Group VIII metal compound to penetrate into the support. One example is found in Japanese published application J57119838 assigned to Mitsui Mining & Smelting. They disclose the impregnation of a washcoated ceramic honeycomb with an aqueous solution of palladium chloride and cerium acetate including 150–330 gm/liter of a hydroxylcarboxylic acid.

Ceria promoted exhaust conversion catalysts have become a major type of exhaust conversion catalyst and the recent tend has been to prepare catalysts with increased Ce loadings to achieve higher catalyst performance. However, the amount of Ce in these catalysts has become an issue as the cost of Ce is increasing rapidly (approx. 10%/year). Thus, it would be an advantage in the art to be able to reduce the amount of metal oxide required to produce effective promoted supports for exhaust conversion catalysts.

One way to reduce the Ce loading and/or increase the effectiveness of a lower Ce loading is to increase the dispersion of Ce. In U.S. Pat. No. 5,064,803, there is disclosed a method for preparing more highly dispersed Ce catalysts for conversion of the exhaust from internal combustion engines that includes impregnating a support with a solution of a cerium compound and an organic compound containing hydroxy and/or carboxylic acid moieties. The catalyst resulting from the method showed crystallite sizes of around 50 Å as measured by X-ray diffraction.

Another way to reduce the amount of Ce required is to promote the effectiveness of the Ce employed by the inclusion of a secondary promoter in the ceria crystalline lattice.

SUMMARY OF THE INVENTION

It is an object of the present invention to provide an exhaust conversion catalyst support material that is highly effective in enhancing the performance of catalytically active metals deposited thereon in the conversion of noxious components in the exhaust from internal combustion engines to compounds that are not detrimental to the environment. The promoted support materials of the present invention comprise substantially homogeneous, compositions of mixed-metal oxide crystallites supported and dispersed on a high surface area support substrate and characterized in that the average size of the crystallite is about 100 Å or less, preferably about 50 Å or less, and wherein the mixed-metal oxide contains cerium or zirconium as the predominant metal in combination with at least one additional secondary metal, the ratio and distribution of the metal atoms within said mixed-metal oxides being substantially uniform throughout the crystallite.

It is a feature of the present invention that the produced supported mixed-metal oxide crystallites are essentially constituted as a single crystalline structure containing an intimate mixture of metal ions uniformly distributed and attached to oxygen atoms within the crystalline structure, In the mixed-metal oxide crystallite structures of the present invention, the primary metal oxide is that metal oxide the properties of which dominate the final mixed-metal oxide composition of the invention. In most cases, it will be the oxide of the metal which constitutes the majority of the metal ions in the crystalline oxide structure. In the present invention the preferred primary, or predominant metal oxide, is the promoter compound $CeO_2$ or $ZrO_2$. The lattice structure of the primary metal oxide promoter compound has been doped with predetermined amounts of one or more secondary metal ions.

Any one or more metal ions can serve as the secondary metal in the support material crystallite structures of the present invention, so long as those metals have an ionic radius approximately the same as the ionic radius of the primary metal. Thus, for example, where the primary metal oxide is ceria, the secondary metal should have an ionic radius between about 0.75 Å and about 1.35 Å. Zirconium is the preferred secondary metal in the support materials of the present invention when the primary metal is cerium. Cerium is the preferred secondary metal in the support materials of the present invention when the primary metal is zirconium.

The promoted catalyst supports of the present invention are prepared by a method that first involves forming an intimate (i.e., ionic) solution of two or more metal oxide precursor compounds.

In this context, the term "precursor compounds" is intended to refer to compounds that when heated in the presence of oxygen tend to form the desired metal oxide and leave no solid residue. It is important to the invention that the metal oxide precursor compound also remain in solution without precipitating, complexing or volatilizing as the solvent, preferably water or some other appropriate solvent, is heated and/or removed by vaporizing.

Also to be included in the solution formed as a first step of the method of this invention is an organic depositing reagent. This reagent is essentially characterized as an organic material, soluble in the solution that contains the precursor compounds, and forms a hydrogen-bonded, gel-like matrix when the water or other solvent is driven off, as by heating. The gel-like material forms a supporting matrix in which the ions of the precursor compounds remain substantially homogeneously mixed throughout. The reagent is also characterized in that the supporting matrix that it forms is totally volatilized, leaving no solid residue, when it is heated to the temperatures necessary to oxidize the metal oxide precursor compounds.

Next, the solution formed is suitably contacted by methods well known in the art with a substrate material, such as a refractory oxide, on which the mixed-metal oxides are to be dispersed. Alternatively, the solution may be treated by itself, in which case the mixed-metal oxide crystallites that are ultimately formed become the support material.

The solution, or the solution-impregnated substrate material, is subsequently dried and calcined. Upon drying, which may be accomplished by slow heating according to routine procedures, the solvent material evaporates and a gel-like matrix forms, trapping the metal ions in an essentially uniform atomic dispersion throughout the matrix.

Subsequent calcining causes the precursor compounds to form metal oxides. More importantly, it also causes the organic structure of the matrix to combust, leaving a substantially homogeneous mixed-metal oxide crystallite structure. If there has been a support substrate impregnated by the original solution, the result is the formation on the surface of the support of a uniformly dispersed thin layer of mixed-metal oxide crystallites.

Where a support substrate is utilized in the method of this invention, it is preferred that the substrate be selected from the group consisting of alumina, silica, silica-alumina, alumina-silicates, or combinations or mixtures thereof. Where alumina is used, it is preferred to use an activated alumina selected from the group consisting of gamma-alumina, delta-alumina, theta-alumina, and mixtures thereof.

As will be understood by those having skill in this art, the appropriate metal oxide precursor that is suitably soluble in the solutions contemplated in the present invention will depend to some extent on the desired primary metal oxide. It has been found, for example, that cerium acetate and cerium nitrate are highly effective as cerium oxide precursor compounds and these compounds are preferred when the primary metal oxide is to be cerium oxide. When zirconium oxide is to be the primary oxide, it is preferred to use any of the commercially available zirconium nitrates or acetates as metal oxide precursor compounds.

The organic depositing reagent to be used in the methods of the present invention is advantageously selected from those compounds characterized as containing one or more hydroxy, carboxyl, or hydroxy-carboxylic acid groups capable of hydrogen bonding. The preferred organic depositing reagents are selected from the group consisting of soluble sugars, saccharides, polysaccharides, or derivations thereof, and polyols, most preferably, d-sorbitol.

The resulting support containing the mixed-metal-oxide promoters deposited thereon may then be contacted with one or more solutions containing catalytically active metals, preferably Group VIII catalytic metals, to place the catalytic metals into or onto the support. The resulting supported catalytic system is dried and calcined to form a promoted exhaust conversion catalyst. The exhaust conversion catalyst can then be washcoated onto a suitable carrier to form a structure for use in catalytic converters.

Alternatively, the support material containing the mixed-metal-oxide crystallites produced according to the invention can be washcoated on a carrier in combination with the catalytically active metals or the catalytically active metals can be added to the carrier containing the mixed-metal-oxide modified support in one or more steps.

BRIEF SUMMARY OF THE DRAWINGS

For a more complete understanding of the present invention and the features and advantages thereof, reference is now made to the Detailed Description in conjunction with the attached Drawings, in which:

FIG. 1 compares the A/F traverse performance of a reference ceria-only Pt,Rh/Ce/γ-$Al_2O_3$(ref) catalyst to a Pt,Rh/Ce,Zr/γ-$Al_2O_3$ (10 wt. % Zr) catalyst made with prior art mixed metal oxide composition (Pt+Rh=40 g/ft$^3$ @ 5/1 for both catalysts), after 75 hours of high temperature (inlet temperature=850° C.) fuel cut aging, at 450° C. and GHSV= 30K;

FIG. 2 compares the A/F traverse performance of the same ceria-only reference Pt,Rh/Ce/γ-$Al_2O_3$(ref) catalyst to a catalyst made with a different prior art mixed metal oxide composition Pt,Rh/Ce,Zr/γ-$Al_2O_3$ (23.7 wt. % Zr) (Pt+Rh= 40 g/ft$^3$ @ 5/1 for both catalysts) after 75 hours of high temperature (inlet temperature=850° C.) fuel cut aging at 450° C.and GHSV=30K;

FIG. 16 compares lean to rich A/F traverse performance for a Pd(1.0 wt. %)/La,Zr,Ce/Al$_2$O$_3$ catalyst made according to the present invention and a Pd/Ce,La/Al$_2$O$_3$ (1.0 wt. % Pd) reference catalyst after aging at 964° C. and a test temperature of 500° C.;

FIG. 17 shows lean to rich A/F traverse performance comparison for a Pd(1.0 wt. %)/La,Zr,Ce/Al$_2$O$_3$ catalyst and a Pd/12.5 wt. % La/Al$_2$O$_3$ (1.0 wt. % Pd) reference catalyst after aging at 964° C. and a test temperature of 500° C.;

FIG. 19 shows lean to rich A/F traverse O$_2$ conversion verses A/F ratio at 450° C., 500° C., and 550° C. performance comparison for a Pd(1.0 wt. %)/La,Zr,Ce/Al$_2$O$_3$ catalyst and a Pd/Ce,La/Al$_2$O$_3$ (1.0 wt. % Pd) reference catalyst after aging;

FIG. 20 shows lean to rich A/F traverse O$_2$ conversion verses A/F ratio at 450° C., 500° C., and 550° C. performance comparison for a Pd(1.0 wt. %)/La,Zr,Ce/Al$_2$O$_3$ catalyst and a Pd/12.5 wt. % La/Al$_2$O$_3$ (1.0 wt. % Pd) reference catalyst after aging;

FIG. 24 shows the performance comparison at 450° C., GHSV=60K of a traverse test for Pd,Rh/Ce,Zr,La catalyst and Pd,Rh/Ce,La,Ba reference catalyst after 75 hours of a fuel cut aging at 900° C. (Pd+Rh=40 g/ft$^3$ @ 5/1);

DEFINITIONS

Figure 3:
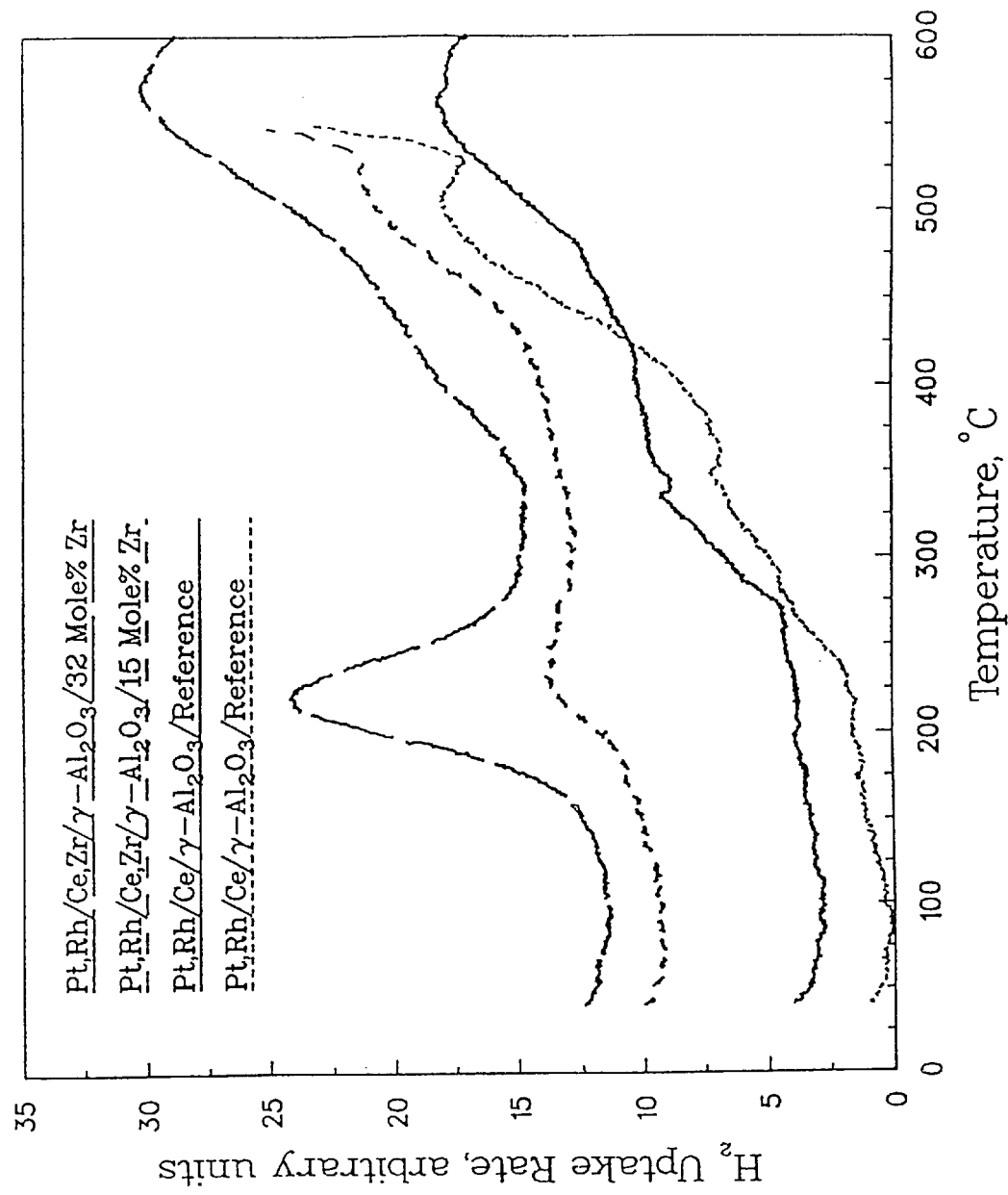
FIG. 3 shows the TPR spectra of the catalysts of FIGS. 1 and 2.

In this disclosure:

"Ceria" means cerium oxide or CeO$_2$;

"Zirconia" means zirconium oxide or ZrO$_2$;

"Mixed-metal oxide" or "solid solution metal oxide" refers to a single substantially homogeneous metal oxide crystallite characterized in that the oxygen atoms in the crystal structure are attached to metal ions of more than one metallic species;

"Ceria-rich" means Mixed-metaloxides having greater than 50 mole % CeO$_2$; and

"Zirconia-rich" means mixed-metal-oxides having greater than 50 mole % ZrO$_2$.

DETAILED DESCRIPTION OF THE INVENTION

This invention is based upon the discovery of a method for effectively incorporating at least one additional metal into the crystalline structure of a primary metal oxide promoter and distributing that at least one additional metal substantially uniformly throughout the primary metal oxide crystalline structure. The resultant crystalline structure becomes in effect "doped" with the at least one additional metal ion. Depending on the nature, amount and atomic size of the doping metal ion or ions, the crystallite not only retains the characteristics of the dominant primary metal oxide but also takes on additional characteristics not ordinarily seen in a crystalline composition of the primary metal oxide alone.

A key feature of the invention is that the mixed-metal-oxide crystallites are simultaneously formed and dispersed on a high surface area support such as γ-Al$_2$O$_3$.

By using appropriate organic reagents, mixtures such as slurries, sols, solutions, dispersions or the like containing two or more promoter precursor species can be prepared and after drying and calcining, form promoted supports having an essentially uniform, substantially homogeneous, highly dispersed, mixed-metal-oxide crystalline structure. Generally, the promoter layer is made up of small crystallites or crystalline domains of the promoter species. These promoted supports are ultimately useful in the preparation of automobile exhaust conversion catalysts. The highly dispersed, substantially homogeneous, mixed-metal-oxide promoters are generally used in conjunction with one or more catalytically active metals, preferably group VIII metals, to form improved exhaust conversion catalysts. The promoter modified supports and catalytically active metals are generally washcoated onto a catalytic converter monolith structure or carrier.

The inventor has found, in particular, that highly efficient ceria-based and/or zirconia-based mixed-metal-oxide single phase crystalline promoter compositions can be formed using the methodology of the present invention. By reducing the size of mixed-metal-oxide promoter crystallites or domain sizes and dispersing them more effectively and uniformly on a catalyst support, there results promoted catalyst supports that not only improve the overall performance, but also lower the overall cost, and improve the stability of the catalysts in which they are incorporated. Interestingly, the improvements are not generally observed when the catalyst has been freshly prepared, but become apparent generally only after the catalyst has been exposed to reducing conditions as occur during normal usage in automobile exhaust converters.

The mixed-metal-oxide promoted supports of the present invention are characterized by a substantially uniform dispersion of nanometer-sized, single phase mixed-metal-oxide promoter crystallites or domains on a support substrate (ie., the crystallites are highly dispersed on the support). Suitable support substrates are generally high surface area activated refractory oxide supports such as alumina, silica, titania, zirconia, aluminosilica, silicalumina, silicaluminophosphate, zeolites, and mixtures thereof. Of course, the support substrate could also be a monolithic carrier or the like. As mentioned, the preferred support substrates are selected from alumina, silica, silica-alumina, alumina-silicates, or combinations or mixtures thereof.

The promoted supports are further characterized by substantial homogeneity of the metal ions in the oxide crystallite matrices or lattices that make up the promoters. This improved homogeneity is evidenced in the data derived from the analytical techniques used to characterize the promoters and the catalysts that contain these promoters.

Although these techniques generally can not unequivocally prove metal ion homogeneity, the techniques generally demonstrate that the promoters have the characteristics of single phase homogeneous mixed metal oxides by the absence of the pure metal oxide spectral or spectroscopic patterns for the secondary metal or metals of the promoter composition. Thus, the term substantially homogeneous is to be understood in the context of the analytical techniques used to show mixed-metal-oxide homogeneity. The term, therefore, is defined to include purely homogeneous mixed-metal-oxide crystal lattices or matrices (ie., the microscopic composition is identical to the bulk composition) as well as lattices, matrices or domains showing less than 10% phase separation and preferably, less than 5% phase separation of single, individual, pure metal oxide species, e.g., less than 10% pure ceria and/or zirconia.

The mixed-metal-oxide crystallite promoter compositions of the present invention are thus characterized as uniform, substantially homogeneous lattice structures, generally of a size in which the average crystal particle measures less than about 100 Å in its longest dimension, more often 50 Å or less and even as small as 35 Å. Each crystallite further exhibits the characteristics of a single primary metal oxide crystal, preferably $CeO_2$, or $ZrO_2$, that has been doped with predetermined amounts of one or more secondary metal ions. Although almost any metal ion could serve as a secondary metal ion, the preferred metal ions are those metal ions having an ionic radius approximately the same size as the primary metal ions, $Ce^{+4}$ and $Zr^{+4}$.

By doping the crystalline oxide of the primary metal (either cerium or zirconium) with one or more secondary metals, the efficiency and effectiveness of exhaust conversion catalyst promoters based on ceria and/or zirconia can be enhanced. Thus, mixed-metal-oxide promoter compositions containing a primary metal and one or more secondary metals can be used not only to improve the efficiency of exhaust conversion catalysts over those containing only the primary, single metal oxide, but also to reduce the total amount of any given primary metal required to achieve the same degree of catalyst promotion.

The manner of depositing the metal oxides on the supports has been found to be critically important in determining the size and degree of clustering of the resulting crystallites. To produce the highly dispersed, highly uniform, and highly homogeneous stabilized mixed-metal-oxide promoters in accordance with this invention, the depositing reagent should comprise an organic compound or combinations thereof that have the following essential characteristics:

the organic depositing reagent should be soluble (or at least highly compatible) in a given solvent or solvent system with the promoter metal compounds or precursors used to form a desired mixed-metal-oxide promoted support;

the organic depositing reagent employed with the promoter metal compounds or precursors should inhibit or prevent premature or differential precipitation during the drying process;

the organic depositing reagent must be capable of complexing with, interacting with, or bonding to the promoter metal compounds or precursors to render the solution homogeneous and to inhibit separation, segregation and aggregation of the promoter metal compounds or precursors in the solvent or solvent system;

The organic depositing reagent should be able to be coated on a relatively high surface area substrate as a film within which the metal ions are homogeneously dispersed;

the organic depositing reagent should form a matrix-like structure upon concentrating from loss of solvent and/or drying in which the promoter metal compounds or precursors maintain the homogeneous distribution;

the organic depositing reagent should decompose substantially completely upon continued heating to temperatures at which the metal compounds calcine and form oxides leaving little or no carbon residue.

The increased dispersion uniformity, reduced crystallite size, and improved homogeneity are major advantages of this invention and clearly translate into improved catalyst performance and long term stability.

The promoted exhaust conversion catalyst supports made according to the present invention are produced by a method that in its broadest form includes the following: a suitable solution is first developed containing two or more metal compounds and at least one appropriate organic depositing reagent in a suitable solvent. In such depositing solutions, the metal compounds will generally comprise about 1 to about 30 wt. %, the organic depositing reagent will generally comprise about 2 to about 60 wt. %, with solvent making up the remainder. As solvents, water is preferred and can be used in most instances. However, the use of other solvents, such as alkanols (i.e., alcohols), acetone, tetrahydrofuran (THF) and the like may be necessary, depending on the particular metal compounds and organic depositing reagent employed.

The depositing agent is then brought into intimate contact with the desired support or its precursor (that is, a material which upon exposure to heat under appropriate conditions will form the oxide). In this disclosure the term "support" and "support material" are used interchangeably to refer to the substrate on which the mixed-metal oxides of this invention are deposited and will include precursor compounds which form the support in situ upon heating. The depositing reagent-support mixture (generally a slurry) is then dried to concentrate the depositing agent on the support. In the process of drying and concentrating, the depositing reagent forms a metal compound-organic reagent matrix or film uniformly distributed on the surface of the support having the metal compounds uniformly and homogeneously distributed therein.

The support wit the matrix deposited thereon can then be subjected to post-deposition treatments such as drying and calcination. During the post-deposition processing, the organic reagents are combusted and the promoter metal compounds or precursors generally convert to their corresponding metal oxides. The result is a finely dispersed and homogeneous mixed-metal-oxide material disposed on the support in a pattern generally corresponding to the distribution of the metal compounds in the matrix prior to drying and/or calcining. Such homogeneous, small crystallite-sized, mixed-metal-xide phases have unique and desirable applications in exhaust conversion catalysts.

The combining step can be an impregnation step or a coating step depending on the extent of coverage desired.

According to the present invention highly effective catalyst supports for improved exhaust conversion catalyst performance can be produced in a single step by impregnating, contacting, and/or coating an appropriate support material with a depositing agent (preferably a solution) containing two or more metal compounds or salts and a matrix-forming organic material. The contacting step may be done by allowing the support material to absorb as much solution as it will and then separating or evaporating the excess or by using the incipient wetness procedure familiar to those skilled in the art. As the solution becomes more concentrated during the drying process, the organic reagent forms a thin, substantially uniform matrix or film in which the metal salts are uniformly and homogeneously distributed.

In either contacting process, the support material with the matrix thereon will then generally be dried and calcined at a temperature between about 500° C. to about 700° C. or higher. Calcination can occur either in air or in an atmosphere of oxygen in an inert gas until the metal compounds that have been dispersed over the surface of the support are converted to their oxides. On the finished support, the amount of mixed-metal-oxide promoter is sufficient to cause the desired activity and may be as high as about 60 wt. % based on the weight of the support, but preferably the content will be from about 10 to about 40 wt. % based on the weight of the support.

Exhaust conversion catalysts made with the promoted supports of the present invention, when analyzed, show exceptionally small, homogeneous crystallites of the mixed-metal oxide essentially uniformly dispersed on the catalyst support. The properties of the mixed-metal-oxide crystallites of this invention were determined by X-ray diffraction (XRD), transmission electron spectroscopy (TEM), and temperature programmed reduction (TPR) analysis. The analysis results generally showed that catalyst supports prepared by the methods of this invention have very thin outer layers of uniformly and well dispersed homogeneous crystallites, generally of a size averaging 100 Å or less, more often 50 Å or less and even as small as 35 Å or less, as measured by X-Ray diffraction (XRD) and transmssion electron spectroscopy (TEM). The very small size, homogeneous crystalline nature and uniform dispersion of the mixed-metal-oxide-promoted supports of this invention provide superior catalyst performance.

The ceria rich and/or zirconia rich mixed-metal-oxide promoters that can be prepared by the procedures of this invention, include, without limitation, Ce- and/or Zr-oxide promoters modified with one or more secondary metal ions. TPR analyses of catalyst samples containing ceria-rich mixed-metal-oxide promoters, which show oxygen storage properties, prepared using the procedure of this invention show large enhancements of the ceria surface reduction after aging and several preparations have been shown to give large performance advantages after engine dynamometer aging, especially, where supports such as $\gamma$-$Al_2O_3$ are used.

Suitable secondary metal ions used with ceria or zirconia are those metal oxides capable of forming mixed oxides and which stabilize the ceria or zirconia crystallites from aggregation and thermal surface area reduction and result in improved promoters for use in exhaust conversion catalysts. Preferred secondary metal ions have ionic radii near the ionic radius of $Ce^{4+}$ or $Zr^{4+}$. Such secondary metal ions preferably have ionic radii between about 20% less than the radius of $Ce^{4+}$ or $Zr^{4+}$ and about 50% higher than the radius of $Ce^{4+}$ or $Zr^{4+}$.

Suitable secondary metal ions that can stabilize and promote cerium oxide include, without limitation, ions of the metals Zr, La, Mn, Hf, Re, Pr, Nd, Sm, Gd, Dy, Y, Yb, Th, Sr, Ca, and ions of other metals having ionic radii between about 0.75 Å and about 1.35 Å (with ionic radii between about 0.80 Å and about 1.30 Å being particularly preferred), or mixtures thereof. The preferred secondary metal ions for stabilizing cerium oxide are ions of Zr, La, Mn, Pr, or mixtures thereof.

Suitable secondary metal ions that can stabilize and promote zirconium oxide include, without limitation, ions of the metals Ce, La, MA, Hf, Re, Pr, Nd, Sm, Gd, Dy, Y, Yb, Th, Sr, Ca, Fe, Co, Ni, and oxides of other similar metals with ionic radii between about 0.65 Å and about 1.20 Å, or mixtures thereof The preferred secondary metal ions for stabilizing zirconium oxide are ions of Ce, La, Mn, Pr, or mixtures thereof.

It should be recognized that these secondary metal ions substitute for either $Ce^{+4}$ or $Zr^{+4}$ sites in the pure cerium or zirconium oxide lattice. The method of the present invention provides for substitution to occur during oxide formation from the organic matrix encasing the precursor metal species and not through post formation ion substitution.

The preferred composition of the mixed metal oxide compositions of the present invention will be somewhat dependent on the precious metal(i.e., Pt, Pd or Rh) to be promoted. For Rh, for example,Zr-rich binary compositions are preferred. In binary compositions containing Ce and Zr, the Ce mole % content should be in the range of 5–20 mole % and the Zr content in the range of 80–95 mole %. For ternary mixed oxide compositions, the preferred Zr content will be in the range of 80–95 mole %, the Ce content in the range of 5–20 mole % and the third component in the range of about 1–10 mole %. These same preferred mixed oxide compositions can also be effectively used to promote Pt and Pd catalyst compositions.

However, high Ce content compositions are generally preferred only for use in Pt or Pd catalyst compositions due to negative interactions that tend to occur with Rh. In such high Ce content compositions, the preferred Ce content is in the range of 45–90 mole % and the Zr content is in the range of 10–55 mole %. For ternary systems, the optimum compositions will also have Ce in the range of 45–90 mole % and Zr in the range of 10–55 mole %, with the third component being in the range of about 5–20 mole %.

For both Zr-rich and high Ce content compositions, the preferred third components are La, Pr, Dy, Sm, Gd, Y, Yb, Th, Ca and Sr, with La and Pr being particularly preferred.

Suitable metallic compounds that are usable as precursor compounds to form the mixed-metal-oxides of the present invention include without limitation, nitrates, acetates, halides (preferably chlorides), sulfates, sulfites, bisulfites, phosphates, phosphites and mixtures thereof.

The most important characteristic of a suitable organic depositing reagent according to the present invention is that it forms a viscous, fairly rigid, molasses-like gel during the subsequent evaporation or drying step during which the solvent is removed, and that this gel remains on the support material in the form of a rigid film up to the point at which it decomposes and is combusted during the subsequent calcination step. Therefore, any organic compound that exhibits these physical characteristics should be effective. Compounds that tend to remain liquid when heated above room temperature or which evaporate relatively quickly when heated will generally not be effective. In addition to the physical characteristics indicated, it is also important that the reagent selected be generally compatible with the particular salts of the metal oxides employed, in the sense that they do not cause or promote precipitation of the salts from solution before the matrix of the gel forms.

It is thought that these organic depositing reagents serve a number of positive functions. First, in their absence, the metal compounds typically precipitate out of solution at different rates during the drying process and, thus, tend to segregate on the carrier surface. Subsequent calcinalion thus can not give homogenous mixed-oxide phases. However, when an excess of at least one suitable organic reagent, for example sorbitol is present, the metal ions do not precipitate during the drying step.

Second, the preferred organic depositing reagents may initially actually complex with the metal ions and act as a superior chelating agent, holding the metal ions in solution during the drying process and thereby inhibiting ion segregation and aggregation. This process is in turn thought to maintain homogeneity by preventing premature and differential precipitation and/or wicking of the different metals during and after solvent removal. Further, film formation can be enhanced by using supports which have hydroxylated or polar surfaces such as alumina, silicas, silicaluminas, aliminosilica, zeolites, etc. Interactions such as hydrogen bonding between the organic reagents and the support surface will help in the formation of a rigid film uniformly dispsersed on or coating the support surface.

Third, as the drying or concentrating process continues, the solution of organic depositing reagent and metal salts appears to form a matrix within a thin coating or film on the surface of the support material. Within this matrix, the metal ions are thought to be highly, and possibly even atomically, dispersed in a random fashion, i.e., the metal ions are trapped and homogeneously intermixed, which is an ideal precursor state for homogeneous mixed oxide formation. The film matrix integrity is thought to be maintained through inter-molecular hydrogen bonding between the organic reagent molecules, the metal ions and hydroxy groups that form on the surface of the support material as it is heated. It should be evident, therefore, that the best organic depositing reagents for use in this invention will be compounds that tend to promote hydrogen bonding.

Upon calcination, the preferred organic depositing reagents are decomposed as their substituants oxidize, thus leaving the metal ions that were present within the matrix essentially as they were and available to form the highly dispersed mixed-metal-oxide crystallites. High dispersion here is defined as a morphology consisting of small crystallites of mixed-metal-oxide that are dispersed with little or no clustering.

One group of compounds that have been found to be particularly effective as organic depositing agents comprises straight chain organic compounds that contain at least two hydroxy and/or carboxylic acid groups, and preferably at least three hydroxy and/or carboxylic acid groups, and more particularly, more than four hydroxy and/or carboxylic acid groups. It has been found that when the soluble metal salts used are acetates, the preferred organic depositing reagent is a polyol, a sugar or a saccharide, or a mixture thereof, with polyols, such as mannitol and sorbitol, being particularly preferred and d-sorbitol being especially preferred. When using nitrate salts to form the solution, the preferred organic depositing reagent is a polyol, a hydroxy-carboxylic acid, a sugar or a saccharide, or a mixture thereof, with polyols and hydroxylated carboxylic acids being particularly preferred and citric acid, tartaric acid, sorbitol, and/or mannitol being especially preferred.

Especially preferred organic depositing reagents include linear, branched or cyclic polyfunctional organic reagents where the functionality is a hydroxy or carboxy group. Such polyfunctional organic reagents generally have one hydroxy and/or carboxy group attached to a majority of the carbon atoms (over 50%) and preferably one hydroxy or carboxy group attached to each carbon atom. The presence of polyfunctionality is thought to maximize inter-molecular hydrogen bonding. Additionally, linear polyfunctional organic reagents are the most preferred because these molecules are freely rotatable around each C—C bond and can accommodate an endless variety of conformations for optimum intermolecular interactions between the organic reagents, the metal compounds and the support surface. The intermolecular interactions include hydrogen bonding interactions, electrostatic interactions, dipole-dipole interactions, polarizability and hyperpolarizability interactions, and other attractive intermolecular interactions.

Examples of suitable hydroxy-carboxylic acids include, without limitation, citric, tartaric, lactic, malic, malonic, succinic acids, and the like. Appropriate amino acids will include, without limitation, glutamic acid, threonine, serine, asparagine, glutamine, aspartic acid, lysine, arginine, histidine, cysteine and the like. Suitable polyols include, without limitation, sorbitol, mannitol, oligomers of vinyl alcohol, and the like and sugars, saccharides, and/or polysaccharides such as glucose, ribose, galactose, fructose, erythrose, threose, arabinose, xylose, erythrose, ribulose, xylulose, psicose, maltose, lactose, sucrose, raffinose, melezitose, and other C5 and C6 sugars, and the like, and derivatives of such sugars such as n-acetylmuramic acid. Of course, mixtures of any of these compounds can be used as well. For effective formation of the mixed-metal oxides and for good dispersion on a support, the mole ratio of organic reagent to total promoter metal ion concentration will preferably be about 2 or higher. It should be noted that many of these organic depositing reagents are optically active, but the optical isomer used is generally not relevant.

In summary, the inventor has found that exceptional catalyst supports containing ceria rich or zirconia rich mixed-metal-oxide promoters can be prepared using a single step impregnation procedure where extensive doping of the $CeO_2$ or $ZrO_2$ lattice with secondary metal ions occurs.

Using these preparation procedures, high secondary metal doping levels (Zr in ceria or Ce in zirconia) can be routinely achieved. Attempts to prepare similar promoted supports by other methods, such as by precipitation, showed that comparable Zr doping levels of $CeO_2$ could not be achieved. It has been further found that the processes of this invention are very effective at preparing tri-metal mixed-metal-oxide promoted supports.

Suitable support materials for use in the present invention include, without limitation, alumina, silica, silica-alumina, alumina-silicates, and combinations or mixtures thereof. Preferred support materials are aluminas, with particularly preferred support materials being the gamma, theta, and delta forms of alumina. These support materials typically have surface areas between about 50 and about 300 $m^2/gm$. For use as a washcoat with monoliths, support materials such as alumina will have an average particle size in the range of about 1 $\mu m$ to about 50 $\mu m$. Such powdered support materials will have mixed-metal oxides and precious metals deposited thereon, either before or after the support materials are coated on the monolith. The same techniques could be applied to an inert pellet. Alternatively, a particulate support material with suitable surface area could have the mixed-metal oxides and precious metals deposited directly thereon.

Suitable group VIII metals usable with the supports of the present invention include the precious metals (sometimes abbreviated PM) and metals of the first series transition group i.e., Fe, Co, and Ni. Preferably, metals of the first series transition group are used in combination with one or more precious metals. The first series transition group metals can be used in any of their salt forms such as halides, acetates, carboxylates, amines, and the like. The precious metals of the Periodic Table Group VIII elements are platinum, palladium, rhodium, ruthenium, osmium or iridium, particularly platinum, palladium, and rhodium., either alone or in combinations, with platinum-rhodium or palladium-rhodium being preferred combinations. The amount of Group VIII metals employed preferably will be about 0.01 to about 4 wt. % based on the total weight of the support, preferably about 0.05 wt. % to about 2.0 wt. %.

The Group VIII metals are applied to the support by depositing and decomposing a Group VIII metal compound on the support. Examples of precious metal compounds include, without limitation, chloroplatinic acid, ammonium chloroplatinate, hydroxy disulfite platinum (II) acid, bromoplatinic acid, platinum nitrate, platinum tetrachloride hydrate, dinitrodiamino platinum, sodium tetranitroplatinate, platinum tetramine salts, rhodium trichloride, hexaamminerhodium chloride, rhodium carbonylchloride, rhodium trichloride hydrate, rhodium nitrate, sodium hexachlororhodate, sodium hexanitrorhodate, chloropalladic acid, palladium chloride, palladium nitrate, diamminepalladium hydroxide, tetraamminepalladium chloride, hexachlorideiridate (IV) acid, hexachloroiridate (III) acid, dichlorodihydrooxoiridate (III) acid, ammonium hexachloride iridium (III), ammonium aquohexachloroiridate (IV), tetraamminedichloroiridate (III) chloride, and aquotetaammineiridate (III) chloride, ruthenium tetrachloride, hexachlororuthenate, ruthenium nitrosylchloride and hexaammineruthenium chloride. Preferred compounds would be chloroplatinic acid, platinum nitrate, rhodium chloride, rhodium nitrate, chloropalladic acid, hexachloroiridate (IV) acid, palladium nitrate, hexachlororuthenate, and the like or mixtures thereof The noble metals may be applied separately or in combination, but typically they will be in a common solution which is used to impregnate the support, by techniques familiar to those skilled in the art. After being deposited, the noble metal compounds will be decomposed by calcining at a temperature of about 500° C. to about 700° C., thus leaving the metals or their oxides on the support.

Besides the mixed-metal-oxide promoters of the present invention, the catalysts of this invention may also contain additional promoters, non-limiting examples of which can include compounds of rare earths such as lanthanum, samarium, and gadolinium, alkaline earths such as barium, strontium and calcium and other metals such as nickel, iron, and manganese, in the form of the halides, nitrates, and acetates, preferably acetates. Such additional promoters may be applied according to methods familiar to those skilled in the art, for example by solution impregnation using compounds which can be decomposed by heat to produce their oxides and washcoating onto a suitable support. After calcining at a temperature of about 500° C. to about 700° C. for about 1 to 12 hours, the promoter elements will be present as their metal oxides. In general, effective amounts of additional promoters will be used, which may vary considerably. Preferably, the amount of additional promoter will be no more than about 1 to about 20 wt. % based on the total weight of the catalyst.

Ceria Rich Mixed-Metal-Oxide-Promoted Catalysts

One embodiment of this invention is the formation of ceria-containing mixed-metal-oxide promoter compositions having exceptionally small crystallites, generally in the order of about 100 Å or less and preferably about 75 Å or less and particularly, about 50 Å or less. Ceria is currently used as a promoter in many, if not most, TWC catalysts. As thus used, it is thought to function as an oxygen storage agent. When employed as a catalyst promoter, ceria is generally deposited on a support, but it can also be used itself as the support The mixed-metal-oxide compositions of this invention can similarly be used directly as the support, but it is preferred to deposit them on a separate support.

In prior art methods, the ceria is generally formed in situ by depositing a solution of one or more cerium compounds, for example as cerium nitrate or acetate in water, on powdered support materials such as alumina The powdered support is then dried and calcined to convert the cerium compound to cerium oxide. Such a procedure typically provides ceria crystallites sized between about 80 and 150 Å, or larger.

The ceria-rich mixed-metal-oxide promoter compositions of this invention are formed from solutions of one or more cerium compounds, one or more secondary metal compounds, and one or more suitable organic reagent depositing agents. In such solutions, the metal compounds will comprise about 1 to about 30 wt. %, the organic reagent material will comprise about 2 to about 40 wt. %, and the solvent will make up the remainder. As solvents, water is preferred but others such as alcohol, acetone, and tetrahydrofuran may be employed where appropriate. This solution is suitably mixed with the desired support material and the entire mixed then heated in air or some other suitable atmosphere in the following sequence: First, the material dries to form a highly dispersed, highly uniform, and highly homogeneous mixture of cerium-secondary metal compounds in an organic reagent matrix uniformly coating the support. Upon further heating in air the matrix decomposes, leaving a highly dispersed, homogeneous, and uniform mixed-metal-oxide coating deposited on the support material.

The single step method of this invention can be used to prepare ceria-rich mixed-metal-oxide-promoted catalyst supports such as Zr-doped ceria on γ-Al$_2$O$_3$. Analysis of samples of such supports prepared using the procedure of this invention show significant enhancement of CeO$_2$ reducibility after aging, thereby making more oxygen available for the resulting catalyst. Several preparations have been shown to give significant performance advantages after engine dynamometer aging.

When ceria-containing mixed-metal oxides are formed on a support in accordance with this invention, uniform distribution, small scale homogeneity and small crystallite sizes of the ceria-rich mixed-metal-oxide promoters (i.e., ceria comprises greater than 50 mole % of the mixed metal oxide) are observed in both the resulting support and the final exhaust conversion catalyst. The uniform distribution, small crystallite size and small scale homogeneity of the ceria-rich, mixed-metal oxides appear to provide superior catalyst performance.

Binary Mixed-Metal-Oxide Systems

Commercial Ce,Zr mixed oxide materials are available from companies such as Santoku Mining Company. These materials, when incorporated into Pt,Rh catalysts, showed performance advantages after severe dynamometer aging. However, the performance advantages were only observed for materials that contained ≧10 wt. % Zr as shown in FIGS. 1 and 2.

FIGS. 1 and 2 compare the A/F traverse performance at 450° C. and GHSV=30K, after 75 hours of fuel-cut aging, of a conventional ceria-promoted catalyst (designated Pt,Rh/Ce/γ-Al$_2$O$_3$) with two ceria, zirconia promoted catalysts formed using the Santoku Ce,Zr materials. One catalyst was prepared using the Santoku material containing 10 wt. % Zr (designated Pt,Rh/Ce,Zr/γ-Al$_2$O$_3$/10 wt. % Zr); while the other catalyst used the Santoki material containing 23.7 wt. % Zr (designated Pt,Rh/Ce,Zr/γ-Al$_2$O$_3$/23.7 wt. % Zr). Stoichiometric performance advantages appeared only for the catalyst containing the higher amount of zirconium, i.e., the Pt,Rh/Ce,Zr/γ-Al$_2$O$_3$/23.7 wt. % Zr catalyst (FIG. 2).

Characterization of these commercial materials using X-Ray diffraction (XRD) showed that the Zr doping level of the CeO$_2$ lattice was appreciably lower than the nominal Zr content. In the case of the commercial Santoku material used to prepare the Pt,Rh/Ce,Zr/Al$_2$O$_3$/23.7 Wt. % Zr catalyst (Ce/Zr mole ratio near 2/1), the Zr doping level was only 11 atom % based on the lattice parameter measurement as compared to the nominal value of about 32 atom %. After engine-aging, the Zr doping increased to about 18 atom %. It will be shown that the preparation procedures of the present invention give Zr doping levels of up to 33 atom %, even when the mixed-metal oxides are prepared in the presence of alumina.

Additionally, the catalyst systems made with the commercial Santoku materials have been shown to have an enhanced low temperature CeO$_2$ reduction feature at about 225° C. as shown in FIG. 3. These enhancements are thought to be the result of Zr doping of the CeO$_2$ lattice.

Figure 4:
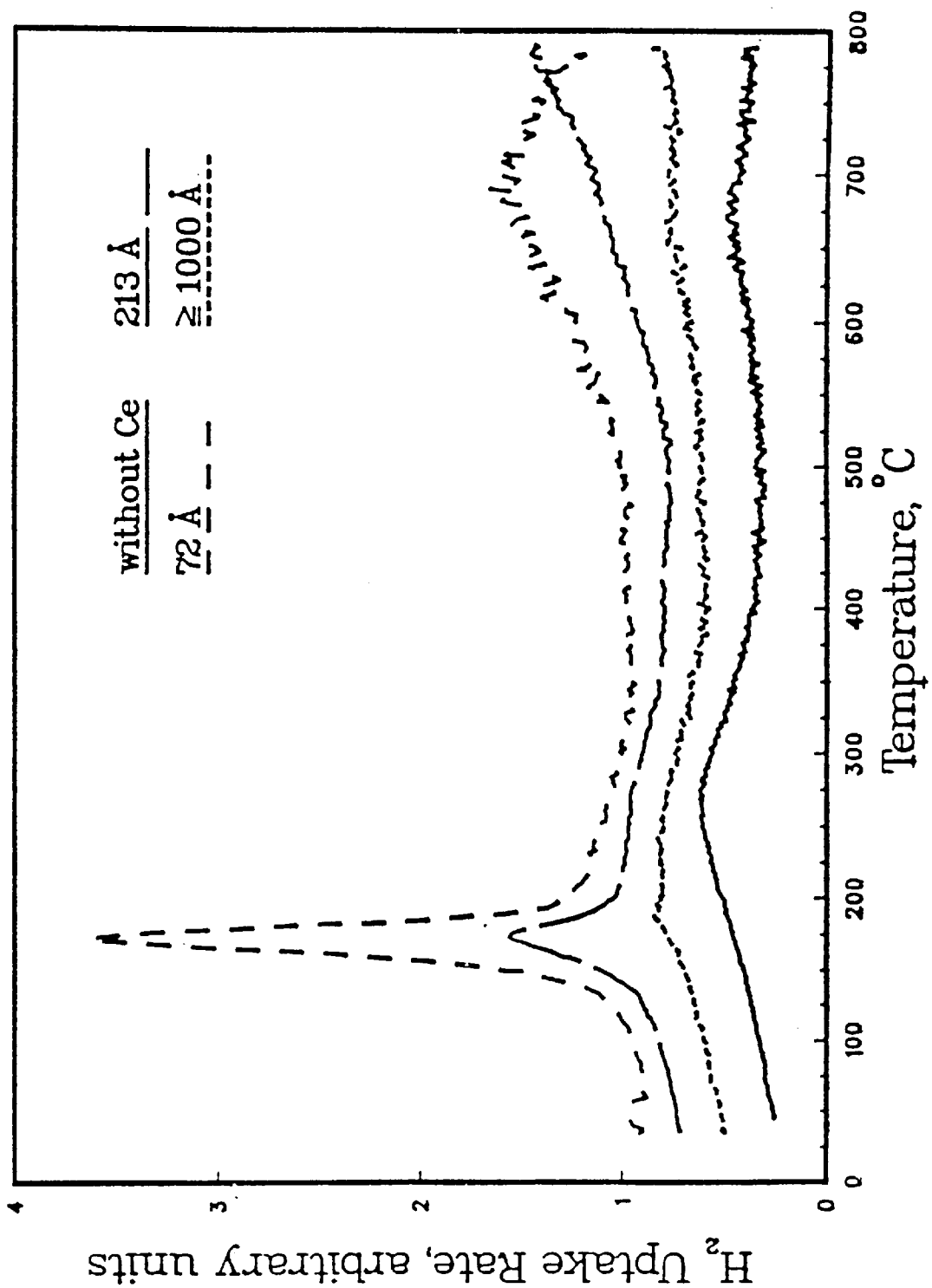
FIG. 4 is a series of TPR spectra that show an increase in the intensity of the low temperature reduction peak with decreasing $CeO_2$ crystallite size.

It is known that decreasing ceria crystallite size enhances ceria reduction in exhaust catalysts as is described in U.S. Pat. No. 5,064,803, incorporated herein by reference and summarized in FIG. 4. In the present invention, further low temperature reduction performance enhancements are achieved by preparing supported mixed-metal-oxide promoters having both high dispersion and substantial homogeneity using one or more organic reagents. The inventor has found that these additional catalyst performance enhancements result from an unexpected synergistic increase in CeO$_2$ reduction features induced by secondary-metal-doping of ceria.

Teary Mixed Metal Oxide Systems

In the case of binary mixed-metal oxides of Ce and Zr, it has been observed that the limit of Zr doping of the CeO$_2$ lattice in accordance with this invention is between about 30 to about 35 atom % Zr. Higher loadings are thought to be more difficult to achieve because the increased doping results in lattice strain due to the smaller Zr ion. The converse also occurs for Ce doping of zirconia where the Ce doping has a practical limit of about 35 atom % Ce. However, it has been found that this limitation can be overcome for zirconium-doped cerium oxide by the inclusion of a third metal ion of appropriate ionic radius. Thus, tri-metal ceria-rich mixed-metal oxides, have been prepared containing CeO$_2$ doped with Zr and a third metal ion that allows for increased amounts of Zr doping. For a predominantly ceria-based cubic crystal structure, the third metal ion can be any metal ion having a ionic radius in the range of about 0.75 to about 1.35 Å. Such metal ions include rare earth metal ions such as La$^{3+}$ (1.061 Å), Pr$^{3+}$ (1.013 Å), Nd$^{3+}$ (0.995 Å), Sm$^{3+}$ (0.964 Å), Gd$^{3+}$ (0.938 Å), Dy$^{3+}$ (0.908 Å), Y$^{3+}$ (0.893 Å) and Yb$^{3+}$ (0.858 Å). Other metal ions such as Th$^{4+}$ (1.02 Å), Sr$^{2+}$ (1.12 Å) and Ca$^{2+}$ (0.99 Å) appear also to be effective. To enhance Ce doping of zirconium oxide crystals, the third metal ion should have ionic radii between about 0.65 Å and about 1.2 Å.

X-Ray diffraction (XRD) analysis and/or high resolution transmission electron spectroscopy (TEM) analyses were used to evidence the formation of tri-metal mixed-metal oxides. Mixed-metal oxide formation can be inferred from X-Ray diffraction (XRD) analysis by measuring the ceria or zirconia lattice parameter or unit cell size and the absence of phases associated with the pure dopant ions after high temperature treatments. The presence of all three metals is indicated by tranmission electron spectroscopy (TEM) using EDS analysis of the mixed-metal-oxide particles where all three metals are detected.

Just as in the case of the binary mixed-metal oxide systems, supported and unsupported tri-metal mixed-metal oxides can be prepared in accordance with the methods of this invention. Preferred supports are high surface area supports such as alumina. The supported tri-metal mixed-metal oxides are characterized by uniform, highly dispersed, and substantially homogeneous crystallites or domains on the support. Preparation of a highly dispersed mixed-metal oxide is achieved by the inclusion of at least one organic reagent during the metal salt deposition step. Typically the organic reagent is added to a solution of Ce,Zr and the third metal ion (such as La, Y, Nd, and Pr; alkaline earths such as Ba, Ca, Sr, Mg and transition metals such as Mn and Ti). To give the mixed-metal oxides supported on alumina, the resulting mixture is then combined with boehmite or γ-Al$_2$O$_3$ to give a uniform slurry which is dried and calcined at a temperature greater than 500° C.

Characterization of Mixed-Metal-Oxide Containing Supports and Catalysts

A number of different methods can be used to characterize the supports and catalysts of the present invention. Among these methods, X-Ray diffraction (XRD) measurements have proved very effective in probing the effect of Zr doping of the CeO$_2$ lattice for aged catalysts. X-Ray diffraction (XRD) analysis of aged Zr-doped CeO$_2$ catalysts showed that extensive doping of the CeO$_2$ lattice had occurred. For several samples the Zr doping level was equal to the nominal Zr content, indicating that the preparation procedures of the present invention are very effective in generating mixed oxides of Zr and Ce.

X-Ray diffraction (XRD) was used to measure the phase composition and CeO$_2$ and ZrO$_2$ lattice parameters. From the lattice parameter measurement, the existence and extent of doping of the $CeO_2$ and $ZrO_2$ lattices can be determined or at least surmised. This ability arises because the dopant metal ions generally have an ionic radius that is different from the ionic radius of the primary metal ions. Thus, for Zr-doped $CeO_2$, the ionic radius of $Zr^{4+}$ (0.79 Å) is smaller than that of $Ce^{4+}$ (0.92 Å) and should cause a contraction of the $CeO_2$ lattice and its corresponding lattice parameters; conversely, Ce doped $ZrO_2$ should cause an expansion of the $ZrO_2$ lattice and its corresponding lattice parameters. Since doping and the extent of doping appear to improve the performance of $CeO_2$ and $ZrO_2$, the lattice parameter measurement can be used to verify that doping has occurred and estimate the extent of doping.

Figure 5:
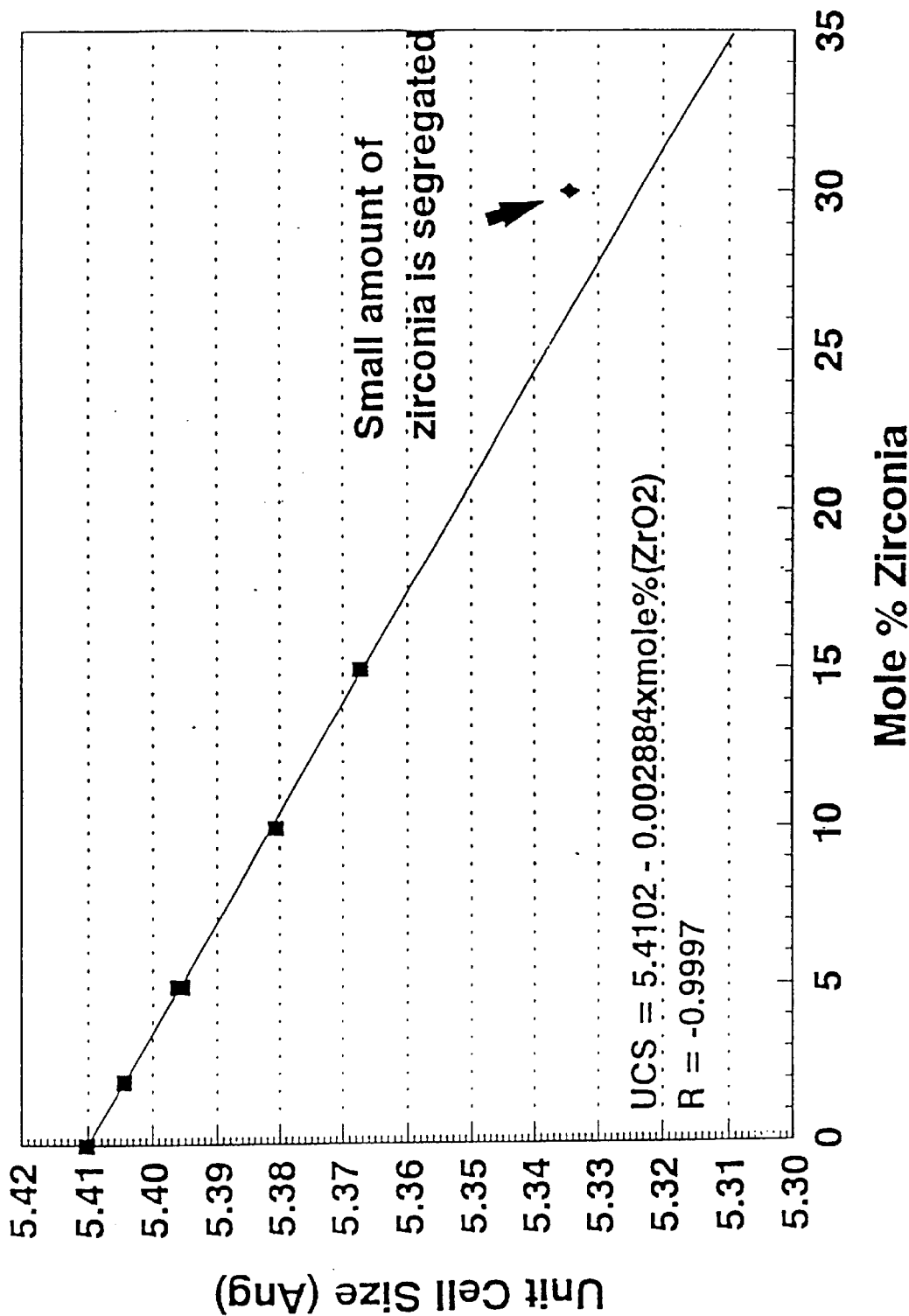
FIG. 5 shows a calibration curve of lattice unit cell size for cerium oxide doped with Zr; as a function of the mole % Zr.
Figure 6:
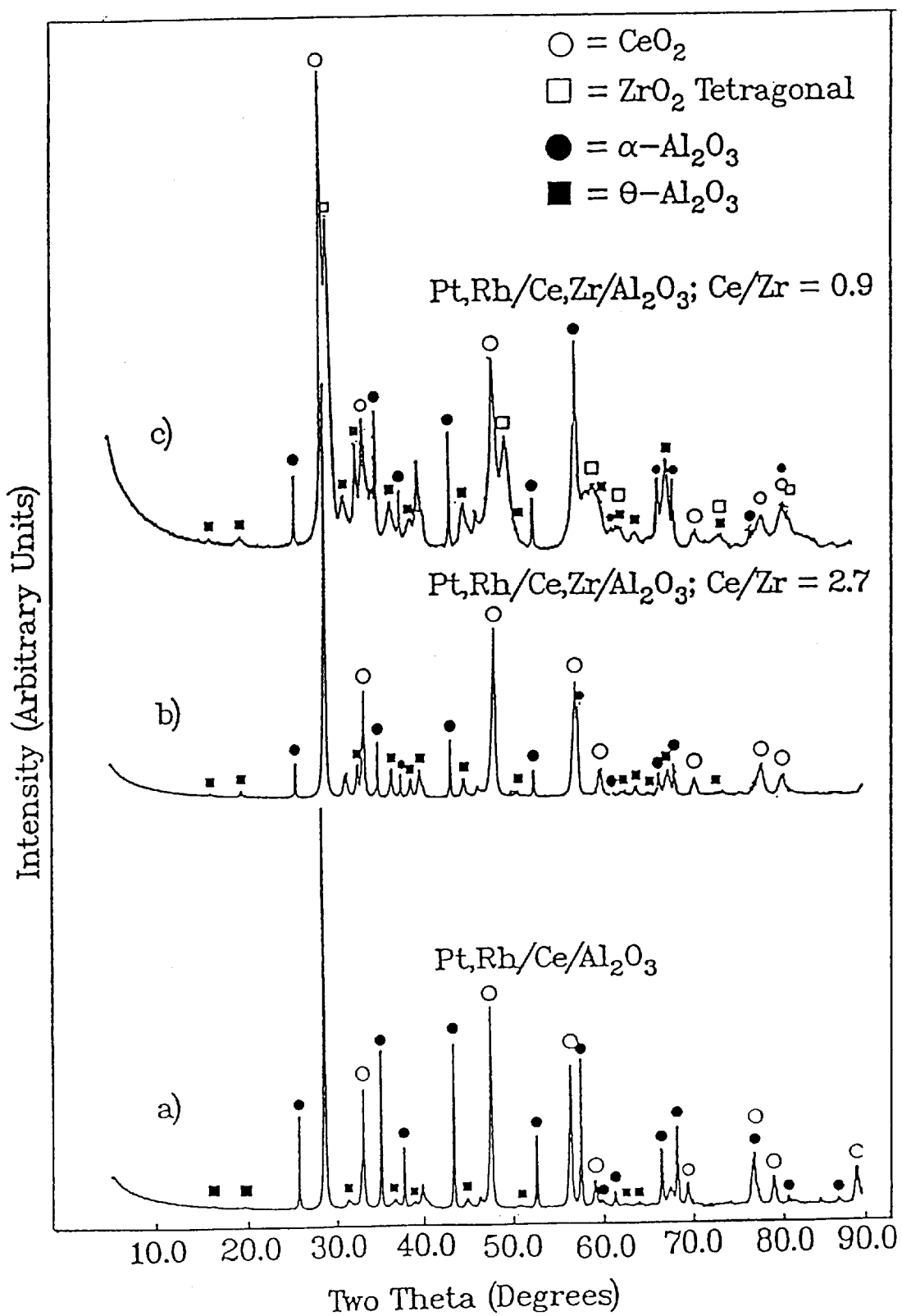
FIGS. 6 and 7 compare the X-Ray diffraction (XRD) patterns of two different Pt,Rh/Ce,Zr/γ-Al$_2$O$_3$ catalysts made according to the present invention, after aging, with a similarly aged prior art Pt,Rh/Ce/γ-Al$_2$O$_3$ catalyst; the blow-up/overlay of FIG. 7 shows a shift to higher 2θ values for the CeO$_2$ peaks for one of the Zr— containing samples at two theta values between 40 and 65 degrees.

A calibration curve was determined for Zr-doped ceria as shown in FIG. 5 that allows accurate determination of the Zr content of $CeO_2/ZrO_2$ mixed-metal oxides based on a measured lattice parameter or unit cell size (UCS) according to equation (1):

$$UCS = 5.4102 \text{ Å} - (0.002884 \times \text{mole \% Zr}) \text{ Å} \quad (1)$$

where 5.4102 Å is the lattice parameter of pure $CeO_2$.

Catalyst Preparation by Evaporative Procedure in a typical preparation according to the present invention, Zr and Ce nitrate salts are dissolved in 300 grams of deionized water. Of course, other suitable Zr or Ce salts can be used as well as other metals besides Ce or Zr or in conjunction with Ce or Zr. Sufficient compatible organic depositing reagent such as citric acid (of course, any other suitable organic reagent can be used in place of citric acid) is then added to the metal salt solution to give a citric acid to metal salt mole ratio of about 2 or higher. 200 grams of $\gamma$-$Al_2O_3$ (or another suitable support) are then added to this solution, and the overall mixture blended for 10 minutes and thereafter evaporated to dryness. The resultant powder is then calcined at 600° C. for 6 hours in 4% $O_2$/96% $N_2$ followed by 1 hour in air at 600° C. The powders are formed into a cake and then sieved to 20–40 mesh and Pt+Rh thereafter added at a loading of 0.8 wt. % and Pt to Rh weight ratio of 5:1. The samples will be finally calcined at 600° C. in air followed by aging at 1140° C. for about 5–7 hours in 10% $H_2O$/90% $N_2$.

In like manner, Ce,Zr/$\gamma$-$Al_2O_3$ samples have been prepared where the composition and the Ce/Zr ratio were varied. For one series of Ce/Zr samples, the total moles of Ce+Zr used in the preparation was kept constant at 0.4 moles and the Ce/Zr mole ratio varied from about 3:1 to about 1:3 (actual ratios used were 2.7, 0.9 and 0.33 to 1.0). Blank $\gamma$-$Al_2O_3$ samples were also prepared in which only Zr and/or Ce was used and in which the amount of Zr and/or Ce used was 0.2 moles. Samples were also prepared where the mixed Zr and Ce nitrate salts were precipitated using the conventional $NH_4OH$ co-precipitation procedure used in the prior art.

Characterization of Catalyst Samples Prepared by Evaporative Procedure of This Invention Effective doping of the base metal oxide lattice (either $CeO_2$ or $ZrO_2$) with the secondary metal ions can be shown by X-Ray diffraction (XRD) analysis of the mixed-metal-oxide-promoted supports and/or catalysts, by:

a) the absence of peaks representing crystalline phases of the pure secondary metal oxides in the X-Ray diffraction (XRD) pattern of these materials;

b) shifting of the 2θ value of the base metal oxide relative to the pure base metal oxide pattern; and c) changes in the lattice parameter (e.g., decreases of the $CeO_2$ lattice parameter in the case of Zr-doped $CeO_2$ mixed-metal oxide and increases of the $ZrO_2$ lattice parameter in the case of Ce-doped $ZrO_2$ mixed-metal oxide).

Figure 7:
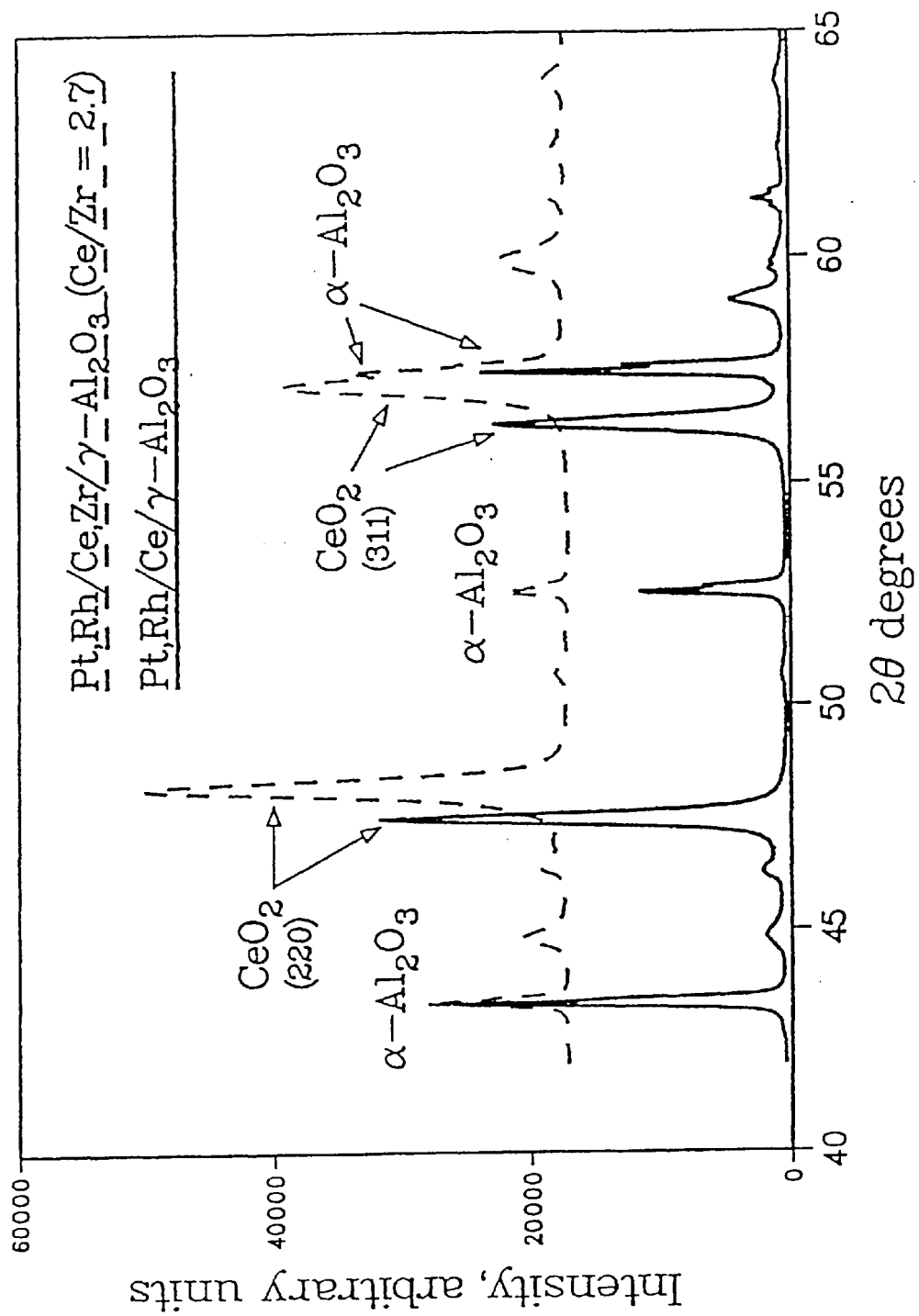

In this regard, reference is made to FIGS. 6–9 of the accompanying drawings. FIG. 6a shows the X-Ray diffraction (XRD) spectrum for an undoped ceria-promoted Pt,Rh catalyst (abbreviated Pt,Rh/Ce/$\gamma$-$Al_2O_3$) after laboratory aging. Inclusion of Zr according to the method of this invention to form a mixed-metal-oxide-promoted Pt,Rh catalyst having a Ce/Zr mole ratio of 2.7 (abbreviated Pt,Rh/Ce,Zr/$\gamma$-$Al_2O_3$ Ce/Zr=2.7), gives rise to the diffraction pattern shown in FIG. 6b. In this sample, there is no evidence for $ZrO_2$ and only peaks assigned to $CeO_2$ are observed. (Peaks shown for $\alpha$-$Al_2O_3$ and $\theta$-$Al_2O_3$ are not important to this discussion except in the sense that they remain in the same 2θ positions in both FIGS. 6a and 6b.) The $CeO_2$ peak positions are shown in FIG. 7 to be shifted to higher 2θ values for the Zr-containing sample, indicating that doping of the $CeO_2$ lattice with Zr has occurred.

Figure 8:
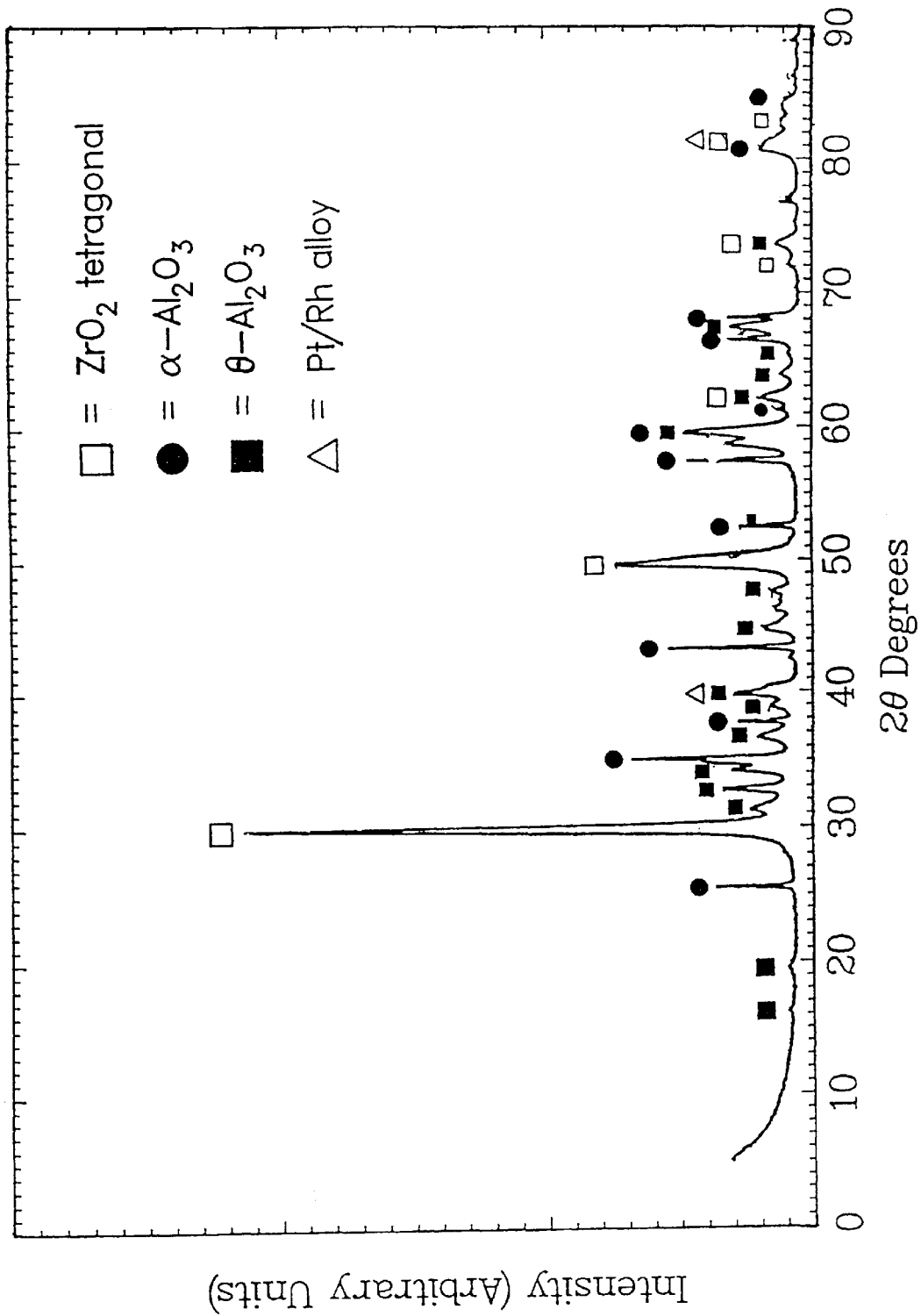
FIG. 8 shows an X-Ray diffraction (XRD) pattern of a Pt,Rh/Ce,Zr/γ-Al$_2$O$_3$ catalyst made according to this invention, after aging, where the ratio of Ce/Zr equals 0.33.

As shown in FIG. 6c for the sample having a Ce/Zr ratio of 0.9 (Pt,Rh/Ce,Zr/$\gamma$-$Al_2O_3$ (Ce/Zr=0.9)), peaks associated with tetragonal $ZrO_2$ were observed. Here the $CeO_2$ peaks are again shifted to higher 2θ values whereas the $ZrO_2$ peaks are shifted to lower 2θ values. Finally, for the sample where the Ce/Zr mole ratio is 0.33 (Pt,Rh/Ce,Zr/$\gamma$-$Al_2O_3$ (Ce/Zr=0.33)), no evidence of $CeO_2$ was observed as shown in FIG. 8. The only phase of $ZrO_2$ detected was the tetragonal $ZrO_2$ phase with the $ZrO_2$ peaks shifted to lower 2θ values. These observations for this sample show that the Ce has doped the $ZrO_2$ lattice.

Figure 9:
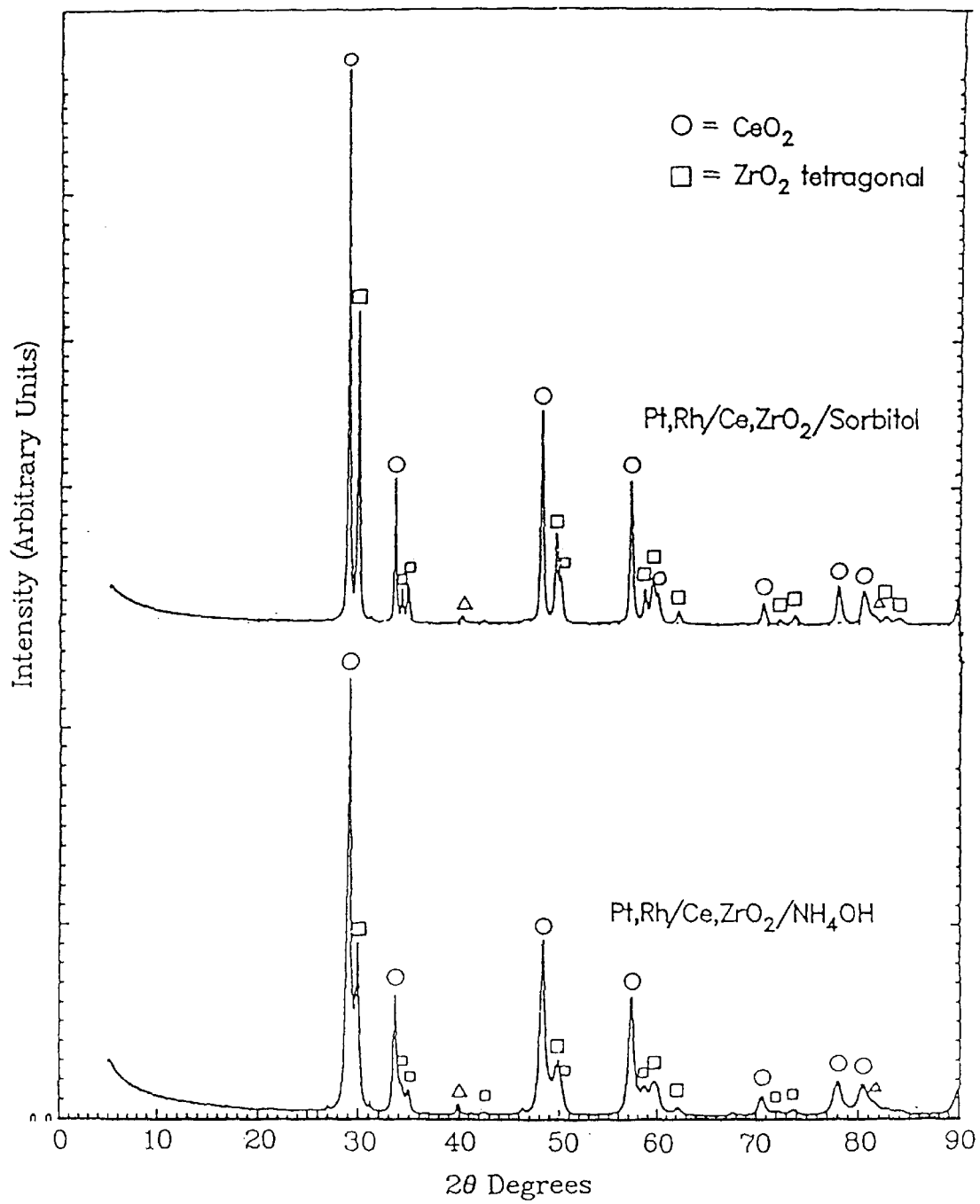
FIG. 9 shows the X-Ray diffraction (XRD) pattern after aging of a Pt,Rh/Ce,Zr catalyst made according to the present invention (using sorbitol as the organic depositing agent). The Ce:Zr ratio was 0.9:1.0.

X-Ray diffraction (XRD) analyses were also performed on laboratory aged samples of Pt,Rh catalysts with mixed-metal-oxide supports prepared by the method of this invention using sorbitol as the organic reagent and the results are presented in FIG. 9. The peaks in the $CeO_2/ZrO_2$ region are similar to those observed for the Pt,Rh/Ce,Zr/$\gamma$-$Al_2O_3$ (Ce/Zr=0.9) catalyst (See FIG. 6c) and there is evidence for the existence of both $CeO_2$ and $ZrO_2$.

Table 1 summarizes the lattice parameter measurements for $CeO_2$ and $ZrO_2$ in those samples where such measurements were possible.

TABLE 1

Measured Lattice Parameters for $CeO_2$ and $ZrO_2$ for the Aged Catalysts

| Catalyst Description | Lattice Parameter (Å) |
| --- | --- |
| Pt,Rh/Ce/$\gamma$-$Al_2O_3$ | 5.414 ± 0.002[1] |
| Pt,Rh/Ce,Zr/$\gamma$-$Al_2O_3$ (Ce/Zr = 2.7) | 5.341 ± 0.005[1] |
| Pt,Rh/Ce,Zr/$\gamma$-$Al_2O_3$ (Ce/Zr = 0.9) | 5.328 ± 0.001[1] |
| Pt,Rh/Ce,Zr/$\gamma$-$Al_2O_3$ (Ce/Zr = 0.33) | 3.639 ± 0.018[2] |
|  | 5.231 ± 0.026[3] |
| Pt,Rh/Ce,Zr (Ce/Zr = 0.9) ($NH_4OH$ method) | 5.337 ± 0.002[1] |
| Pt,Rh/Ce,Zr (Ce/Zr = 0.9) (Sorbitol method) | 5.336 ± 0.001[1] |

[1]$CeO_2$ lattice parameter; The lattice parameter of pure $CeO_2$ is 5.41Å.
[2]$ZrO_2$ lattice parameter a; The calculated lattice parameter of tetragonal $ZrO_2$ a is 3.605Å.
[3]$ZrO_2$ lattice parameter c; The calculated lattice parameter of tetragonal $ZrO_2$ c is 5.180Å.

For all the samples containing Zr, a clear contraction of the $CeO_2$ lattice was observed indicating that the ceria lattice was doped with Zr. Comparing the sample where the Ce/Zr ratio is 2.7 with the sample having a Ce/Zr ratio of 0.9, it is noted that the lattice parameter is smaller in the latter catalyst which is consistent with the higher Zr content in this sample. The calculated Zr content of the $CeO_2$ lattice using equation (1) showed that the Zr content is 24 atom % in the sample having the higher Ce/Zr ratio. For the Pt, Rh/Ce,Zr/$\gamma$-$Al_2O_3$(Ce/Zr=0.9) sample, the X-Ray diffraction (XRD)

measured lattice parameter was consistent with 28.5 atom % Zr in the $CeO_2$ lattice and the X-Ray diffraction (XRD) data also showed a substantial amount of tetragonal $ZrO_2$ being present.

Similar X-Ray diffraction (XRD) results were found for Pt,Rh/Ce,Zr samples having Ce/Zr ratio of 0.9 prepared by the $NH_4OH$ co-precipitation method or the d-sorbitol method of the present invention. These results indicate that the preparation method of this invention yields $ZrO_2$/$CeO_2$ mixed-metal-oxides, either supported or unsupported, via solid state reactions that occur during calcination. From Table 1, it can also be seen that the $ZrO_2$ lattice parameter increases for the sample with Ce/Zr=0.33, indicating Ce doping of the $ZrO_2$ lattice.

Evaporative Procedure Using Acetate Salts

Several catalyst supports were prepared using acetate salts or mixed acetate and nitrate salts. The preparation procedure was similar to that for nitrate salts except that the Ce salt/Zr salt/ organic reagent/$\gamma$-$Al_2O_3$ slurry was milled for two minutes, then poured into a flat ceramic dish and dried in a drying oven at 120° C. for 24 hours. Additionally, preparations with and without at least one organic reagent were carried out to determine if the organic reagent was critical for doping of the $CeO_2$ lattice with Zr.

The lattice parameters measured for several preparations are summarized in Table 2. Also included in Table 2 are the ceria lattice parameters for three preparations using acetate salts/sols of Zr and Ce in the absence of an organic reagent.

TABLE 2

Impact of Including Organic Reagents and Using Different Ce and Zr Salts on the $CeO_2$ Lattice Parameters After Laboratory Aging

| Catalyst Description | Ce/Zr Ratio | Salt | Organic Reagent | $CeO_2$ Lattice Parameter (Å) |
|---|---|---|---|---|
| Pt,Rh/Ce,Zr/$\gamma$-$Al_2O_3$/3:1 | | Acetates | None | 5.386 ± 0.03 |
| Pt,Rh/Ce,Zr/$\gamma$-$Al_2O_3$/1:1 | | Zr Acetate Ce Nitrate | None | 5.40 ± 0.002 |
| Pt,Rh/Ce,Zr/$\gamma$-$Al_2O_3$ | | Acetates | None | 5.409 ± 0.003 |
| Pt,Rh/Ce,Zr/$\gamma$-$Al_2O_3$ | | Acetates | None | 5.414 ± 0.002 |
| Pt,Rh/Ce,Zr/$\gamma$-$Al_2O_3$ | | Acetates | None | 5.405 ± 0.001 |
| Pt,Rh/Ce,Zr/$\gamma$-$Al_2O_3$/1:1 | | Acetates | d-Sorbitol | 5.310 ± 0.006 |
| Ce,Zr/$\gamma$-$Al_2O_3$/3:1 | | Acetates | d-Sorbitol | 5.331 ± 0.002 |
| Ce,Zr/$\gamma$-$Al_2O_3$/0.9:1 | | Nitrates | Citric Acid | 5.320 ± 0.007 |
| Ce,Zr/$\gamma$-$Al_2O_3$/0.9:1 | | Nitrates | Citric Acid | 5.320 ± 0.009 |

The results in Table 2 show that samples made without the inclusion of an organic reagent give Ce,Zr/$\gamma$-$Al_2O_3$ supports in which no doping of the $CeO_2$ lattice with Zr occurs or it occurs only to a very limited extent. For samples made from acetate salts where d-sorbitol was included, there was evidence for contraction of the $CeO_2$ lattice after aging. This was also true for samples made from the nitrate salts using citric acid as the organic reagent which are included for comparison.

Measurements of the Zr content of the $CeO_2$ lattice using equation (1) again shows that the calculated Zr content is close to the theoretical value when the Ce/Zr mole ratio is 3. Thus, for the Ce,Zr/$\gamma$-$Al_2O_3$/3:1 sample, the calculated Zr content was 27.4 atom % as compared to a theoretical value of 25 atom %. For Pt,Rh/Ce,Zr/$\gamma$-$Al_2O_3$/1:1 sample (Ce/Zr mole ratio is 1), the Zr content was found to be 34.7 atom %. Repeat measurements for several other preparations at this mole ratio indicate that 25–40 atom % seems to be an upper limit for Zr doping of $CeO_2$ using the preparation procedures of the present invention. The above results demonstrate that Ce,Zr/$\gamma$-$Al_2O_3$ supports that have extensive Zr doping of the $CeO_2$ lattice can be efficiently prepared provided at least one organic reagent is used.

Table 2 also suggests that the organic reagents inhibit wicking or selective migration of one or more of the metal salts to the surface of the cake during the drying step. This is demonstrated by the last two examples in Table 2 where nitrate salts were used and a sample was analyzed from both the top and bottom of the cake. It is evident that the lattice parameters are identical for both samples.

The foregoing data demonstrate that the use of an organic reagent in the preparation procedures for ceria- or zirconia-containing mixed-metal oxides promotes the formation of highly dispersed mixed-metal-oxide phases even when supported on a high surface area support such as $\gamma$-$Al_2O_3$.

Figure 10:
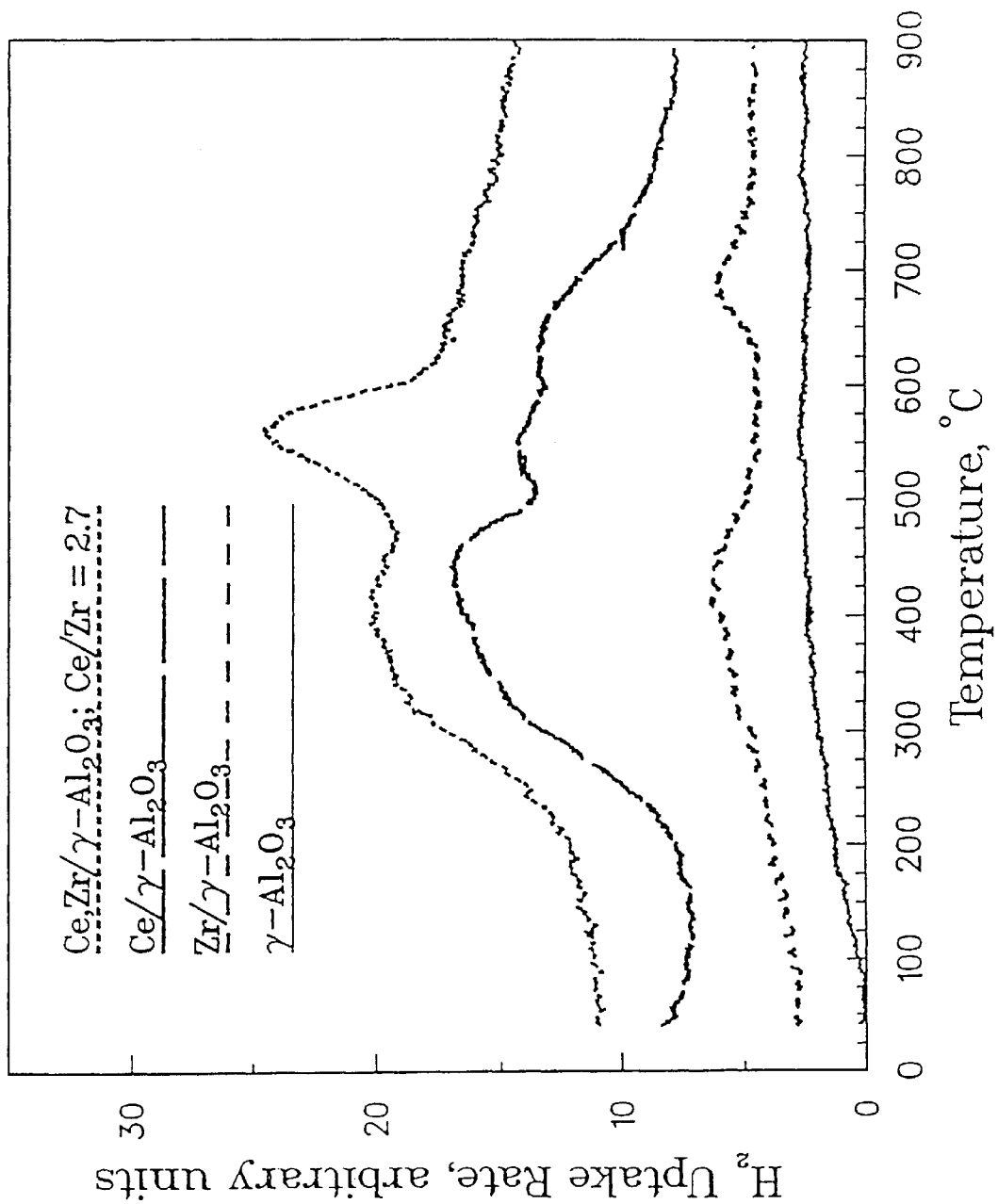
FIG. 10 compares TPR spectra of four freshly made support materials (γ-Al$_2$O$_3$, Ce/Al$_2$O$_3$, Zr/γ-Al$_2$O$_3$, and Ce,Zr/Al$_2$O$_3$ (Ce/Zr=2.7) before Pt and Rh impregnation.
Figure 11:
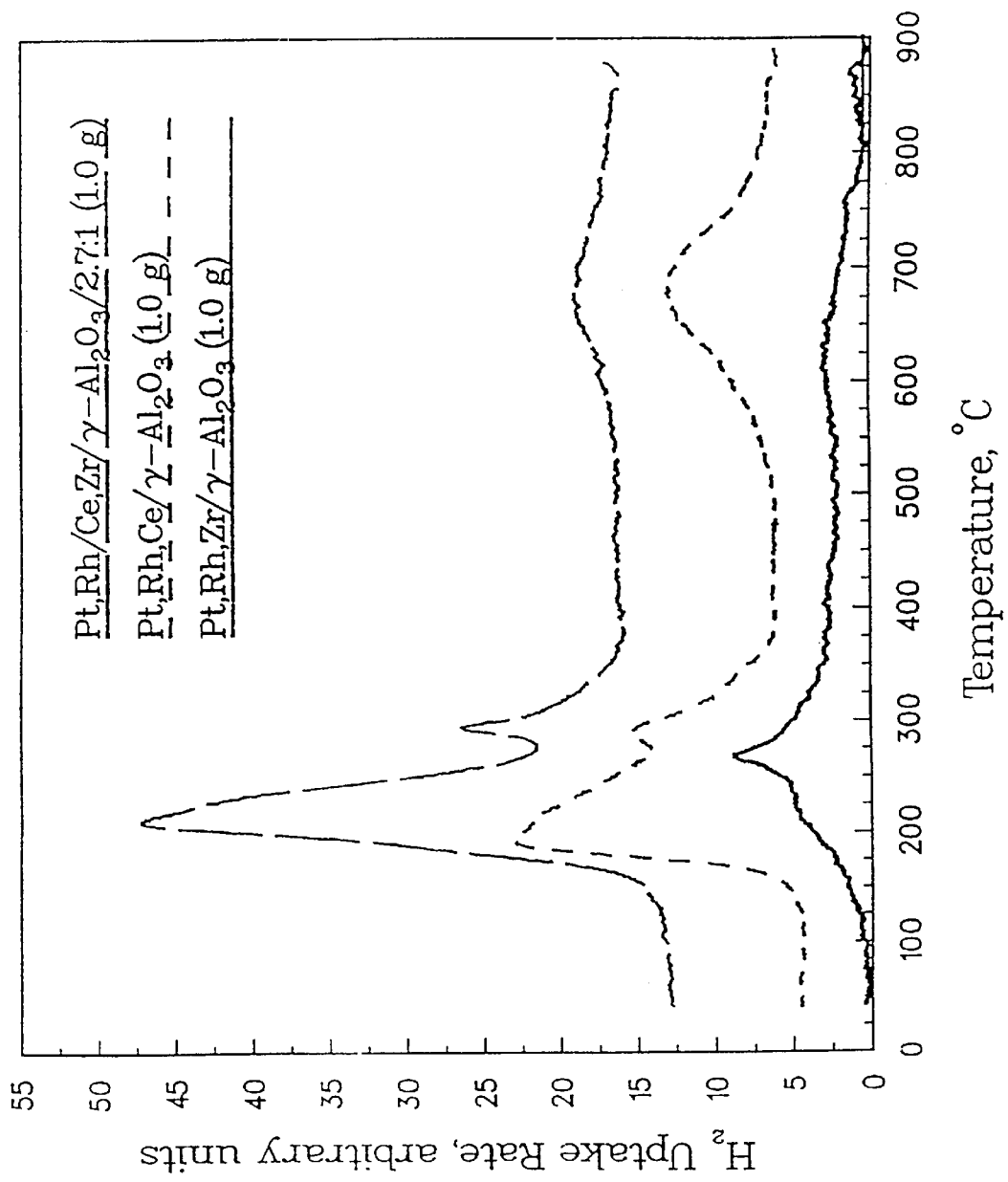
FIG. 11 shows TPR spectra of three fresh Pt,Rh catalysts (Pt,Rh/Ce/γ-Al$_2$O$_3$, Pt,Rh/Zr/γ-Al$_2$O$_3$, and Pt,Rh/Ce,Zr/γ-Al$_2$O$_3$ (Ce/Zr=2.7)
Figure 12:
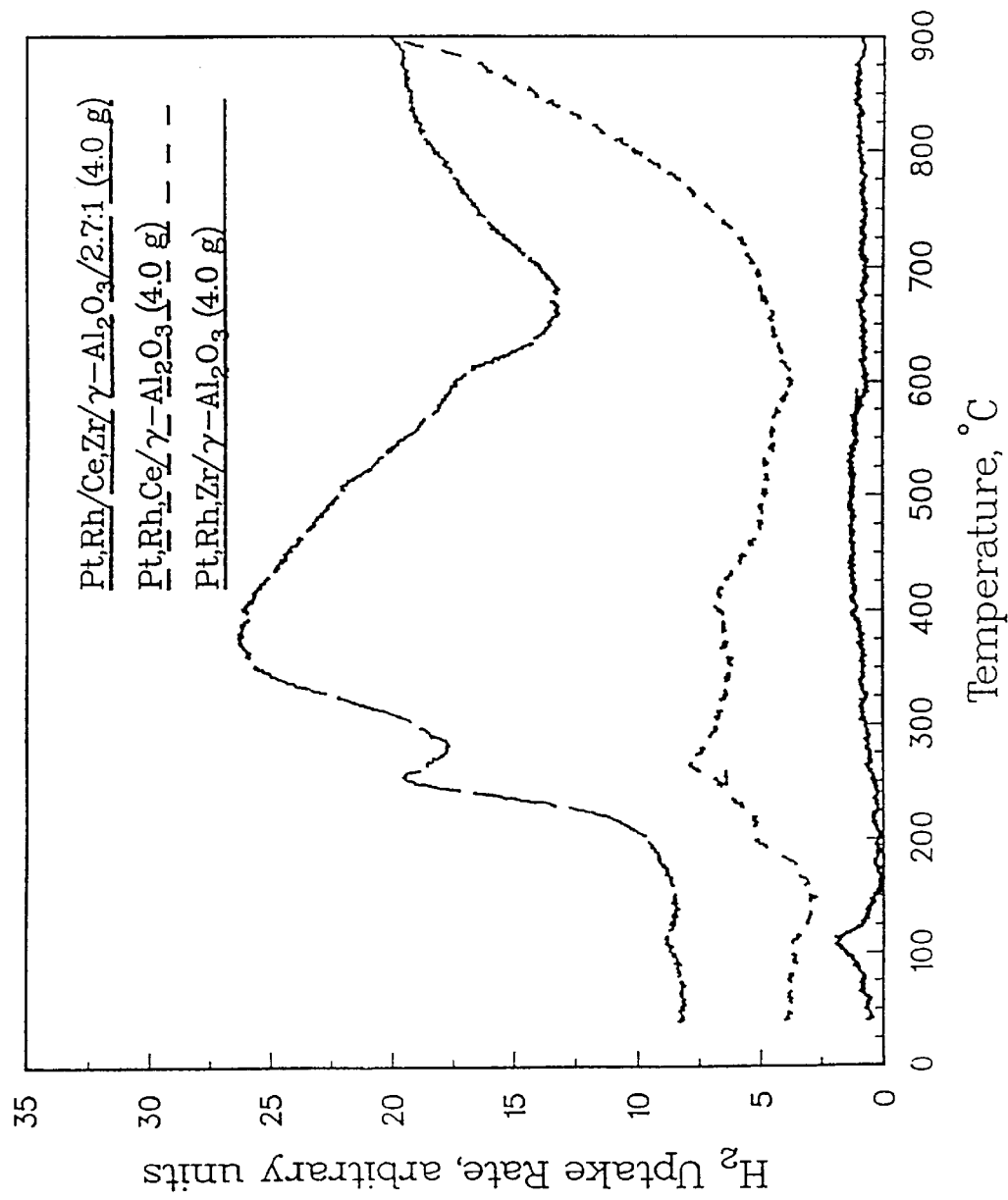
FIG. 12 shows TPR spectra of the same three catalysts [Pt,Rh/Ce/γ-Al$_2$O$_3$, Pt,Rh/Zr/γ-Al$_2$O$_3$, and Pt,Rh/Ce,Zr/γ-Al$_2$O$_3$ (Ce/Zr=2.7)] after laboratory aging at 1140° C. for 6 hours in 10% H$_2$O/90% N$_2$.
Figure 13:
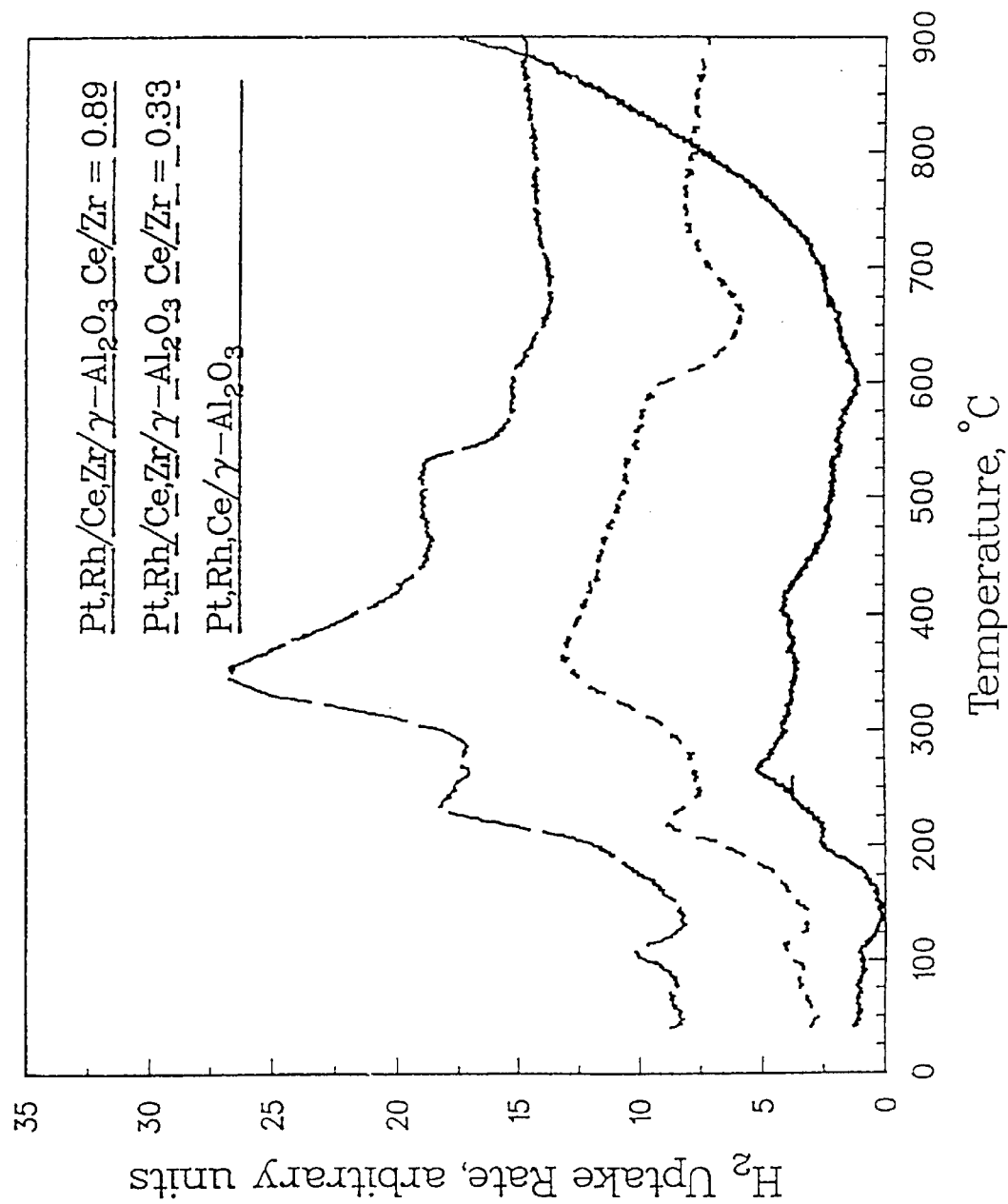
FIG. 13 shows TPR spectra of a Pt,Rh/Ce/γ-Al$_2$O$_3$ catalyst and two mixed-metal oxide promoted catalysts made according to the present invention, (Pt,Rh/Ce,Zr/γ-Al$_2$O$_3$ (Ce/Zr=0.89), and Pt,Rh/Ce,Zr/γ-Al$_2$O$_3$ (Ce/Zi0.33) after laboratory aging at 1140° C.for 6 hours in 10% H$_2$O/90% N$_2$.

A series of TPR analyses were also performed on several of these mixed-metal-oxide-promoted supports and catalysts as well as single-metal-oxide-promoted supports and catalysts. In FIGS. 10–11, TPR spectra are shown for fresh supports both modified and unmodified and the corresponding promoted catalysts. These TPR analyses show distinct Ce reduction property advantages for the mixed-metal oxides of the present invention, as shown by the enhanced low temperature reduction peak in FIG. 11. FIGS. 12–13 show the TPR spectra for both mixed-metal-oxide-promoted and single-metal-oxide-promoted aged catalysts. As shown by the enhanced reduction peaks for the Pt,Rh/Ce,Zr/$\gamma$-$Al_2O_3$ samples, these TPR spectra also show distinct Ce reduction property advantages for the mixed-metal-oxide supports of this invention.

Tri-Metal Mixed-Metal-Oxide Containing Supports and Catalysts

Using essentially the same preparation procedure as used for Ce/Zr mixed-metal-oxide promoters, tri-metal mixed-metal-oxide-promoted supports may also be prepared by the method of the present invention by including at least one additional secondary metal when the oxide precursor metals are mixed in solution. A key discovery in this area is that an increased amount of Zr-doping of the $CeO_2$ lattice (when ceria is the primary base metal oxide) is made possible by the addition of a small amount of a third metal ion, such as La. Single crystal structures have been produced according to the method of this invention where the Ce/Zr mole ratio in the oxide crystal lattice is essentially 1:1. This increased level of doping can be engineered to result in an enhanced Ce or Zr promotional effect on catalyst performance, particularly on CO oxidation and NOx reduction in exhaust gases from internal combustion engines operating at the stoichiometric A/F ratio.

Characterization of Tri-Metal Mixed-Metal-Oxide Promoted Catalysts

Figure 14:
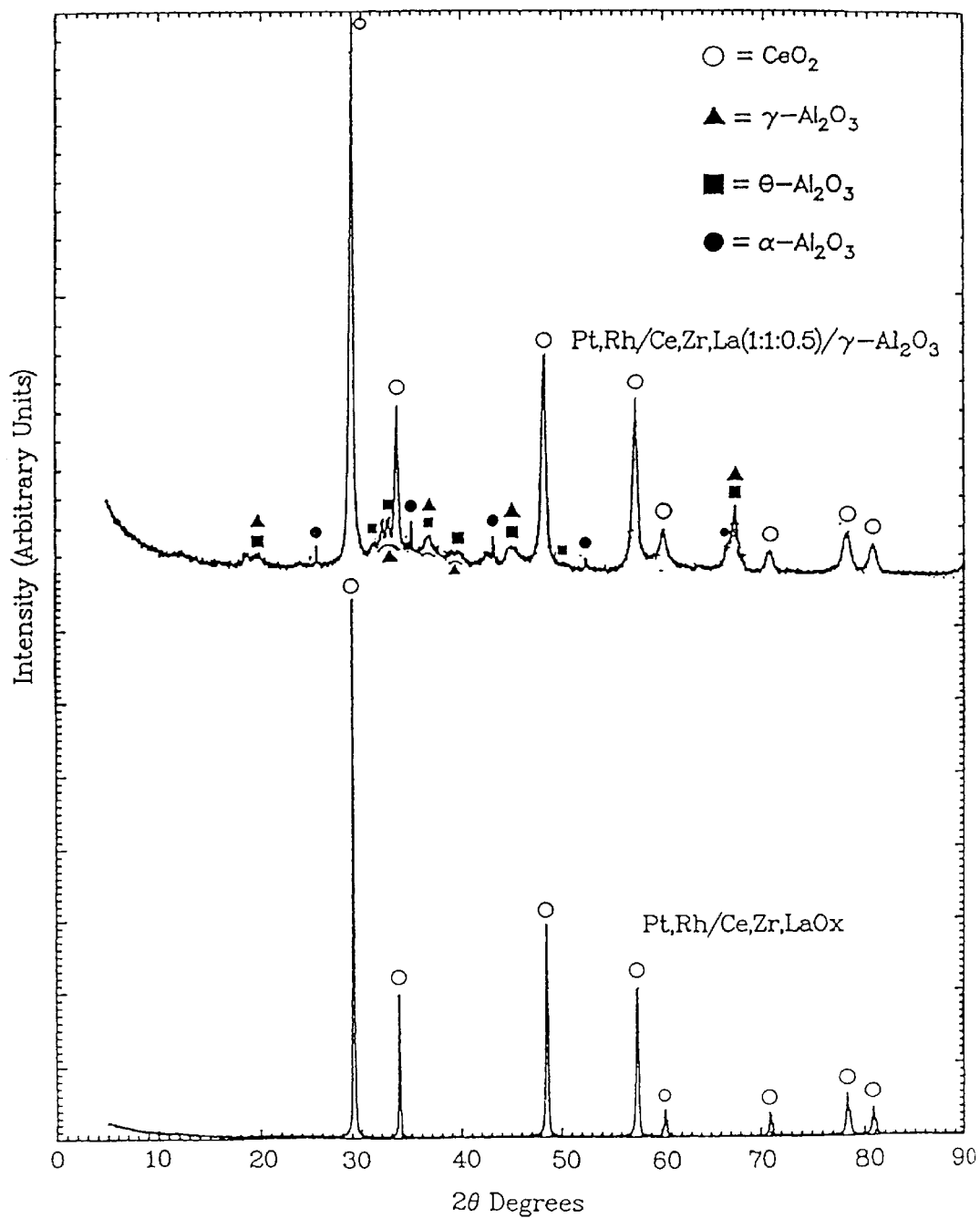
FIG. 14 shows the X-Ray diffraction (XRD) patterns after aging of a Pt,Rh/Ce,Zr,LaO$_x$/Ce:Zr:La=5.3:4.4:1 catalyst and a Pt,Rh/Ce,Zr,La (1:1:0.5)/γ-Al$_2$O$_3$ catalyst made according to the present invention.

Evidence of the increased doping levels achievable by addition of a third metal to the mixed-metal-oxide single-crystal-oxide products of this invention is shown in FIG. 14. Comparing the tri-metal systems to the bi-metal systems at approximately similar Ce/Zr ratios, the tri-metal system shows no phase separation even at a Ce/Zr ratio of almost one. On the other hand, in the bi-metal system shown in FIG. 9, the X-Ray diffraction PMRD) patterns for a catalyst made according to this invention (Pt,Rh/Ce,Zr/sorbitol/0.9:1) with a Ce/Zr mole ratio of 0.9 show peaks assigned to both cubic ceria and tetragonal zirconia. The peaks assigned to ceria have been shifted to higher 2θ values indicating doping with Zr and the peaks assigned to tetragonal $ZrO_2$ are shifted to lower 2θ values confirming Ce-doping of the $ZrO_2$ lattice, but there remain two distinct crystalline structures. With the addition of La in the amounts indicated in FIG. 14, the X-Ray diffraction (XRD) patterns show no evidence for difffaction peaks assigned to tetragonal zirconia or compounds associated with La. It is believed that, in these latter samples, the presence of La has promoted higher Zr-doping of the ceria lattice.

Transmission electron spectroscopy (TEM) analyses were also carried out and confirm the X-Ray diffraction (XRD) results discussed above. Transmission electron spectroscopy (TEM) showed well dispersed crystalline particles containing all three metal components for both the 1140° C. aged Ce,Zr,La/γ-Al$_2$O$_3$ support and the laboratory aged and tested Pd/La,Zr,Ce/γ-Al$_2$O$_3$ catalyst However, in the latter sample some segregation and clustering of the La,Zr,Ce tri-metal mixed-metal-oxide particles was observed.

Performance of Tri-Metal Mixed-Metal-Oxide Catalysts

Figures 15C, 15D:
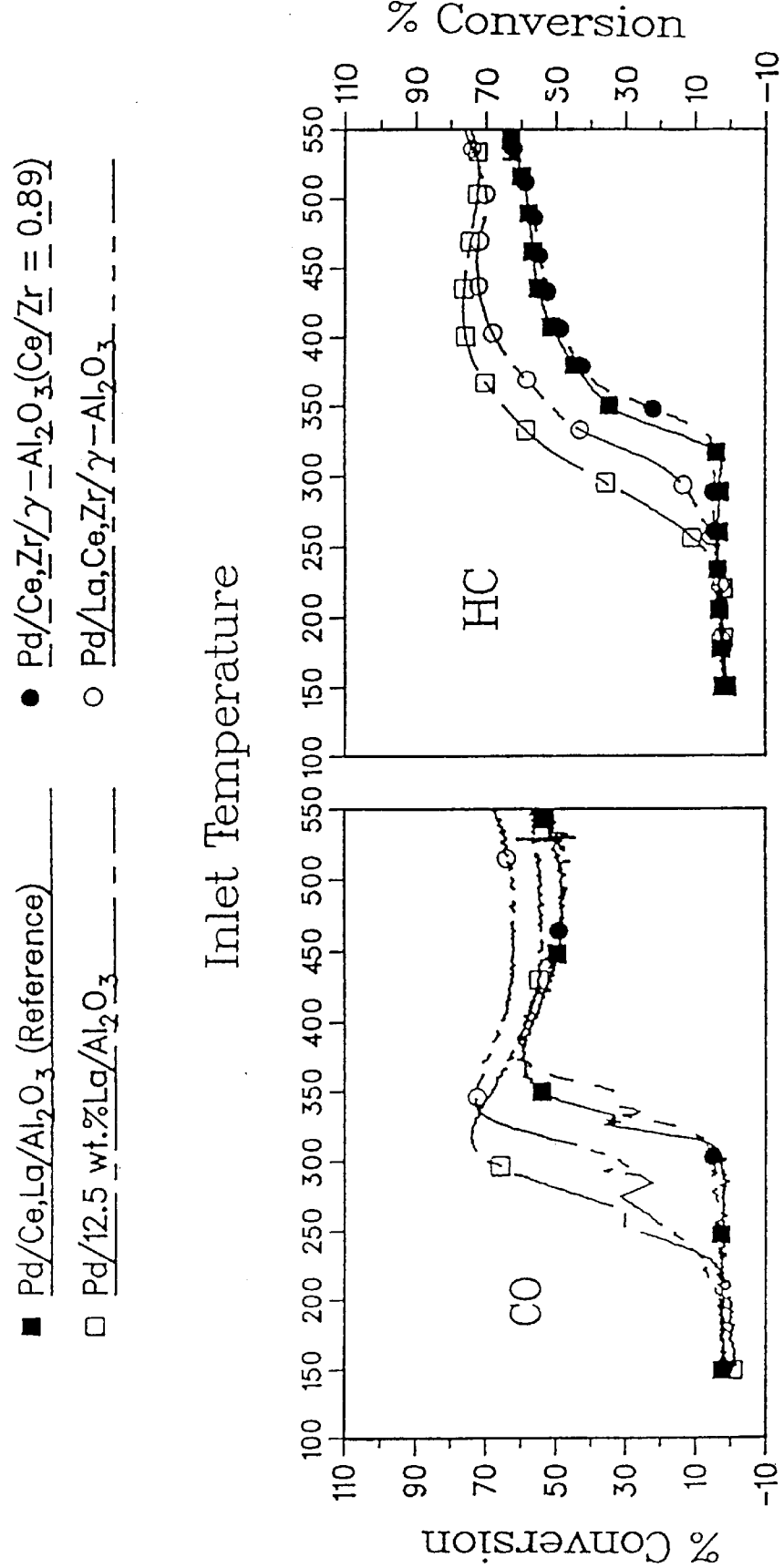
FIG. 15 shows the comparison of Rise-2 light-off performance as a function of support composition for a Pd loading of 1.0 wt. % for four different supports.

FIG. 15 shows light-off performance data for four different catalysts. The first is a prior art Pd/Ce,La/Al$_2$O$_3$ catalyst (available commercially from Allied-Signal Environmental Catalysts, Catoosa, Okla.). The others were laboratory prepared: a Pd/12.5 wt. % La/Al$_2$O$_3$ catalyst, a Pd/Ce,Zr/Al$_2$O$_3$ (Ce/Zr=0.9) catalyst, and a Pd/La,Zr,Ce/γ-Al$_2$O$_3$ tri-metal mixed-metal-oxide catalyst made according to this invention with Ce/Zr mole ratio=0.9:1. Although the Pd/12.5 wt. % La/Al$_2$O$_3$ catalyst showed the best light-off activity, the ranking of the high temperature performance of these catalysts does not necessarily follow the light-off performance. As is shown in FIG. 15, the tri-metal oxide Pd/La,Zr,Ce/γ-Al$_2$O$_3$ catalyst lights off after the Pd/12.5 wt. % La/Al$_2$O$_3$ catalyst, but achieves higher conversion at temperatures above 450° C. compared to the other three catalysts. The light-off temperature for the Pd/La,Zr,Ce/γ-Al$_2$O$_3$ catalyst, in fact, is superior to the Pd/Ce,La/Al$_2$O$_3$ and Pd/Ce,Zr/γ-Al$_2$O$_3$/0.9:1 catalysts, and it reaches higher steady state conversions than those two catalysts. These observations are consistent with superior oxygen storage properties for the Pd/La,Zr,Ce/Al$_2$O$_3$ catalyst at higher temperatures.

Figures 18A, 18B, 18C:
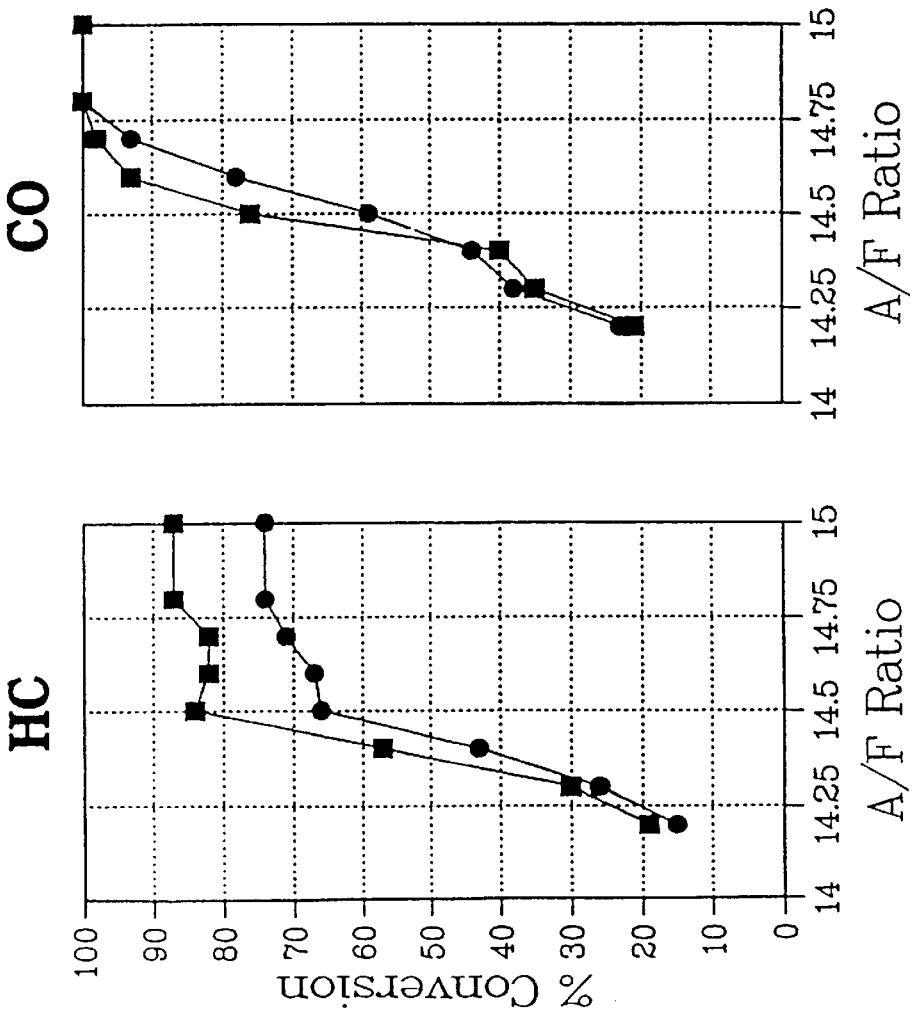
FIG. 18 shows lean to rich A/F traverse performance comparison for a Pd(1.0 wt. %)/La,Zr,Ce/Al$_2$O$_3$ catalyst and a Pd(1.0 wt, %)/Ce,Zr/Al$_2$O$_3$ catalyst after aging at 964° C. and a test temperature of 500° C.

The A/F traverse performance data for the Pd/La,Zr,Ce/γ-Al$_2$O$_3$, Pd/Ce,La/Al$_2$O$_3$, Pd/12.5 wt. % La/Al$_2$O$_3$, and Pd/Ce,Zr/γ-Al$_2$O$_3$/0.9:1 catalysts are shown in FIGS. 16–18. FIG. 16 compares the performance for the Pd/La,Zr,Ce/γ-Al$_2$O$_3$ and Pd/Ce,La/Al$_2$O$_3$ catalysts at 500° C. The data indicates that there are distinct advantages for the Pd/La,Zr,Ce/γ-Al$_2$O$_3$ catalyst for both CO, HC and NOx performance. These advantages are particularly evident around stoichiometry and on the lean side for HC performance.

CO performance advantages were also seen for the Pd/La,Zr,Ce/γ-Al$_2$O$_3$ catalyst when compared with the Pd/12.5 wt. % La/Al$_2$O$_3$ and Pd/Zr,Ce/γ-Al$_2$O$_3$/0.9:1 catalysts as shown in FIGS. 17–18. FIG. 17 shows HC and CO performance for the Pd/La,Zr,Ce/γ-Al$_2$O$_3$ and the Pd/12.5 wt. % La/Al$_2$O$_3$ catalysts. The two catalysts show nearly equivalent stoichiometric NOx performance, but the Pd/La,Zr,Ce/γ-Al$_2$O$_3$ catalyst shows superior lean-side HC and stoichiometric CO activity. FIG. 18 shows that the addition of La to a Ce,Zr mixed-metal-oxide-promoted catalyst has a large beneficial impact on performance for all three components of the mixed oxide as compared to the La-free, Pd/Zr,Ce/γ-Al$_2$O$_3$/0.9:1 catalyst.

A comparison was also made of the oxygen utilization efficiency of the Pd/La,Zr,Ce/γ-Al$_2$O$_3$ catalyst as compared to Pd/Ce,La/Al$_2$O$_3$ and Pd/12.5 wt. % La/Al$_2$O$_3$ catalysts and the results are shown in FIGS. 19 and 20. This measurement was done because enhanced oxygen consumption around stoichiometry can be taken as an indication of enhanced Ce promotion effects. The Pd/La,Zr,Ce/γ-Al$_2$O$_3$ catalyst shows clear enhancement of the O$_2$ consumption.

The present performance advantages observed for the Pd/La,Zr,Ce/γ-Al$_2$O$_3$ catalyst are significant. The Pd/La,Zr,Ce/γ-Al$_2$O$_3$ catalyst shows higher performance compared to the Pd/Ce,La/Al$_2$O$_3$ and Pd/Ce,Zr/Al$_2$O$_3$ formulations. The Pd/Ce,La/Al$_2$O$_3$ catalyst contains appreciably higher contents of Ce and La showing that comparable or higher performance can be achieved at lower rare earth contents. The high performance of the Pd/La,Zr,Ce/γ-Al$_2$O$_3$ catalyst as compared to the Pd/Ce,Zr/Al$_2$O$_3$ catalyst shows that the addition of La has a large beneficial impact on performance.

The following examples are included to demonstrate the preparation and testing of various conventional catalysts and catalysts prepared in accordance with the preparation procedures of the present invention.

EXAMPLE 1

This example illustrates a blank pan type preparation of a Ce,Zr-promoted support using Zr acetate and Ce acetate (Ce/Zr mole ratio=1) in the absence of an organic reagent.

121 grams of Zr acetate solution (22 wt. % Zr calculated as ZrO$_2$) was combined with 518 grams of Ce acetate solution (5.84 wt. % Ce) and 300 grams of deionized water. The solution was transferred to a blender and 200 grams of γ-Al$_2$O$_3$ were added slowly with stirring to give a uniform slurry. The resultant slurry was milled for 5 minutes and transferred to a flat ceramic dish. The slurry was dried, then calcined at 600° C. (initially in 4% O$_2$/96% N$_2$ for 6 hours followed by air at 600° C. for 1 hour). After calcination the powder was aged at 1140° C. for 6 hours in 10% H$_2$O/90% N$_2$.

X-Ray diffraction (XRD) analysis of this product showed that the CeO$_2$ lattice parameter was 5.386±0.03 Å, indicating essentially no doping of the CeO$_2$ lattice with Zr. The lattice parameter of pure CeO$_2$ is 5.411 Å.

EXAMPLE 2

This example again illustrates a pan type preparation of Ce,Zr-promoted support Zr acetate and Ce nitrate (Ce/Zr mole ratio=1) in the absence of an organic reagent.

The procedure of Example 1 was followed except that Zr acetate and Ce nitrate were used. The measured CeO$_2$ lattice parameter after aging was 5.400±0.002 Å, again indicating that essentially no doping of the CeO$_2$ lattice with Zr occurred.

EXAMPLE 3

This example illustrates preparation by evaporative procedure of a Ce,Zr-promoted support using Zr acetate and Ce nitrate (Ce/Zr mole ratio=3) in the absence of an organic reagent.

200 grams of γ-Al$_2$O$_3$ were added to a 600 gram solution of Zr acetate and Ce nitrate salts (Ce/Zr mole ratio=3). The mixture was milled for 2 minutes and then transferred to an evaporator and the volatiles stripped off. After impregnation and stripping, the impregnated carrier was calcined in accord with Example 1 at 1140° C. X-Ray diffraction (XRD) analysis indicated that the lattice parameter was 5.40±0.002 Å, again indicating that essentially no doping of the CeO$_2$ lattice with Zr occurred.

EXAMPLE 4

This example illustrates preparation of a Ce,Zr mixed-metal-oxide-promoted support according to the method of the present invention using ZrO(NO$_3$)$_2$ and Ce nitrate (Ce/Zr atom ratio=0.9) in the presence of citric acid where the mole ratio of citric acid to the nitrate salts was 1.9:1.

85.7 grams of ZrO(NO$_3$)$_2$.XH$_2$O (25.7 wt. % Zr) were dissolved in 300 grams of deionized water. 10 grams of conc. nitric acid were also added so as to aid in the dissolution of the Zr nitrate salt. To this solution was added 151 grams of a Ce nitrate stock solution (20 wt. % Ce)

followed by 166 grams of anhydrous citric acid. The solution was stirred until all the citric acid was dissolved 200 grams of γ-$Al_2O_3$ were then added slowly to give a uniform slurry, which was milled for 2 minutes and then transferred to a flat ceramic dish. The slurry was dried, then calcined at 600° C. (initially in 4% $O_2$/96% $N_2$ for 6 hours followed by air at 600° C. for 1 hour). After this the powder was aged at 1140° C. for 6 hours in 10% $H_2O$/90% $N_2$.

After drying and calcination as described, a sample was removed from the top and bottom of the cake, aged and then analyzed using X-Ray diffraction (XRD). The $CeO_2$ lattice parameter for the sample removed from the bottom of the cake was 5.320±0.009 Å and from the top, the lattice parameter was 5.320±0.007 Å. Thus, it appeared that extensive doping of the $CeO_2$ lattice occurred and there was no evidence for selective wicking of the various metal ions during drying and calcination. The lattice parameters measured correspond to a Zr-doping level of the $CeO_2$ lattice of 31.3 mole %.

Transmission electron spectroscopy (TEM) analysis of an identically prepared powder was carried out after calcination at 600° C. Dispersed $CeO_2$ particles having an average diameter of 60 Å were observed in both the dark field and bright field transmission electron spectroscopy (TEM) analysis of the powder. EDS analysis showed that the Ce and Zr were uniformly distributed throughout the sample, however, it was not possible to determine if solid solution formation had occurred. Aged powders were also sent for transmission electron spectroscopy (TEM) analysis. The aging consisted of heating to 1140° C. in 10% $H_2O$/90% $N_2$ for 6 hours. The $CeO_2$/$ZrO_2$ particles had now grown to an average size of over 100 Å and clearer diffraction from the $CeO_2$/$ZrO_2$ particles was observed. The diffraction analysis indicated the formation of a $Ce_{0.75}Zr_{0.25}O_2$ phase showing that solid solution formation had occurred between the $CeO_2$ and $ZrO_2$.

Evidence of the formation of a single crystalline $CeO_2$ structure and a solid solution with Zr atoms extensively doping the $CeO_2$ crystal was surprising. Such a large amount of high surface area alumina added to the precursor solution was expected to physically intrude and interfere with formation of either the single crystal structure or the uniform doping.

EXAMPLE 5

This example illustrates preparation of a Ce,Zr mixed-metal-oxide-promoted support according to the present invention using Zr acetate and Ce acetate salts (Ce/Zr atom ratio=1) in the presence of d-sorbitol where the mole ratio of d-sorbitol to the acetate salts was 2:1.

158 grams of d-sorbitol were dissolved in 300 grams of deionized water. 121 grams of Zr acetate solution (22 wt. % Zr calculated as $ZrO_2$) were then added and then 518 grams of Ce acetate solution (5.84 wt. % Ce). 200 grams of the γ-$Al_2O_3$ were then added slowly with stirring to give a uniform slurry, then milled for 2 minutes, and finally transferred to a flat ceramic dish. The slurry was dried, then calcined at 600° C. (initially in 4% $O_2$/96% $N_2$ for 6 hours followed by air at 600° C. for 1 hour). After this the powder was aged at 1140° C. for 6 hours in 10% $H_2O$/90% $N_2$. After calcination and aging the measured $CeO_2$ lattice parameter was 5.310±0.006 Å showing that extensive doping of the $CeO_2$ lattice had occurred. This lattice parameter corresponds to a Zr-doping level of the $CeO_2$ lattice of 34.7 mole % Zr.

EXAMPLE 6

This example illustrates preparation of a Ce,Zr mixed-metal-oxide-promoted support using the same procedure as that in Example 5, except that the Ce/Zr mole ratio used was 3.0. The measured $CeO_2$ lattice parameter after aging was found to be 5.331±0.002 Å again indicating that extensive doping of the $CeO_2$ lattice occurred. This lattice parameter corresponds to 27.5 mole % Zr in the $CeO_2$ lattice.

EXAMPLE 7

This example illustrates preparation of a Ce,Zr mixed-metal-oxide-promoted support according to the present invention using Ce nitrate and ZrO nitrate in the presence of citric acid as the organic reagent. The support was impregnated with sufficient $Ce(NO_3)_3$ and $ZrO(NO_3)_2$ in the presence of citric acid to achieve a Ce+Zr loading of 22.6 wt. % with 66 mole % being Ce and 34 mole % being Zr. 500 gram batches of mixed-metal-oxide-modified support were prepared until a total of 12 kg was available to prepare monolith catalysts for subsequent full-size piece dynamometer evaluation. The mixed-metal-oxide-modified support was prepared as followings:

A stock solution of Ce nitrate was initially prepared containing 19.5 wt. % Ce and the source of Zr was Zr nitrate salt (25.7 wt. % Zr). 1,200 grams of deionized water were combined with 486 grams of the Ce nitrate solution. 122.9 grams of $ZrO(NO_3)_2 \cdot XH_2O$ were then added followed by 393 grams of anhydrous citric acid. The solution was then stirred until the citric acid and Zr nitrate were dissolved. The resultant solution was transferred to a blender and 400 grams of γ-$Al_2O_3$ added slowly to give a uniform slurry. The slurry was then milled for 2 minutes, transferred to an evaporator, dried and finally calcined at 600° C. (initially in 4% $O_2$/96% $N_2$ for 6 hours followed by air at 600° C. for 1 hour). Transmission electron spectroscopy (TEM) analysis of the powder showed that the $CeO_2$ particles were highly dispersed with crystallite sizes of 40 Å or less. EDS analysis showed that the Zr and Ce were uniformly distributed through out the sample. However, we could not confirm if solid solution formation occurred. A sample of the powder was aged at 1140° C. for 6 hours in 10% $H_2O$/90% $N_2$ and the transmission electron spectroscopy (TEM) analysis was repeated. Particles of over 100 Å were now observed and clear diffraction from these larger particles was observed. The diffraction pattern could be potentially assigned to the $Ce_{0.75}Zr_{0.25}O_2$ solid solution phase as in Example 4 indicating that solid solution formation had occurred.

A sample of this material was subsequently impregnated with Pt+Rh, re-calcined, aged and analyzed using X-Ray diffraction (XRD). The $CeO_2$ lattice parameter was found to be 5.315±0.004 Å indicating that extensive doping of $CeO_2$ with Zr occurred after aging. This lattice parameter corresponds to a Zr-doping level of 33 mole % Zr and agrees well with the nominal Zr content of 34 mole %.

Engine evaluation of Pt,Rh catalysts prepared using this material was subsequently carried out as described in detail in Examples 13, 14 and 15 of U.S. Pat. No. 5,064,803. Besides the stand dynamometer evaluations, FTP test evaluations on a 2.5L TBI Buick Somerset and a 3.1L MPFI Cavalier were carried out. The experimental catalysts were compared to two Pt,Rh reference catalysts. The results of these comparisons are summarized in Tables 3–5 and FIGS. 21 to 23

In Tables 3 and 4 are summarized the integral performance numbers and aged light-off activity for the catalyst of the present invention compared to a preparation having double the Ce loading and to a case where no solid solution was formed between the $CeO_2$ and $ZrO_2$ components but where the Ce and Zr loading were the same as for the test catalyst. Clear performance advantages are observed for the catalyst of the present invention. In Table 5 are summarized the FTP vehicle results and again we see advantages for the catalyst of the present invention.

TABLE 3

Integral Performance Advantages of $CeO_2$/$ZrO_2$
Solid Solution TWCs at Lower Ce Content

| Testing Conditions | | Fuel Cut Aging Inlet T = 850° C. | | Non-Fuel Cut Aging Bed T = 1000° C. | | Fuel Cut Aging Inlet T = 850° C. | |
|---|---|---|---|---|---|---|---|
| | | Ce + Zr Solid Solution | 2X Higher Ce | Ce + Zr Solid Solution | 2X Higher Ce | Ce + Zr Solid Solution | Ce + Zr No Solid Solution |
| T = 450° C. | HC | 94 | 92 | 95 | 95 | 95 | 94 |
| GHSV = 30K | CO | 79 | 75 | 88 | 90 | 92 | 85 |
| Amplitude = ±0.4 | $NO_x$ | 80 | 77 | 88 | 82 | 85 | 85 |
| T = 400° C. | HC | 91 | 84 | 92 | 85 | 93 | 91 |
| GHSV = 30K | CO | 74 | 68 | 82 | 70 | 91 | 81 |
| Amplitude = ±0.4 | $NO_x$ | 79 | 75 | 84 | 75 | 88 | 83 |
| T = 482° C. | HC | 94 | 91 | 95 | 91 | 93 | 93 |
| GHSV = 42K | CO | 63 | 57 | 77 | 57 | 85 | 70 |
| Amplitude = ±0.5 | $NO_x$ | 71 | 68 | 78 | 70 | 86 | 74 |

TABLE 4

$CeO_2$/$ZrO_2$ Solid Solution TWCs Improve
Aged Light-off Performance

| | Temperature (° C.) @ 50% Conversion | | |
|---|---|---|---|
| Pt.Rh Catalyst | HC | CO | $NO_x$ |
| Ce,Zr Solid Solution | 386 | 380 | 362 (a) |
| 2X Higher Ce | 408 | 408 | 391 |
| Ce,Zr Solid Solution | 384 | 377 | 363 (b) |
| 2X Higher Ce | 402 | 396 | 383 |
| Ce,Zr Solid Solution | 382 | 381 | 361 (a) |
| Ce,Zr No Solid Solution | 400 | 398 | 379 |
| Aged 75 Hr: | | | |

(a) 850° C. Inlet Fuel-Cut
(b) 1000° C. Bed Non-Fuel Cut

TABLE 5

$CeO_2$/$ZrO_2$ Solid Solution TWCs Improve FTP Performance
at Lower Ce Content

| | Modal Tailpipe Emissions g/Mile | | |
|---|---|---|---|
| Pt.Rh Catalyst | HC | CO | $NO_x$ |
| Ce,Zr Solid Solution | 0.178 | 1.22 | 0.069 (a,c) |
| Ce,Zr No Solid Solution | 0.253 | 2.96 | 0.117 |
| Ce,Zr Solid Solution | 0.333 | 3.69 | 0.542 (a,d) |
| 2X Higher Ce | 0.401 | 4.12 | 0.527 |
| Ce,Zr Solid Solution | 0.409 | 4.23 | 0.513 (b,d) |
| 2X Higher Ce | 0.481 | 4.48 | 0.613 |
| Aged 75 Hr: | | | |

(a) Fuel-Cut, 850° C. Inlet
(b) Non-Fuel-Cut, 1000° C. Bed
Vehicle FTP:

(c) 2.5 L TBI Buick Somerset
(d) 3.1 L MPFI Cavalier

Figure 21A:
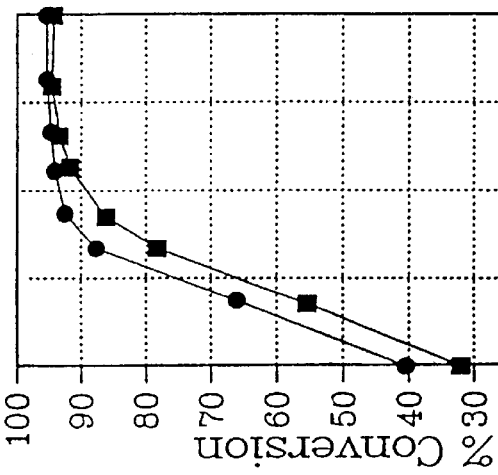
FIG. 21 shows an A/F traverse comparison at 482° C., GHSV=42K, after 75 hours of fuel cut aging (inlet temperature=850° C.) for a Reference Pt,Rh and an Pt,Rh/Ce,Zr/γ-Al$_2$O$_3$ (Ce/Zr is about 3) catalysts (Pt+Rh=40 g/ft$^3$ @ 5/1)
Figure 21B:
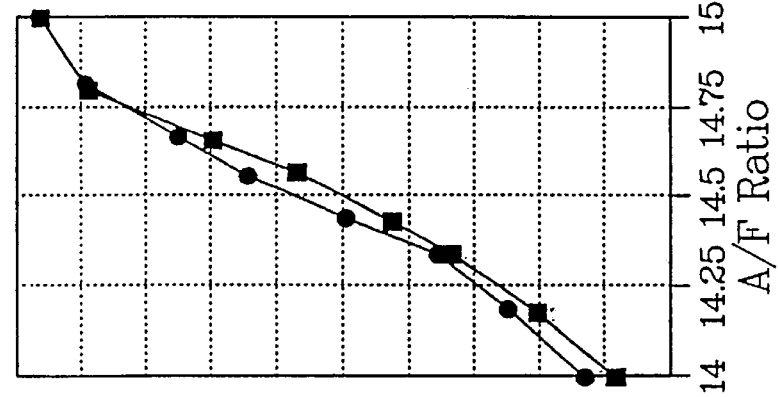
Figure 21C:
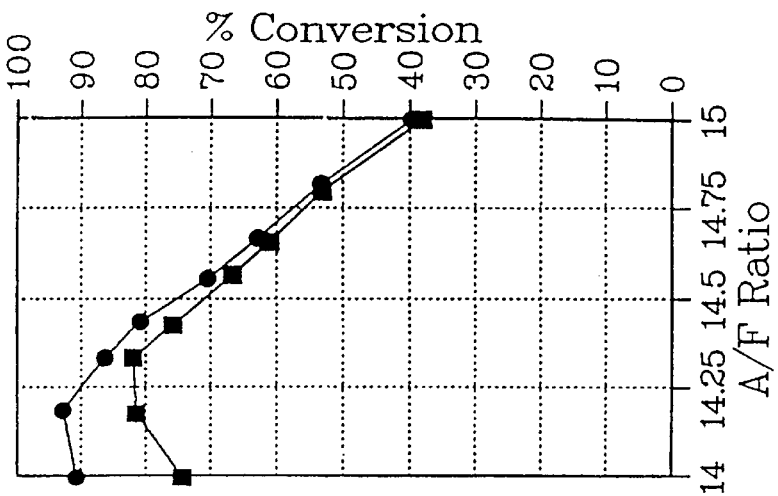
Figure 22A:
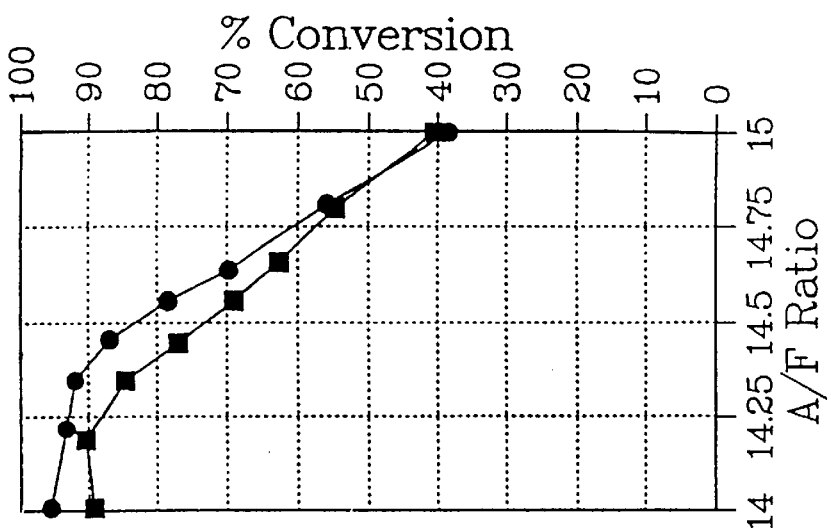
FIG. 22 shows that when using mixed oxides higher performance can be achieved at half the Ce loading. Non fuel cut aging for 75 hours with maximum Bed T=1000° C.; Test. T=482° C., GHSV=42K; Pt+Rh=40 g/ft$^3$ @ 5/1.
Figure 22B:
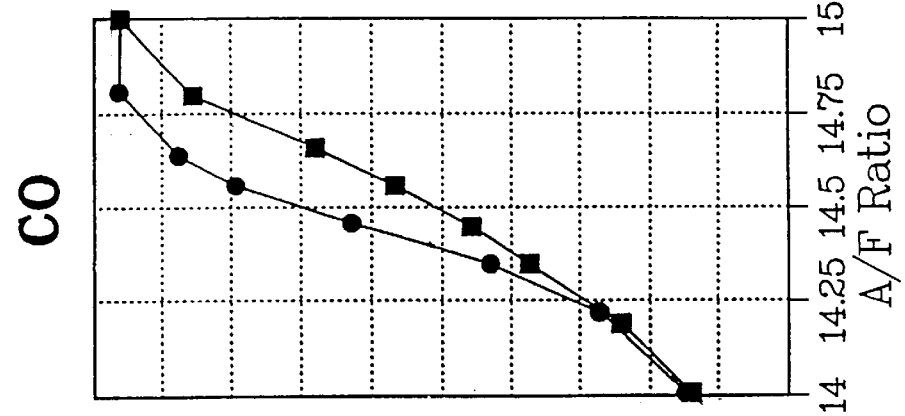
Figure 22C:
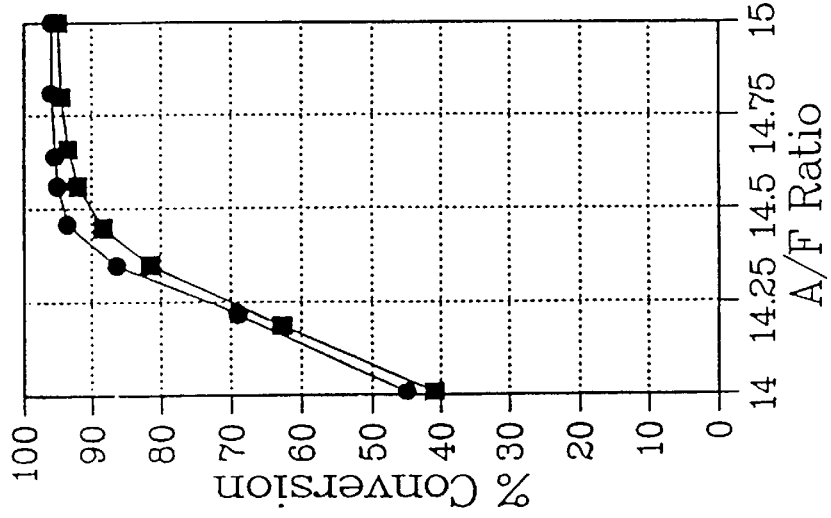
Figures 23A, 23B, 23C:
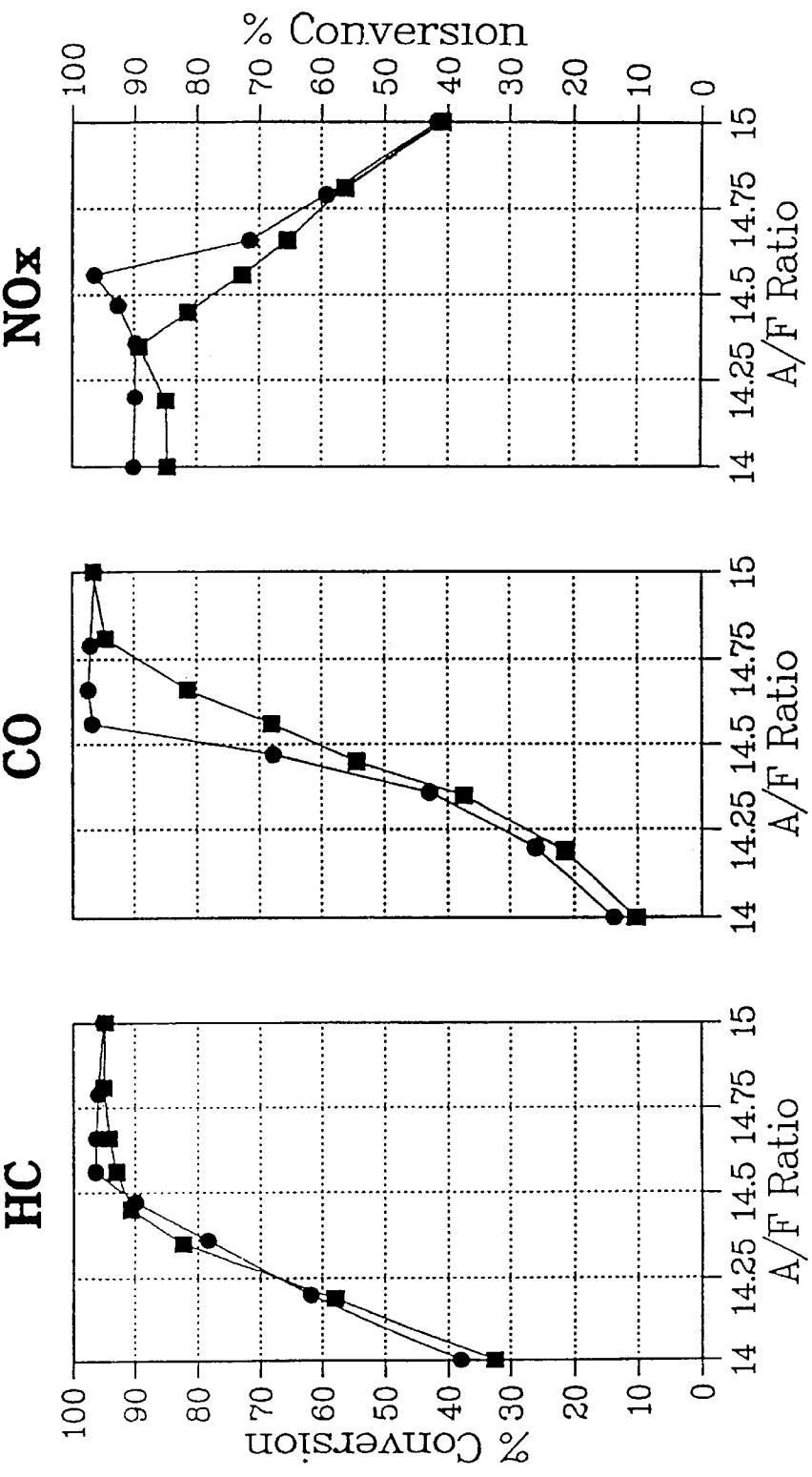
FIG. 23 shows an A/F traverse comparison at 482° C., GHSV=42K after 75 hours of a, fuel cut aging (inlet temperature=850° C.) for a Reference Pt,Rh/Ce,Zr/Al$_2$O$_3$ catalyst and an Pt,Rh/Ce,Zr/γ-Al$_2$O$_3$ (Ce/Zr is about 2.5) Mixed-metal-oxide catalyst (Pt+Rh=40 g/ft$^3$ @ 5/1)

FIGS. 21 to 22 show that catalysts prepared using the Ce,Zr/$\gamma$-$Al_2O_3$ promoted support material of the present invention were equivalent or slightly superior in performance compared to a reference technology that has over double the Ce loading. FIG. 23 summarizes A/F traverse performance results where the catalyst of the present invention is compared to a prior art catalyst having similar loadings of Ce and Zr, but in which mixed oxide/solid solution formation did not occur for the reference catalyst, as confirmed through X-Ray diffraction (XRD) analysis.

The data show large advantages for the catalyst of the present invention for A/F traverse tests at GHSV=42K and GHSV=30K. These advantages are significant as they are consistent with Ce promotional effects on performance, i.e., improved stoichiometric CO and NO performance.

Examples 8–19 illustrate the preparation of bi- and trimetal mixed-metal-oxide systems either supported or unsupported. Examples 8 and 9 show that La promotes the formation of a single phase having the $CeO_2$ cubic crystal structure when the Ce:Zr mole ratio is 1:1.

EXAMPLE 8

A $CeO_2$/$ZrO_2$ (0.9:1) support was prepared using the d-sorbitol sol gel method.

280 grams of Ce nitrate (20 wt. % Ce) were added to 300 grams of deionized water in a 2 liter beaker. 159 grams of $ZrO(NO_3)_2 \cdot XH_2O$ were then added (25.7 wt. % Zr) followed by 292 grams of d-sorbitol. The metal salts were combined with d-sorbitol at a d-sorbitol/Ce+Zr mole ratio of 1.9. The solution was heated gently and stirred. 20.9 grams of conc. nitric acid were then added to aid in the dissolution of the Zr nitrate salt.

The resulting solution was transferred to a flat ceramic dish, dried in a forced air oven at 120° C. and then calcined at 600° C. (initially in 4% $O_2$/96% $N_2$ for 6 hours followed by air at 600° C. for 1 hour). Pt and Rh were then added at a loading of 0.8 wt. % (Pt/Rh=5), the composition re-calcined at 600° C. in air and finally aged at 1140° C. in 10% $H_2O$/90% $N_2$ for 6 hours. X-Ray diffraction (XRD) analysis showed the presence of two phases: Zr-doped $CeO_2$ and Ce-doped $ZrO_2$, as shown in FIG. 9.

EXAMPLE 9

The procedure of Example 8 was repeated, but with the inclusion of La to give a mole ratio of Ce:Zr:La=5.33:4.41:1. 280 grams of Ce nitrate (20 wt. % Ce) solution, 204 grams of Zr nitrate (14.8 wt. % Zr) solution and 43.4 grams of La nitrate (24 wt. % La) solution were added to 300 grams of deionized water. To this solution were added 301 grams of d-sorbitol. The resultant solution was dried, calcined, and aged as described in Example 8.

The X-Ray diffraction (XRD) analysis now shows only the presence of one phase after aging, i.e., shifted $CeO_2$ phases, as shown in FIG. 14. No phases associated with Zr or La are detected, thus showing that the La and Zr have doped the $CeO_2$.

Examples 10 and 11 show that these same effects are observed when alumina is included and the mixed-metal oxide is supported on the alumina

EXAMPLE 10

The procedure of Example 8 is repeated, but with the inclusion of $\gamma$-$Al_2O_3$ to give a slurry. 87.5 grams of ZrO$(NO_3)_2 \cdot XH_2O$ (25.7 wt. % Zr) and 10 grams of conc. nitric acid were added 300 grams of deionized water. The solution was gently heated and stirred until all the Zr nitrate was dissolved. 151.4 grams of Ce nitrate solution (20 wt. % Ce) were then added followed by 166 grams of anhydrous citric acid.

The resultant solution was transferred to a blender and 200 grams of $\gamma$-$Al_2O_3$ added to give a uniform slurry. The resultant slurry was transferred to an evaporator and evaporated to dryness over a 24 hour time period. The dried powder was calcined at 600° C. (initially in 4% $O_2$/96% $N_2$ for 6 hours followed by air at 600° C. for 1 hour) Pt and Rh salts were then added at a loading of 0.8 wt. % (Pt/Rh=5), and the material re-calcined at 600° C. in air and finally aged at 1140° C. for 6 hours in 10% $H_2O$/90% $N_2$. After aging, the X-Ray diffraction (XRD) analysis was carried out and showed the presence of $CeO_2$ and $ZrO_2$ phases.

EXAMPLE 11

The preparation procedure of Example 9 was repeated, but with the inclusion of $\gamma$-$Al_2O_3$ to give a slurry as was described in Example 10. After drying, calcination and aging, the X-Ray diffraction (XRD) pattern shows the presence of $CeO_2$ but not of $ZrO_2$. Thus, La has promoted Zr-doping of the $CeO_2$ lattice, as shown in FIG. 14.

The above examples show that La-doping results in higher Zr-doping levels of $CeO_2$ than can be normally achieved.

EXAMPLE 12

Example 12 illustrates the performance benefits of the tri-metal mixed-metal-oxide-promoted Pd,Rh catalysts of the present invention.

A supported tri-metal mixed-metal oxide was prepared as follows. 20,000 grams of aluminum hydroxide was intimately mixed with a solution consisting of Ce acetate,Zr acetate, La acetate and d-sorbitol to give a uniform slurry. The weight ratio of calcined $Al_2O_3$/Ce/Zr/La was 9.587/2/1.3/1 and the mole ratio of d-sorbitol/(Ce+Zr+La) was 2. The resultant slurry was dried and calcined in an oven using the following procedure.

The slurry was initially dried at 120° C. for 4 hours and then heated to 220° C. and held at this temperature for 2 hours. It was then heated in a step-wise fashion to 270° C., 320° C. and 370° C. and held at each temperature for 1 hour. The temperature was then increased to 420° C., held at this temperature for 2 hours and finally heated to 540° C. and held at this temperature for 2 hours. The calcined powder was then cooled to room temperature and used to washcoat a monolith substrate.

The Ce loading was 13.4 wt. %,Zr loading was 8.7 wt. %, and the La loading was 6.7 wt. %. Analysis of the powder by transmission electron spectroscopy (TEM) analysis showed that the Ce,Zr, and La were evenly dispersed on the alumina surface in the form of small evenly dispersed crystallites of $\leq 50$ Å size and in all regions the Ce/Zr/La ratio was constant, indicating very even and uniform dispersion. $CeO_2$ was the only phase detected using diffraction and the transmission electron spectroscopy (TEM) analysis, indicating that the Zr and La were present in a single mixed-oxide phase with $CeO_2$.

After washcoating, Pd and Rh were added at a loading of 40 g/ft$^3$ @ 5/1. The performance of this catalyst (designated Pd,Rh/Ce,Zr,La/$Al_2O_3$ was compared to a commercial Pd,Rh reference catalyst having the same precious metal composition and loading and promoted by Ce, La and Ba (designated Pd,Rh/Ce,La,Ba/ref) containing 2.84 times the promoter loading.

The performance results were compared after 75 hours of a high temperature (catalyst inlet temperature=900° C.) engine fuel cut aging cycle. The results are presented in FIG. 24 showing large performance advantages for the tri-metal mixed-metal-oxide-containing catalyst.

After testing of the aged catalyst, a washcoat sample of the Pd,Rh/Ce,Zr,La/$Al_2O_3$ catalyst was removed and analyzed by X-Ray diffraction (XRD). X-Ray diffraction (XRD) detected the presence of a shifted $CeO_2$ phase, but no Zr, La or LaZr phases were detected, indicating that all the La and Zr had entered the $CeO_2$ lattice.

EXAMPLE 13

Example 13 illustrates the benefits to performance of the tri-metal mixed-metal-oxide supports on Pt,Pd,Rh tri-metal catalysts.

A tri-metal mixed-metal-oxide-supported catalyst was prepared as follows. 20,000 grams of aluminum hydroxide was intimately mixed with a solution of Ce acetate,Zr acetate, La acetate and d-sorbitol to give a uniform slurry. The weight ratio of calcined $Al_2O_3$/Ce/Zr/La was 12.78/2/1.3/1 and the mole ratio of d-sorbitol/(Ce+Zr+La) was 2. The resultant slurry was dried and calcined as described in Example 12.

The calcined powder was then used to washcoat a monolith substrate. The Ce loading was 11.0 wt. %,Zr loading was 7.13 wt. % and the La loading was 5.5 wt. %. Analysis of this powder again by transmission electron spectroscopy (TEM) analysis showed that the Ce,Zr and La were, evenly dispersed on the alumina surface in the form of small evenly dispersed crystallites of $\leq 50$ Å size and in all regions looked at the Ce/Zr/La ratio was constant indicating very even and uniform dispersion. After washcoating, Pt,Pd and Rh were added at a total loading of 80 g/ft$^3$ and a Pt:Pd;Rh weight ratio of 1:16:1.

Figure 25A:
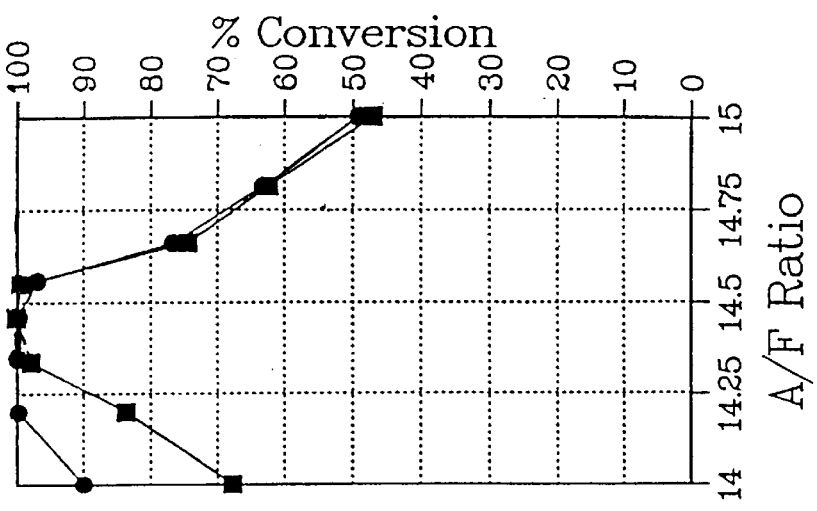
FIG. 25 shows the performance advantages for a tri-metal, mixed-metal-oxide containing catalyst of this invention compared to a conventional tri-metal reference catalyst even at appreciably lower metal oxide loadings aged using a severe fuel cut aging cycle with inlet exhaust gas temperatures of 900° C. and testing at 482° C. and GHSV=42K.
Figure 25B:
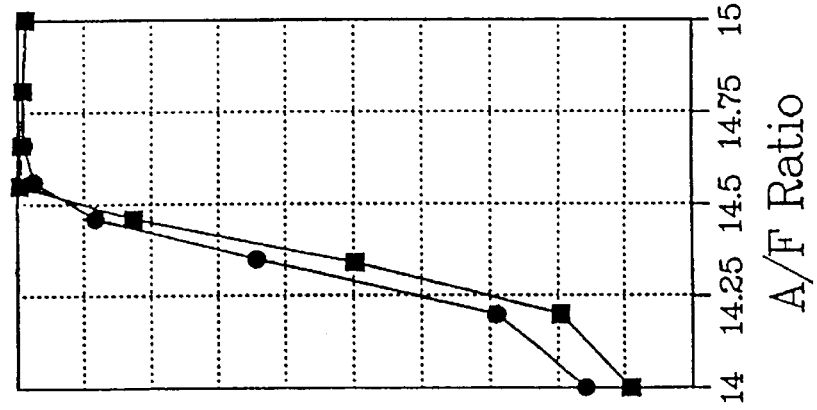
Figure 25C:
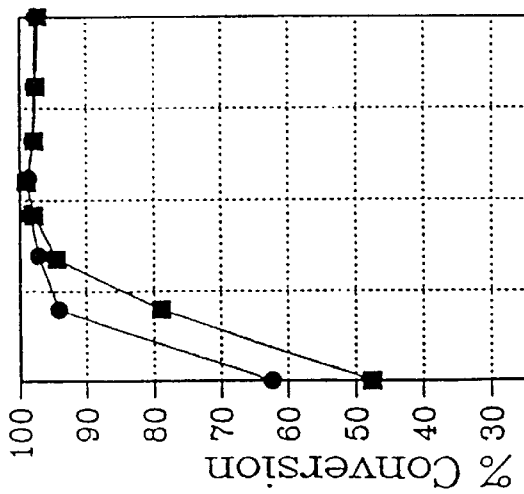

The performance of this catalyst was compared to a commercial tri-metal technology having the same noble metal loading, but had 2.62 times the base metal loading. Performance was compared after 75 hours of a high temperature (catalyst inlet temperature=900° C.) engine fuel cut aging cycle. Representative performance results are presented in FIG. 25 which shows that the catalyst of the present invention performed as well as a commercial catalyst having over twice the loading of metal oxides.

EXAMPLE 14

This example illustrates that mixed oxide formation can be achieved for supported Ce/Zr mixed-metal oxides after calcination at low temperatures using preparation procedures of the present invention.

A supported $CeO_2$/$ZrO_2$ (Ce atom %=66; Zr atom %=34) mixed-metal oxide was prepared as follows. 486 grams of Ce nitrate solution (20 wt. % Ce) were added to 1,200 grams of deionized water. To this solution were added 123 grams of $ZrO(NO_3)_2 \cdot XH_2O$ supplied by Aldrich (Zr=25.7 wt. %) and heated with stirring until it was all dissolved. 393 grams of anhydrous citric acid were then added and dissolved.

The resultant solution was transferred to a blender and 400 grams of $\gamma$-$Al_2O_3$ were then added with stirring to give a uniform slurry. The resultant slurry was eiger-milled for 2 minutes and transferred to a rotatory steam evaporator and evaporated to dryness. The dried powder was then calcined at 600° C. (initially in 4% $O_2$/96% $N_2$ for 6 hours followed by air at 600° C. for 1 hour).

The powder was then caked, sieved to 20–40 mesh and Pt and Rh added at a loading of 0.8 wt. % and a weight ratio of Pt/Rh=5. After the precious metal addition samples of the above catalyst were calcined at 600° C., 700° C., 800° C. and 960° C. in air for 6 hours and the lattice parameters measured using X-Ray diffraction (XRD).

The results are summarized in Table 6 below. Due to the broadness of the peaks, especially at the lower calcination temperatures the lattice parameter measurements were approximate but the results clearly show that Zr-doping of the $CeO_2$ lattice has been achieved even at low calcination temperatures.

TABLE 6

Impact of calcination temperature on the lattice parameter and Zr-doping level of $CeO_2$ for a Pt,Rh/Ce,Zr/$\gamma$-$Al_2O_3$ catalyst

| Calcination Temperature ° C. | $CeO_2$ Lattice Parameter (Å) | Calculated Doping Level (Atom %) |
|---|---|---|
| 600° C. | 5.37 | 14% |
| 700° C. | 5.36 | 17 |
| 800° C. | 5.34 | 24 |
| 960° C. | 5.33 | 28 |

Examples 15, 16 and 17 describe the preparation of Zr-based $CeO_2$/$ZrO_2$ mixed-metal oxides where the only phase detected after high temperature calcination is Ce-doped $ZrO_2$.

EXAMPLE 15

This example illustrates the formation of a Ce-doped $ZrO_2$ mixed-metal-oxide-promoted catalyst using citric acid.

129 grams of $ZrO(NO_3)_2 \cdot XH_2O$ (25.7 wt. % Zr) and 20 grams of conc. nitric acid were added to 300 grams of deionized water. The solution was heated with stirring until all the Zr nitrate had dissolved. 76 grams of a Ce nitrate solution (20 wt. % Ce) were then added followed by 166 grams of anhydrous citric acid. The resultant solution was sired until all the citric acid had dissolved and was then transferred to a blender. 200 grams of $\gamma$-$Al_2O_3$ were added with stirring to give a uniform slurry. The resultant slurry was transferred to a rotatory steam evaporator and evaporated to dryness over a 24 hour time period.

The dried powder was calcined at 600° C. (initially in 4% $O_2$/96% $N_2$ for 6 hours followed by air at 600° C. for 1 hour) then caked, sieved to 20–40 mesh and Pt and Rh impregnated at a loading of 0.8 wt. %, Pt/Rh weight ratio=5. The sample was then re-calcined at 600° for 6 hours in air and finally aged at 1140° C. for 6 hours in 10% $H_2O$/90% $N_2$ at flow rate of 0.5 liters/minute.

The resultant X-Ray diffraction (XRD) pattern of this aged sample is shown in FIG. 8. The only phases detected were tetragonal $ZrO_2$, $\alpha$-$Al_2O_3$, $\theta$-$Al_2O_3$ and possibly a Pt,Rh alloy phase. No peaks assigned to $CeO_2$ were detected. Inspection of the position of the tetragonal $ZrO_2$ peaks showed that these were shifted to lower 2$\theta$ values compared to un-doped $ZrO_2$. These observations are consistent with doping of the $ZrO_2$ lattice with the larger $Ce^{4+}$ ions and a resultant expansion of the lattice. For pure un-doped tetragonal $ZrO_2$ the calculated lattice parameter in the a direction is 3.605 Å and 5.180 Å in the c direction. The observed lattice parameters were a=3.639±0.018 Å and c=5.231±0.026 Å thus showing that an expansion of the $ZrO_2$ lattice occurred as a result of the presence of Ce.

EXAMPLE 16

This example illustrates the formation of Ce-doped zirconia supported on $\theta$-$Al_2O_3$ using citric acid as the organic reagent.

2,910 grams of ZrO nitrate (20.0 wt. % $ZrO_2$) solution and 431 grams of Ce nitrate (20 wt. % Ce) solution were combined in a 6 liter container. 1,524 grams of anhydrous citric acid were added and the salts dissolved. In a separate container 685 grams of $\theta$-$Al_2O_3$ were added to 1,600 grams of deionized water and milled for 5 minutes. The resultant slurry was mixed with the metal salt/citric acid solution, heated on a hot plate for 2.5 hours so as to evaporate and reduce the total volume of the slurry, and then transferred to a flat ceramic dish and dried in a forced air oven at 120° C. for 24 hours.

The dried powder was then calcined at 600° C. (initially in 4% $O_2$/96% $N_2$ for 6 hours followed by air at 600° C. for 1 hour). A sample of the powder was then aged at 960° C. for 6 hours in 10% $H_2O$/90% $N_2$ and analyzed by X-Ray diffraction (XRD). Tetragonal $ZrO_2$ was detected, but no $CeO_2$; and the $ZrO_2$ peaks were again shifted to lower 2$\theta$ values consistent with Ce-doping of the $ZrO_2$ lattice. The lattice parameter in the a direction was 3.622±0.005 Å and 5.186±0.008 Å in the c direction.

EXAMPLE 17

This example illustrates the formation of Ce-doped zirconia supported on $\theta$-$Al_2O_3$ using d-sorbitol as the organic reagent.

20,000 grams $\theta$-$Al_2O_3$ were milled with twice the weight of deionized water and then added to a Ce acetate/Zr acetate/d-sorbitol solution. The weight ratio of $\theta$-$Al_2O_3$/Zr/Ce=4.2/5.31/1 and the mole ratio of d-sorbitol/(Ce+Zr)=1.5. The resultant slurry was dried at 120° C. for 24 hours and then calcined as described in Example 12. A sample of the powder was aged at 950° C. for 6 hours in a flow of 10% $H_2O$/90% $N_2$ so as to partially sinter the sample (sharpen the X-Ray diffraction (XRD) peaks) and thus improve the X-Ray diffraction (XRD) analysis. Again $CeO_2$ was not detected in the X-Ray diffraction (XRD) analysis and the only phases observed were those due to $ZrO_2$ thus indicating that Ce had again doped the $ZrO_2$ lattice.

EXAMPLE 18

This example illustrates the preparation of Pt,Rh/Ce,Zr/$\gamma$-$Al_2O_3$ using citric acid as the organic reagent.

This powder was prepared by impregnating $\gamma$-$Al_2O_3$ with Ce and ZrO nitrate salts in the presence of citric acid. The mole ratio of Ce/Zr was 2.7 and total weight loading Ce+Zr on $\gamma$-$Al_2O_3$ was 21 wt. %. The mole ratio of citric acid to metal salts was 2. After impregnation, the powders were calcined at 600° C. for 6 hours in 4% $O_2$/96% $N_2$ followed by air calcination at 600° C. for 1 hour. The powder was then caked, re-calcined, Pt+Rh added, re-calcined and then aged at 1140° C. in 10% $H_2O$/90% $N_2$ for 6 hours.

This aging resulted in the transformation of some of the γ-$Al_2O_3$ to α-$Al_2O_3$ and produced convenient sharp reference diffraction peaks for detecting shifts in the $CeO_2$ peaks, especially in the 2θ range of 40°–60°. A comparison preparation was also carried out where all the steps were identical as described above except that the Zr was not included. The resultant X-Ray diffraction (XRD) diffraction pattern in the 40–60° 2θ range are compared in FIG. 7. It is apparent that the peaks assigned to α-$Al_2O_3$ are in identical positions for both samples but the peaks assigned to $CeO_2$ are clearly shifted to higher 2θ values for the sample that contained Zr. Thus, the Zr has doped the $CeO_2$ lattice and the measured lattice parameter of 5.341±0.005 Å was consistent with about 24 atom % Zr in the $CeO_2$ lattice. This equates to a nominal Zr content of 27 atom %.

EXAMPLE 19

This example illustrates the preparation of $CeO_2$/$ZrO_2$ mixed-metal oxide in the presence of d-sorbitol as the organic reagent This powder was prepared by mixing Ce and Zr nitrate salts together in the presence of d-sorbitol where the d-sorbitol/(Ce+Zr) mole ratio was 2 and the weight ratio of $CeO_2$/$ZrO_2$ was 3. The resultant mixture was subsequently dried and calcined as described in Example 12. A sample of the calcined powder was then aged at 950° C. for 6 hours in 10% $H_2O$/90% $N_2$, combined with an equal weight of α-$Al_2O_3$ and sent for X-Ray diffraction (XRD) analysis. A comparison sample was prepared in an identical fashion where Zr was not included. The X-Ray diffraction (XRD) analysis showed results similar to those set forth in FIG. 7 described for Example 18.

EXAMPLE 20

Comparative

This example compares the performance of a dispersed Ce/γ-$Al_2O_3$ powder to two dispersed Ce,Zr/γ-$Al_2O_3$ powders.

A reference dispersed Ce/γ-$Al_2O_3$ powder was prepared as follows. 20,000 grams of aluminum hydroxide powder were intimately mixed with a solution consisting of Ce acetate and d-sorbitol to give a uniform slurry. The mole ratio of sorbitol/Ce was 2.0. The mixture was dried and calcined as described in Example 12. The Ce loading in the calcined powder was 22.64 wt. % Ce.

Two experimental powders, containing Ce and Zr dispersed on the surface of gamma-$Al_2O_3$ as mixed oxides, were prepared as follows. In the first preparation the acetate salts of Ce and Zr were used with d-sorbitol as the organic reagent. Again 20,000 grams of aluminum hydroxide give a uniform slurry. The mole ratio of d-sorbitol/(Ce+Zr) was 2.0. The slurry was then dried and calcined as described in Example 12. The Ce loading in the calcined powder was 18 wt. % and the Zr loading was 6.0 wt. %. In the second preparation the nitrate salts of Ce and Zr were used and the organic reagent was citric acid. The same procedure was used as described above and the Ce and Zr loading in the calcined product were 16.3 and 5.84 wt. % respectively. A reference catalyst was also prepared where Ce was impregnated onto alumina in the absence of an organic reagent at a loading of 50 wt. %.

The above powders were then used to coat monolith substrates and Pt and Rh were added as the chloride salts. The washcoat loadings were adjusted for the three catalysts where the support powders were prepared using organic reagents so that all three had the same Ce loading of 1030 g/ft³. The Ce loading of the reference catalyst prepared without any organic reagent present was 2350 g/ft³. The washcoating and precious metal addition procedures used have been previously described in Example 11 of U.S. Pat. 5,064,803.

The three catalysts were aged using a severe laboratory aging cycle. The aging consisted of heating the catalysts to 1000° C. for 24 hours in air. After the aging, 1" diameter by 2" long cores were removed and evaluated using a laboratory test procedure. The testing was done using a modulated synthetic exhaust gas mixture shown in Table 7. The modulation frequency between the rich and lean exhaust gas used was 1 Hz. Performance evaluation consisted of heating in the modulated exhaust gas to 100° C., holding at this temperature for 7 minutes and then ramping the temperature to 500° C. at a rate of 30° C./minute and holding at this temperature for 10 minutes. The performance results are reported as the steady state performance numbers at 500° C. and are presented in Table 8. The results reported are the average of three runs for catalyst #1 and the average of two runs for catalyst #s 2, 3 and 4.

TABLE 7

Gas Composition Used for Laboratory Evaluation
of Aged Catalysts
Flow Rate = 24SLPM    Modulation = 1Hz

| Gas | Rich | Lean | Modulated |
| --- | --- | --- | --- |
| $O_2$ | 0.59% | 1.85% | 1.22% |
| $C_3H_6$ | 0.055% as $C_3H_6$ | 0.055% as $C_3H_6$ | 0.055% as $C_3H_6$ |
| CO | 2.53% | 0.59% | 1.56% |
| NO | 0.098% | 0.098% | 0.098% |
| $H_2$ | 0.84% | 0.197% | 0.52% |
| $CO_2$ | 13.9% | 13.9% | 13.9% |
| $H_2O$ | 10% | 10% | 10% |
| $N_2$ | Balance | Balance | Balance |
| A/F ratio | 13.95 | 15.55 | 14.71 |

TABLE 8

Steady State Conversions at 500° C. Showing Advantages for
Dispersed Ce/Zr Containing Catalysts

| Catalyst # | Description | Ce/Zr Loading g/ft³ | | Steady State Conv. @ 500° C. | | |
| --- | --- | --- | --- | --- | --- | --- |
| | | Ce | Zr | HC | CO | $NO_x$ |
| 1 | Pt,Rh/Ce/γ-$Al_2O_3$ Ce OAc/d-Sorbitol | 1030 | — | 94.3 | 73.9 | 63.7 |
| 2 | Pt,Rh/Ce, Zr/γ-$Al_2O_3$ Acetate Salts/d-Sorbitol | 1030 | 343 | 98.4 | 83.4 | 73.4 |
| 3 | Pt,Rh/Ce,Zr/γ-$Al_2O_3$ Nitrate Salts/Citric Acid | 1030 | 370 | 98.3 | 81.4 | 72.8 |
| 4 | Pt,Rh/Ce/γ-$Al_2O_3$ Ce OAc/No Organic | 2351 | — | 97.3 | 66.8 | 66.0 |

It is seen from Table 8 that the performance of both catalysts prepared using Ce+Zr in the presence of an organic reagent gave the highest performance. Performance advantages are observed for HC, CO and NOx compared to the catalyst containing dispersed $CeO_2$ but no $ZrO_2$. Further, all three catalysts prepared using the organic reagent were superior in performance compared to a catalyst prepared without the organic reagent even though the latter contained appreciably higher Ce loadings.

Both X-Ray diffraction (XRD) and transmission electron spectroscopy (TEM) analysis of the three catalysts prepared using the organic reagents were carried out after the high temperature air aging. The lattice parameters and corresponding Zr-doping levels of $CeO_2$ are compared in Table 9. X-Ray diffraction (XRD) analysis of both Zr-containing samples shows evidence of Zr doping in the range of 12–13 mole %. No evidence for tetragonal $ZrO_2$ was observed in the X-Ray diffraction (XRD). Further, the diffraction peaks for $CeO_2$ were symmetrical in shape indicating that a singe phase of $CeO_2$ was present and not a mixture of doped and undoped $CeO_2$. As a result the approximate $CeO_2$ crystallite sizes were also estimated from the peak widths using the Scherrer equation and the results are also reported in Table 9. It is observed that the presence of $ZrO_2$ in the lattice results in smaller measured $CeO_2$ crystallite sizes suggesting that part of the function of Zr may be to slow the rate of $CeO_2$ sintering at high temperatures.

TABLE 9

X-Ray diffraction (XRD) Analysis Comparing $CeO_2$ Crystallite Sizes and Lattice Parameters of Zr-Containing and Zr-Free Catalysts

| Sample Description | Measured Lattice Parameter (Å) | Zr Doping Level (Mole %) | Average $CeO_2$ Crystallite Size (Å) | | | |
|---|---|---|---|---|---|---|
| | | | (111) | (200) | (331) | (420) |
| Pt,Rh/Ce/γ-$Al_2O_3$ CeOAc/d-Sorbitol | 5.411 ± 0.005Å | — | 382 | 377 | 301 | 348 |
| Pt,Rh/Ce,Zr/γ-$Al_2O_3$ Acetates/d-Sorbitol | 5.373 ± 0.005Å | 13 Mole % | 178 | 185 | 112 | 146 |
| Pt,Rh/Ce,Zr/γ-$Al_2O_3$ Nitratos/Citric Acid | 5.374 ± 0.005Å | 12.5 Mole % | 169 | 153 | 111 | 103 |

The transmission electron spectroscopy (TEM) analysis of the air-aged samples were in good agreement with the X-Ray diffraction (XRD) analysis. For the two samples prepared using the organic reagents the $CeO_2$,Zr crystallite sizes were smaller than for the Zr-free sample. Further, narrower particle size ranges were observed for the Zr-containing samples. The average particle size for the sample prepared using citric acid and the nitrate salts was 218 Å and for the sample prepared using d-sorbitol and acetate salts the average $CeO_2$,Zr particle size was 267 Å. This compares to an average particle size of 392 Å for the Zr-free sample. For the Zr-containing samples the Zr and Ce were evenly dispersed throughout the sample as shown by the EDS analysis and is consistent with mixed oxide/solid solution formation. However, the particles sizes were too small for individual EDS analysis and thus for confirmation of solid solution formation using the EDS analysis. The electron diffraction patterns were however consistent with a number of Ce,Zr phases including $Ce_{0.75}Zr_{0.25}O_2$ indicating that mixed oxide/solid solution formation could have occurred as was confirmed by the X-Ray diffraction (XRD) analysis.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A composite catalyst support material effective in enhancing the performance of catalytically active metals in the conversion of exhaust gas from internal combustion engines, consisting of:

a solid refractory-oxide support having a surface area greater than 50 $m^2$/gm and a substantially homogeneous mixed-metal-oxide crystallite composition uniformly dispersed on said support;

wherein the mixed-metal-oxide crystallite composition contains less than about 10 wt. % single metal oxide crystallites, wherein the mixed-metal-oxide crystallite composition consists of single phase crystals having an average size of about 100 Å or less across their longest dimension; and wherein the mixed-metal oxide crystallites comprise an oxide of atoms of a primary metal selected from the group consisting of Ce and Zr containing atoms of at least one secondary metal different from the primary metal and selected from the group consisting of Ce, Zr, La, Mn, Hf, Re, Pr, Nd, Sm, Gd, Dy, Y, Yb, Th, Ca and Sr substituted for some of the primary metal atoms within the crystalline structure of the primary metal oxide.

2. The support material of claim 1, wherein the primary metal atoms are Ce and the secondary metal atoms are selected from the group consisting of Zr, La, Mn, Hf, Re, Pr, Nd, Sm, Gd, Dy, Y, Yb, Th, Sr and Ca.

3. The support material of claim 2 further comprising atoms of an additional secondary metal different from the primary metal and the first selected secondary metal, said additional secondary metal being selected from the group consisting of La, Pr, Nd, Sm, Gd, Dy, Y, Yb, Th, Ca and Sr.

4. The support material of claim 1, wherein the primary metal and secondary metal atoms comprise Ce and Zr having a Ce/Zr mole ratio in the range of 0.8–1.2.

5. The support material of claim 4 further comprising atoms of an additional secondary metal selected from the group consisting of La, Pr, Nd and Sr.

6. The support material of claim 1, wherein the primary metal atoms comprise Zr and the secondary metal atoms comprise cerium.

7. The support material of claim 6 further comprising an additional secondary metal selected from the group consisting of La, Pr, Nd, Sm, Gd, Dy, Y, Yb, Th, Ca and Sr.

8. The support material of claim 1 in which the refractory oxide support has a surface area between about 50 and 300 $m^2$/gm.

* * * * *